US012129812B2

(12) United States Patent
VandeVoorde et al.

(10) Patent No.: US 12,129,812 B2
(45) Date of Patent: Oct. 29, 2024

(54) ENGINE APPARATUS AND METHOD FOR OPERATION

(71) Applicant: HYLIION HOLDINGS CORP, Cedar Park, TX (US)

(72) Inventors: Kevin Michael VandeVoorde, West Chester, OH (US); Joshua Tyler Mook, Cincinnati, OH (US); Aigbedion Akwara, Cincinnati, OH (US); Jason Joseph Bellardi, Fairfield, OH (US); Mohammed El Hacin Sennoun, West Chester, OH (US); Mary Kathryn Thompson, Fairfield Township, OH (US); Scott Douglas Waun, Loveland, OH (US); Michael Thomas Gansler, Mason, OH (US); Michael Robert Notarnicola, Cincinnati, OH (US)

(73) Assignee: HYLIION HOLDINGS CORP, Cedar Park, TX (US)

( * ) Notice: Subject to any disclaimer, the term of this patent is extended or adjusted under 35 U.S.C. 154(b) by 343 days.

(21) Appl. No.: 17/603,151

(22) PCT Filed: May 20, 2020

(86) PCT No.: PCT/US2020/033710

§ 371 (c)(1),
(2) Date: Oct. 12, 2021

(87) PCT Pub. No.: WO2020/236877

PCT Pub. Date: Nov. 26, 2020

(65) Prior Publication Data

US 2022/0195959 A1 Jun. 23, 2022

Related U.S. Application Data

(60) Provisional application No. 62/850,599, filed on May 21, 2019, provisional application No. 62/850,623,
(Continued)

(51) Int. Cl.
*F02G 1/044* (2006.01)
*B33Y 80/00* (2015.01)
(Continued)

(52) U.S. Cl.
CPC .............. *F02G 1/044* (2013.01); *B33Y 80/00* (2014.12); *F02G 1/04* (2013.01); *F02G 1/043* (2013.01);
(Continued)

(58) Field of Classification Search
CPC ............. F02G 2244/50; F02G 2244/52; F02G 2244/54; F02G 1/0435; F02G 1/044;
(Continued)

(56) References Cited

U.S. PATENT DOCUMENTS 3,035,879 A * 5/1962 Hanny .................. F04B 39/045 92/162 R
3,296,808 A 1/1967 Malik
(Continued)

FOREIGN PATENT DOCUMENTS

DE 3416271 A1 11/1985
JP S5866144 U 5/1983
(Continued)

OTHER PUBLICATIONS

American Stirling Company, Regenerators, 10 Pages. https://www.stirlingengine.com/regenerators/.
(Continued)

*Primary Examiner* — Mark A Laurenzi
*Assistant Examiner* — Xiaoting Hu
(74) *Attorney, Agent, or Firm* — Dority & Manning, P.A.

(57) ABSTRACT

A system for energy conversion, the system including a closed cycle engine containing a volume of working fluid, the engine comprising a first chamber defining an expansion chamber and a second chamber defining a compression chamber each separated by a piston attached to a connection member of a piston assembly, and wherein the engine comprises a heater body in thermal communication with the first chamber, and further wherein the engine comprises a
(Continued)

cold side heat exchanger in thermal communication with the second chamber, and wherein a third chamber is defined within the piston, wherein the third chamber is in selective flow communication with the first chamber, the second chamber, or both.

15 Claims, 35 Drawing Sheets

Related U.S. Application Data filed on May 21, 2019, provisional application No. 62/850,678, filed on May 21, 2019, provisional application No. 62/850,692, filed on May 21, 2019, provisional application No. 62/850,701, filed on May 21, 2019.

(51) Int. Cl.

| | |
|---|---|
| ***F02G 1/04*** | (2006.01) |
| ***F02G 1/043*** | (2006.01) |
| ***F02G 1/047*** | (2006.01) |
| ***F02G 1/05*** | (2006.01) |
| ***F02G 1/053*** | (2006.01) |
| ***F02G 1/055*** | (2006.01) |
| ***F02G 1/057*** | (2006.01) |
| ***F02G 3/00*** | (2006.01) |
| ***F23R 3/00*** | (2006.01) |
| ***F28D 9/04*** | (2006.01) |
| ***F28D 21/00*** | (2006.01) |
| ***F28F 7/02*** | (2006.01) |
| ***F28F 13/00*** | (2006.01) |
| ***F28F 13/14*** | (2006.01) |

(52) U.S. Cl.

CPC ............... *F02G 1/047* (2013.01); *F02G 1/05* (2013.01); *F02G 1/053* (2013.01); *F02G 1/055* (2013.01); *F02G 1/057* (2013.01); *F02G 3/00* (2013.01); *F23R 3/005* (2013.01); *F28D 9/04* (2013.01); *F28F 7/02* (2013.01); *F28F 13/003* (2013.01); *F28F 13/14* (2013.01); *F02G 1/0435* (2013.01); *F02G 2243/00* (2013.01); *F02G 2244/00* (2013.01); *F02G 2244/08* (2013.01); *F02G 2244/50* (2013.01); *F02G 2244/52* (2013.01); *F02G 2244/54* (2013.01); *F02G 2250/00* (2013.01); *F02G 2254/10* (2013.01); *F02G 2254/18* (2013.01); *F02G 2257/00* (2013.01); *F02G 2258/10* (2013.01); *F02G 2270/40* (2013.01); *F02G 2270/45* (2013.01); *F02G 2270/80* (2013.01); *F02G 2280/10* (2013.01); *F28D 2021/0026* (2013.01); *F28F 2210/10* (2013.01); *F28F 2250/04* (2013.01)

(58) Field of Classification Search

CPC .. F02G 2270/40; F02G 2270/45; F02G 1/053; F02G 2280/10; F02G 1/04–06; F02G 2270/02; F02G 2270/30; F16J 1/10; F16J 1/12; F16J 1/14; F16J 7/00

See application file for complete search history.

(56) References Cited

U.S. PATENT DOCUMENTS

| | | | | | |
|---|---|---|---|---|---|
| 3,355,882 | A | | 12/1967 | Kohler et al. | |
| 3,552,120 | A | | 1/1971 | Beale | |
| 3,733,974 | A | * | 5/1973 | Schuman | F02G 1/0435 92/172 |
| 3,777,718 | A | | 12/1973 | Pattas | |
| 3,991,585 | A | * | 11/1976 | Mulder | F25B 9/14 62/6 |
| 4,026,114 | A | | 5/1977 | Belaire | |
| 4,030,297 | A | | 6/1977 | Kantz et al. | |
| 4,077,216 | A | | 3/1978 | Cooke-Yarborough | |
| 4,183,214 | A | | 1/1980 | Beale et al. | |
| 4,199,945 | A | | 4/1980 | Finkelstein | |
| 4,387,568 | A | | 6/1983 | Dineen | |
| 4,450,685 | A | | 5/1984 | Corey | |
| 4,545,738 | A | | 10/1985 | Young | |
| 4,644,851 | A | | 2/1987 | Young | |
| 4,662,176 | A | * | 5/1987 | Fujiwara | F02G 1/043 60/517 |
| 4,717,405 | A | | 1/1988 | Budliger | |
| 4,723,411 | A | | 2/1988 | Darooka et al. | |
| 4,945,726 | A | * | 8/1990 | Beale | F02G 1/045 60/520 |
| 5,525,845 | A | * | 6/1996 | Beale | F02G 1/0435 310/90 |
| 7,134,279 | B2 | | 11/2006 | White et al. | |
| 7,171,811 | B1 | * | 2/2007 | Berchowitz | F02G 1/044 60/517 |
| 8,051,655 | B2 | | 11/2011 | Silver et al. | |
| 8,720,198 | B2 | | 5/2014 | Wood | |
| 8,820,068 | B2 | * | 9/2014 | Dadd | F02G 1/0435 60/520 |
| 9,689,344 | B1 | | 6/2017 | Gedeon | |
| 2004/0025502 | A1 | * | 2/2004 | Okano | F25B 9/14 60/517 |
| 2004/0154468 | A1 | * | 8/2004 | Kiikka | F16C 32/0622 92/162 R |
| 2004/0222636 | A1 | * | 11/2004 | Otting | F24S 23/71 290/1 R |
| 2006/0283417 | A1 | * | 12/2006 | Yaguchi | F02G 1/0535 123/193.6 |
| 2008/0118375 | A1 | * | 5/2008 | Muth | F04B 35/04 417/363 |
| 2008/0250784 | A1 | * | 10/2008 | Cale | F02G 1/0435 60/512 |
| 2010/0199944 | A1 | * | 8/2010 | Katayama | F16J 7/00 123/197.4 |
| 2013/0031899 | A1 | * | 2/2013 | Budliger | F02G 1/047 60/520 |
| 2015/0211439 | A1 | | 7/2015 | Majoros | |
| 2018/0112625 | A1 | * | 4/2018 | Wood | F02G 1/0435 |

FOREIGN PATENT DOCUMENTS

| | | | | | |
|---|---|---|---|---|---|
| JP | 60019950 | A | * | 2/1985 | |
| JP | H06147009 | A | | 5/1994 | |
| JP | 2000045867 | A | | 2/2000 | |
| JP | 2004020048 | A | | 1/2004 | |
| WO | WO-2009026104 | A1 | * | 2/2009 | F02G 1/0435 |

OTHER PUBLICATIONS

Bin-Nun et al., Low Cost and High Performance Screen Laminate Regenerator Matrix, ScienceDirect, FLIR Systems, MA, vol. 44, Issues 6-8, Jun.-Aug. 2004, pp. 439-444. https://www.sciencedirect.com/science/article/abs/pii/S0011227504000700.

Bright Hub Engineering, Oil Piston Cooling, Oct. 19, 2009, 6 Pages. https://www.brighthubengineering.com/marine-engines-machinery/52783-how-are-marine-pistons-cooled-with-oil/.

Conner, 3D Printed Stirling Engine, Solar Heat Engines, Simulate, Analyze, Design, Build, and Test Solar-Powered Engines, Oct. 29, 2012, 12 Pages. http://www.solarheatengines.com/2012/10/29/3d-printing-stirling-engine/.

Conner, A Regenerator for the 3D Printed PE 2 Stirling Engine, Solar Heat Engines, Simulate, Analyze, Design, Build, and Test Solar-Powered Engines, Dec. 18, 2012, 9 Pages. http://www.solarheatengines.com/2012/12/18/a-regenerator-for-the-3d-printed-pe-2-striling-engine/.

Deetlefs, Design, Simulation, Manufacture and Testing of a Free-Piston Stirling Engine, Thesis, Department of Mechatronic Engi-

(56) References Cited

OTHER PUBLICATIONS neering Stellenbosch University, Scholar Sun, South Africa, Dec. 2014, 138 Pages. https://scholar.sun.ac.za/bitstream/handle/10019.1/95922/deetlefs_design_2014.pdf?sequence=3&isAllowed=v.
Defense Visual Information Distribution Service (DVIDS), MOD II Automotive Stirling Engine, NASA, C-1986-3706, Washington, DC, 2 pages. https:/www.dvidshub.net/image/844058/mod-ii-automotive-stirling-engine.
Defense Visual Information Distribution Service (DVIDS), MOD II Automotive Stirling Engine, NASA, C-1986-3724, Washington, DC, 2 pages. https://www.dvidshub.net/image/841262/mod-ii-automotive-stirling-engine.
Defense Visual Information Distribution Service (DVIDS), MOD II Automotive Stirling Engine, NASA, C-1986-3725, Washington, DC, 2 pages. https://www.dvidshub.net/image/841262/mod-ii-automotive-stirling-engine.
Devitt, Restriction and Compensation of Gas Bearings—Bently Bearings by Newway, Aston, PA, 5 Pages. https://bentlybearings.com/restriction-and-compensation/.
Dudareva et al., Thermal Protection of Internal Combustion Engines Pistols, Science Direct, Procedia Engineering, vol. 206, 2017, pp. 1382-1387. https://www.sciencedirect.com/science/article/pii/S1877705817353341.
Electropaedia, Battery and Energy Technologies, Energy Conversion and Heat Engines, Woodbank Communications Ltd., Chester, United Kingdom, 2005, 11 Pages. https://www.mpoweruk.com/heat_engines.htm.
Enerlyt Stirling Engine, Enerlyt, Glowing-Isothermal-Mechanical-Stirling-Arranged-Motor, Enerlyt Technik GmbH, Potsdam, 2012, 13 Pages. http://www.enerlyt.de/english/pdf/en_motorbeschreibung_040413.pdf.
Fouzi, Chapter 6: Piston and Piston Rings, DJA3032 Internal Combustion Engine, Politeknik Malaysia, 201, 5 Pages. https://www.slideshare.net/mechanical86/dja3032-chapter-6.
Free-Piston Engine Range Extender Technology, Sir Joseph Swan Centre for Energy Research, 2016. (Video) https://www.youtube.com/watch?v=u4b0_6byuFU.
Garcia-Santamaria et al., A German Inverse Woodpile Structure with a Large Photonic Band Gap, Advanced Materials Communication, Wiley InterScience, 2007, Adv. Mater. 0000, 00, pp. 1-5. http://colloids.matse.illinois.edu/articles/garcia_adymat_2007.pdf.
General Electrical—GE Power, Breaking the Power Plant Efficiency Record, 2016, 4 Pages. https://www.ge.com/power/about/insights/articles/2016/04/power-plant-efficiency-record.
Georgescu, Rotary Engine, 2007. (Video Only) https://www.youtube.com/watch?v=ckuQugFH68o.
Gibson, et al., Cellular Solids Structure and Properties, Cambridge University Press, 2nd Edition, 1997. (Web Link Only) https://doi.org/10.1017/CBO9781139878326.
Giphy, Engine Piston GIF, 1 Page. https://giphy.com/gifs/engine-hybrid-piston-10YyqVUCHx2HC.
Green Car Congress, New Toroidal Internal Combustion Engine Promises 20:1 Power-to-Weight-Ratio Energy, Technologies, Issues and Polices for Sustainable Mobility, Apr. 2006, 2 Pages. https://www.greencarcongress.com/2006/04/new_toroidal_in.html.
Hoegel et al., Theoretical Investigation of the Performance of an Alpha Stirling Engine for Low Temperature Applications, Conference: ISEC 15th International Stirling Engine Conference, ResearchGate, New Zealand, Jan. 2012, 10 Pages. https://www.researchgate.net/publication/256706755_Theoretical_investigation_of_the_performance_of_an_Alpha_Stirling_engine_for_low_temperature_applications.
Honeywell Aerospace, Ultra Long-Life, Flight Qualified Technology for High Speed Imaging and Sensing Infra-Red Detectors, Stirling Cycle Cryocoolers, Auxiliary Power and Thermal, Honeywell Aerospace. Stirling Cycle Cryocoolers. https://aerospace.honeywell.com/en/products/auxiliary-power-and-thermal/stirling-cycle-cryocoolers.
Howden, Reciprocating Compressor C series—animation, Jun. 2017. (Video Only) https://www.youtube.com/watch?v=owNOdUBL37U&feature=youtu.be.
http://www.hybrid-engine-hope.com/media/pagini/95_0071d630dba777d16e9a770de27060e6.gif (Web Link Only).
Huang, Toroidal Engine Ver:2.0, 2017. (Video Only) https://www.youtube.com/watch?y=n5L0Zc6Ic8Y&feature=youtu.be.
Ishikawa et al., Development of High Efficiency Gas Turbine Combined Cycle Power Plant, Power Systems Headquarters, Mitsubishi Heavy Industries, Ltd., Technical Review, vol. 45, No. 1, Mar. 2008, pp. 15-17. http://courses.me.metu.edu.tr/courses/me476/downloads/476s08ProjectPt4GtTemp.pdf.
Luna, Investigation of Porous Metals as Improved Efficiency Regenerators, The University of Sheffield, Doctor of Philosophy Thesis, Mar. 2016, 261 Pages. http://etheses.whiterose.ac.uk/13111/1/Thesis%20Elizondo-Luna.pdf.
Microgen Engine Corporation. Technology, 2016, 4 Pages. https://www.microgen-engine.com/technology/technology/.
Murphy, Iav Sees Huge Potential With 3D-Printed Pistons, Wards Auto, Apr. 12, 2018, 6 Pages. https://www.wardsauto.com/engines/iav-sees-huge-potential-3d-printed-pistons.
Ni et al., Improved Simple Analytical Model and Experimental Study of a 100 W B-Type Stirling Engine, Applied Energy, vol. 169, 2016, pp. 768-787. https://www.researchgate.net/publication/296632477_Improved_Simple_Analytical_Model_and_experimental_study_of_a_100W_b-type_Stirling_engine/figures?lo=.
Nightingale, Automotive Stirling Engine, Mod II Design Report, DOE/NASA/0032-28, NASA CR-175106, TI86ASE58SRI, New York, 1986, 54 Pages. https://ntrs.nasa.gov/archive/nasa/casi.ntrs.nasa.gov/19880002196.pdf.
O'Dell, SuperTruck Program Scores Big, Head into Second 5-Year Phase, Trucking.com, 2016, 7 Pages. https://www.trucks.com/2016/10/31/supertruck-program-5-year-phase/.
Owczarek, On the Design of Lubricant Free Piston Compressors, Nonlinear Solid Mechanics, Faculty of Engineering Technology, Thesis, University of Twente, Enschede, Sep. 17, 2010. (Abstract Only). https://research.utwente.nl/en/publications/on-the-design-of-lubricant-free-piston-compressors.
Panesar et al., Strategies for Functionally Graded Lattice Structures Derived Using Topology Optimisation for Additive Manufacturing, ScienceDirect, Additive Manufacturing, vol. 19, Jan. 2018, pp. 81-94. https://doi.org/10.1016/j.addma.2017.11.008.
Park et al., Thermal/Fluid Characteristics of Isotropic Plain-Weave Screen Laminates as Heat Exchange Surfaces, AIAA 2002-0208, 2002, pp. 1-9 https://wolfweb.unr.edu/~rawirtz/Papers/AIAA2002-0208.pdf.
Penswick et al., Duplex Stirling Machines, Sunpower Incorporated 19th Annual Intersociety Energy Conversion Engineering Conference, QP051082-A, vol. 3, No. CONF-840804, United States, 1984, 7 Pages. https://www.ohio.edu/mechanical/stirling/engines/Duplex-Stirling-Machines.pdf.
Pneumatic Round Body Cylinder—SRG_SRG Series, Parker, Richland MI, 3 Pages. http://ph.parker.com/us/en/pneumatic-round-body-cylinder-srg-srgm-series.
Qiu et al., Advanced Stirling Power Generation System for CHP Application, ARPA, Temple University, Philadelphia, 5 Pages. https://arpa-e.energy.gov/sites/default/files/Temple_GENSETS_Kickoff.pdf.
Ranieri et al., Efficiency Reduction in Stirling Engines Resulting from Sinusoidal Motions, Energies, vol. 11, No. 11: 2887, 2018, 14 Pages. https://doi.org/10.3390/en11112887.
Renewable Energy, Double-Acting Stirling Engine, Stirling Engine, 1 Page. (Abstract Only) https://sites.google.com/a/emich.edu/cae546816t5/history/type/double---acting-stirling-engine.
Rodriguez Perez, Cellular Nanocomposites: A New Type of Light Weight Advanced Materials with Improved Properties, CellMat Technologies S.L. Transfer Center and Applied Technologies, Valladolid, Sep. 18-19, 2013, 35 Pages. http://crono.ubu.es/innovationh2020/pdf/cellmat.pdf.
Schonek, How big are power line losses?, Energy Management/Energy Efficiency, Schneider Electric, Mar. 25, 2013, 2 Pages. https://blog.schneider-electric.com/energy-management-energy-efficiency/2013/03/25/how-big-are-power-line-losses/.
Schwartz, The Natural Gas Heat Pump and Air Conditioner, 2014 Building Technologies Office Peer Review, ThermoLift, Inc., U.S. Department of Energy, Energy Efficiency & Renewable Energy,

(56) References Cited

OTHER PUBLICATIONS

DE-FOA-0000823, 27 Pages (Refer to p. 7) https://www.energy.gov/sites/prod/files/2014/11/f19/BTO%202014%20Peer%20Review%20Presentation%20-%20ThermoLift%204.4.14.pdf.
Shimizu, Next Prius Will Have Engine Thermal Efficiency of 40%, XTECH, Solar Plant Business, Nikkei Business Publications, May 22, 2015, 2 Pages. https://tech.nikkeibp.co.ip/dm/english/NEWS_EN/20150522/419560/.
Stirling Engines, Solar Cell Central, 5 Pages. http://solarcellcentral.com/stirling_page.html.
Stirling Engines, Regenerators, What They Are and How They Work, American Stirling Company, 7 Pages. https://www.stirlingengine.com/regenerators/.
ThermoLift, Technology—Background, The Thermodynamic Process Behind ThermoLift, ThermoLift, Inc., 3 Pages. http://www.tm-lift.com/background/.
Thimsen, Stirling Engine Assessment, 1007317, Electronic Power Research Institute (EPRI ), Palo Alto, California, 2002, 170 Pages. http://www.engr.colostate.edu/~marchese/mech337-10/epri.pdf.
Thomassen, Free Floating Piston Film (mpeg).mpg, Mar. 5, 2010. (Video Only) https://www.youtube.com/watch?v=bHFUi0F0PgA.
Toptica Photonics, 2-Photon Polymerization, FemtoFiber Technology for Two-Photon Polymerization, 2 Pages. https://www.toptica.com/applications/ultrafast-studies/2-photon-polymerization/.
Toyota Motor Corporation, Inline 4 Cylinder 2.5L Injection Gasoline Engine/New Transaxle, Global Website, Dec. 6, 2016, 2 Pages. https://global.toyota/en/download/14447877/.
Tuncer et al., Structure-Property Relationship in Titanium Foams, Anadolu University, Turkey, Feb. 2011, 35 Pages. https://ocw.mit.edu/courses/materials-science-and-engineering/3-054-cellular-solids-structure-properties-and-applications-spring-2015/lecture-notes/MIT3_054S15_L13_Cellular.pdf.
Urieli, Chapter 5B—Regenerator Simple Analysis, Stirling Cycle Machine Analysis, Ohio Edu, Jan. 17, 2010, 5 Pages. https://www.ohio.edu/mechanical/stirling/simple/regen_simple.html.
Vodhanel, Characterization of Performance of a 3D Printed Stirling Engine Through Analysis and Test, Cleveland State University Engaged Scholarship@CSU, ETD Archive, 2016, 91 Pages. https://engagedscholarship.csuohio.edu/cgi/viewcontent.cgi?referer=https://www.google.com/&httpsredir=1&article=1944&context=etdarchive.
Wikipedia, Heat Engine, 8 Pages. https://en.wikipedia.org/wiki/Heat_engine.
Wikipedia, Regenerative Heat Exchanger, 3 Pages. https://en.wikipedia.org/wiki/Regenerative_heat_exchanger.
Wikipedia, Stirling Engine, 2019, 24 Pages. https://en.wikipedia.org/wiki/Stirling_engine.
Wirtz et al., High Performance Woven Mesh Heat Exchangers, Mechanical Engineering Department, University of Nevada, Reno, 2002, 8 Pages. https:/apps.dtic.mil/dtic/tr/fulltext/u2/a408219.pdf.
Wirtz et al., Thermal/Fluid Characteristics of 3-D Woven Mesh Structures as Heat Exchanger Surfaces, IEEE Transactions on Components and Packaging Technologies, vol. 26, No. 1, Mar. 2003, pp. 40-47. https://pdfs.semanticscholar.org/dla3/b4ce0baa639cf349d25d1506c3fa6118de3e.pdf.
Wu et al., Model-based Analysis and Simulation of Regenerative Heat Wheel, ScienceDirect, Energy and Buildings, vol. 38, No. 5, May 2006, pp. 502-514. http://citeseerx.ist.psu.edu/viewdoc/download?doi=10.1.1.616.3103&rep=rep1&type=pdf.
Xie et al., Investigation on the Performances of the Gas Driven Vuilleumier Heat Pump, International Refrigeration and Air Conditioning Conference, Purdue University, School of Mechanical Engineering, 2008, 7 Pages. https://docs.lib.purdue.edu/cgi/viewcontent.cgi?referer=https://www.google.com//&httpsredir=1&article=1935&context=iracc.
Chinese Office Action Corresponding to Application No. 202080051965 on Nov. 22, 2023.

* cited by examiner

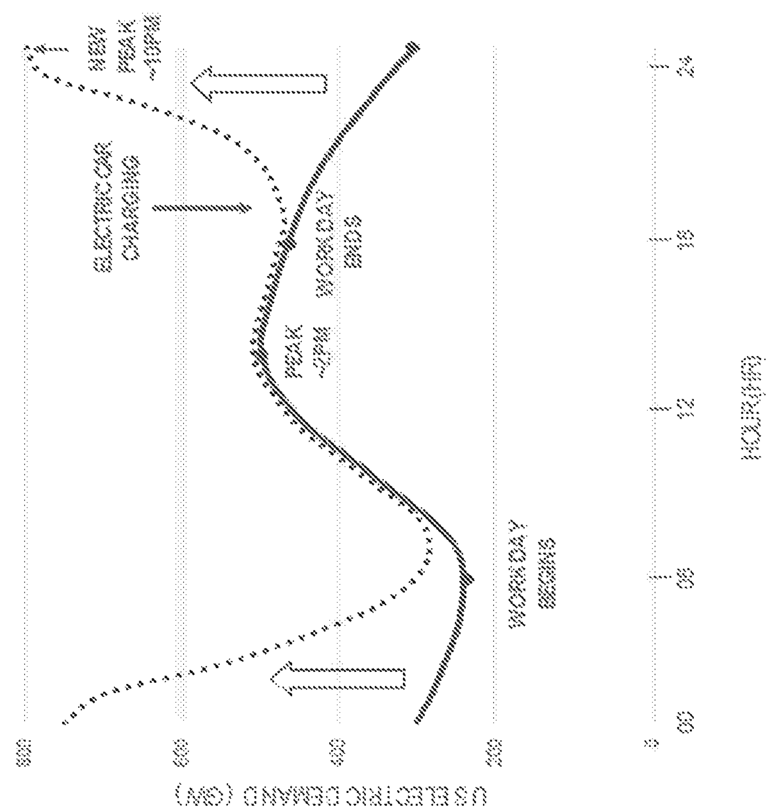
FIG. 1.1.1
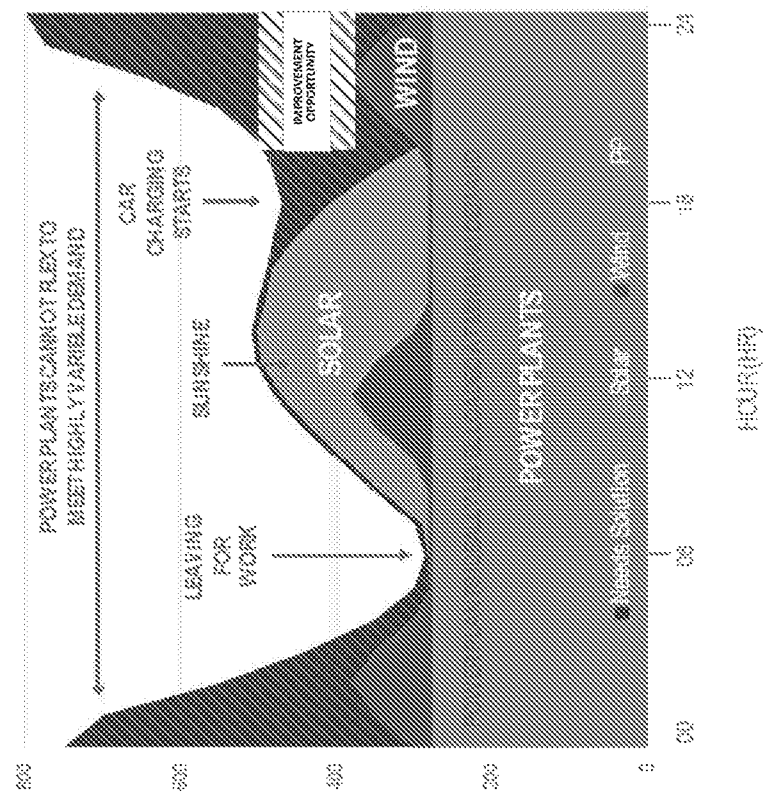
FIG. 1.1.2

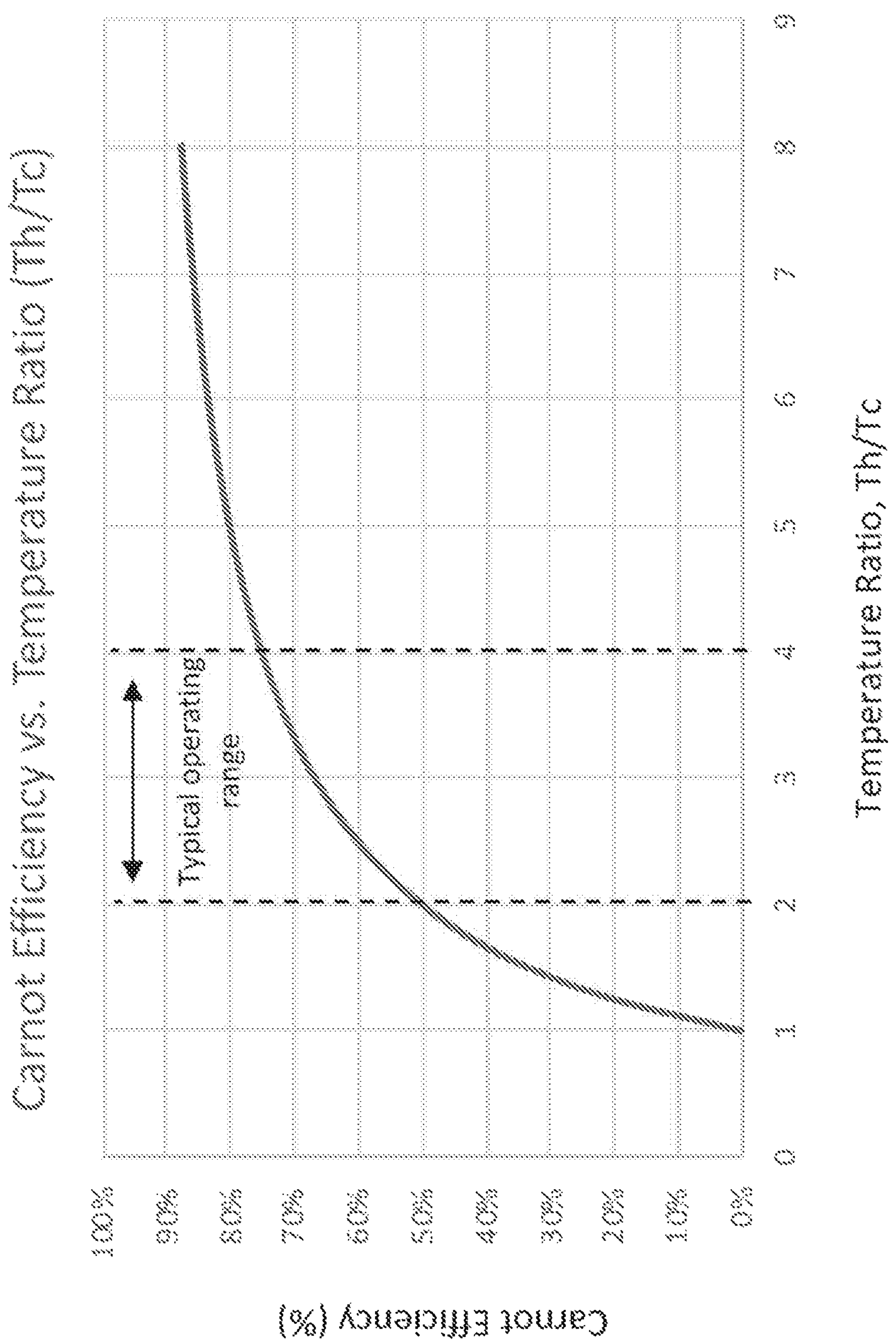
*FIG. 1.1.3*

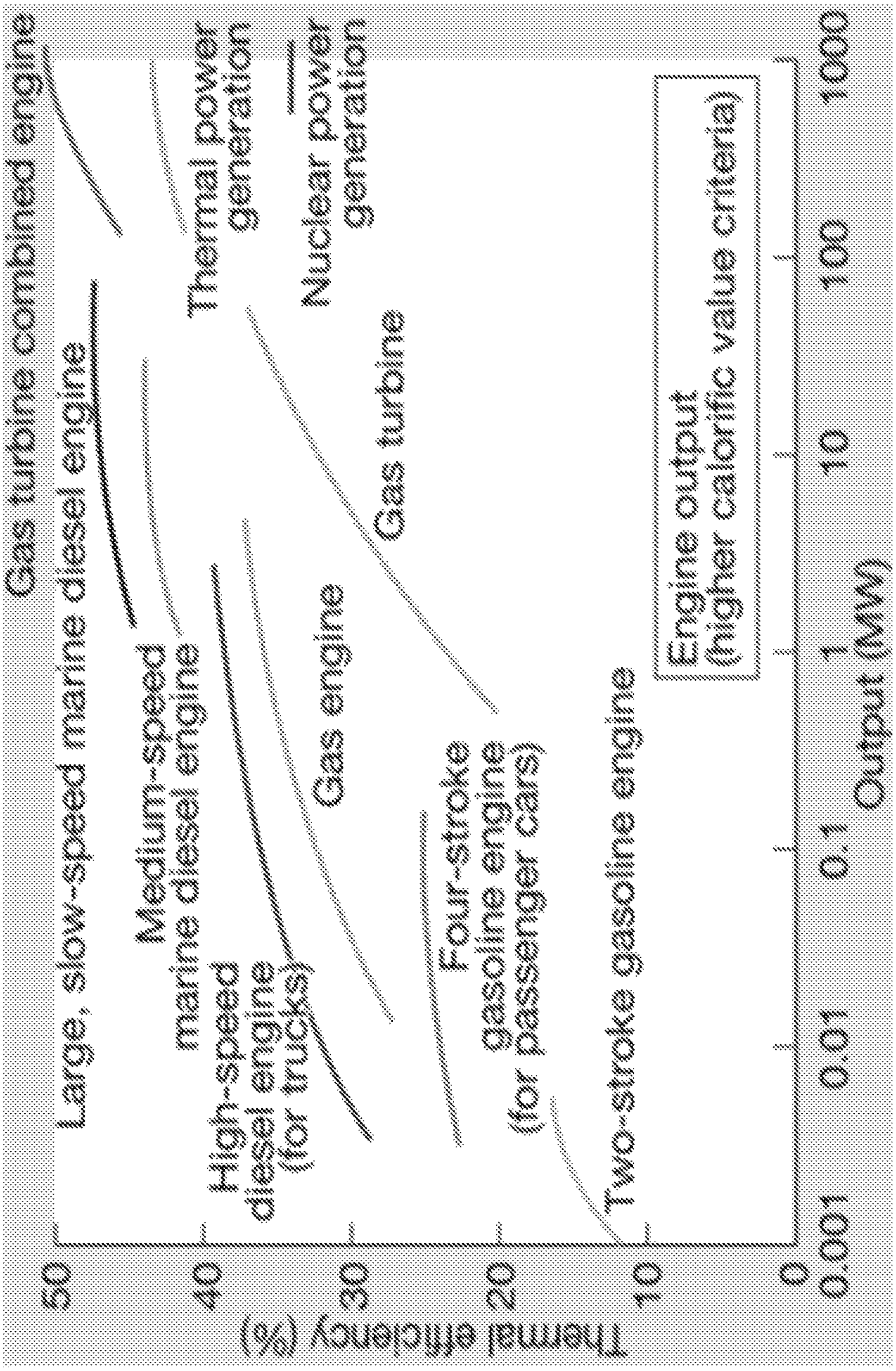
FIG. 1.1.4

Table ES-1 Nominal Heat Balances of Prime-Movers as a Percentage of Fuel Input

| Engine Type | Work | Recoverable Heat | Rejected Heat |
|---|---|---|---|
| Diesel | 36 | 42 | 22 |
| Adiabatic Turbo-compound Diesel | 47 | 36 | 17 |
| Gas Turbine (Simple) | 25 | 45 | 30 |
| Gas Turbine (Regenerative) | 38 | 22 | 40 |
| Stirling (Current) | 34 | 54 | 12 |

FIG. 1.1.5

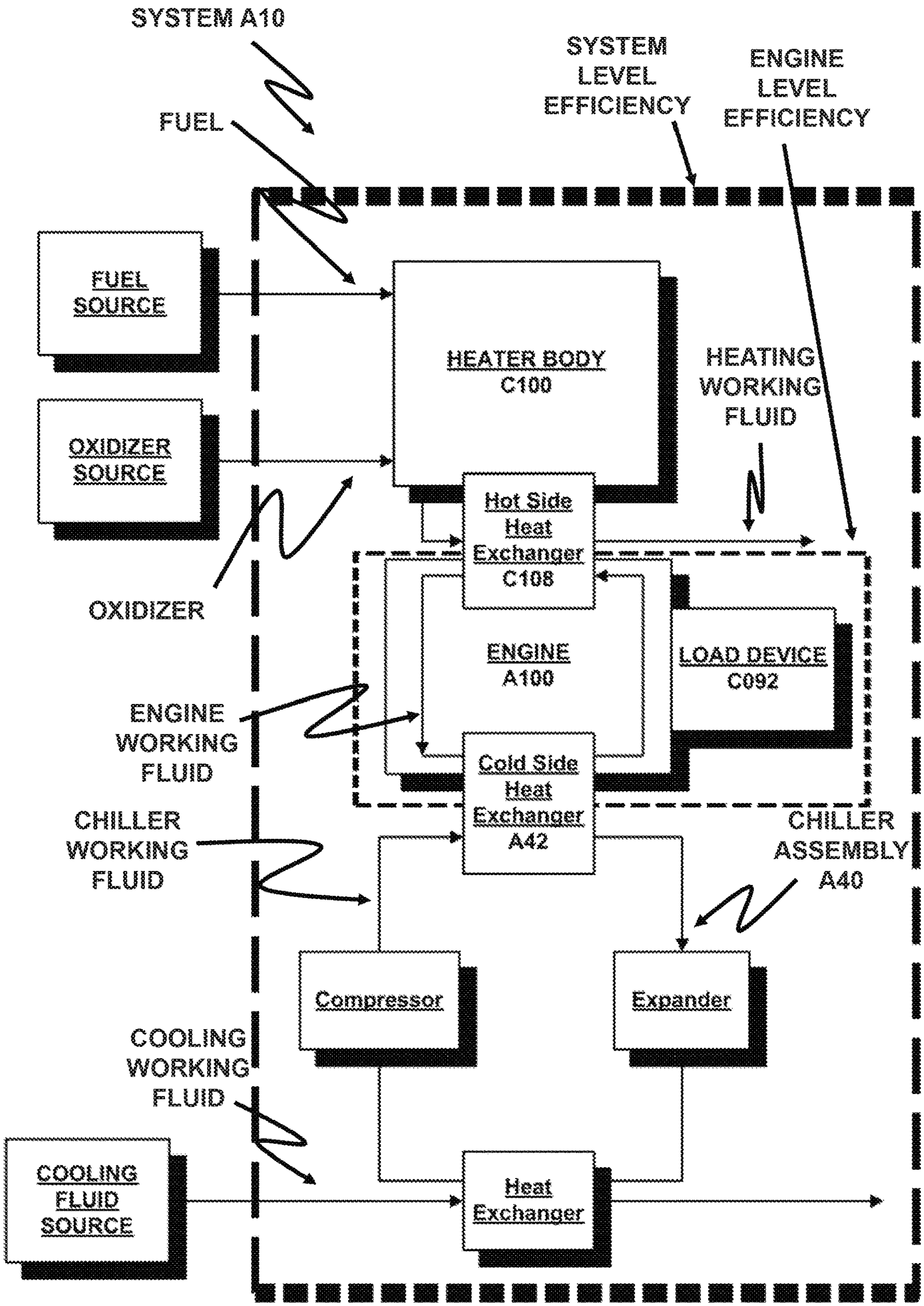
FIG. 1.2.1

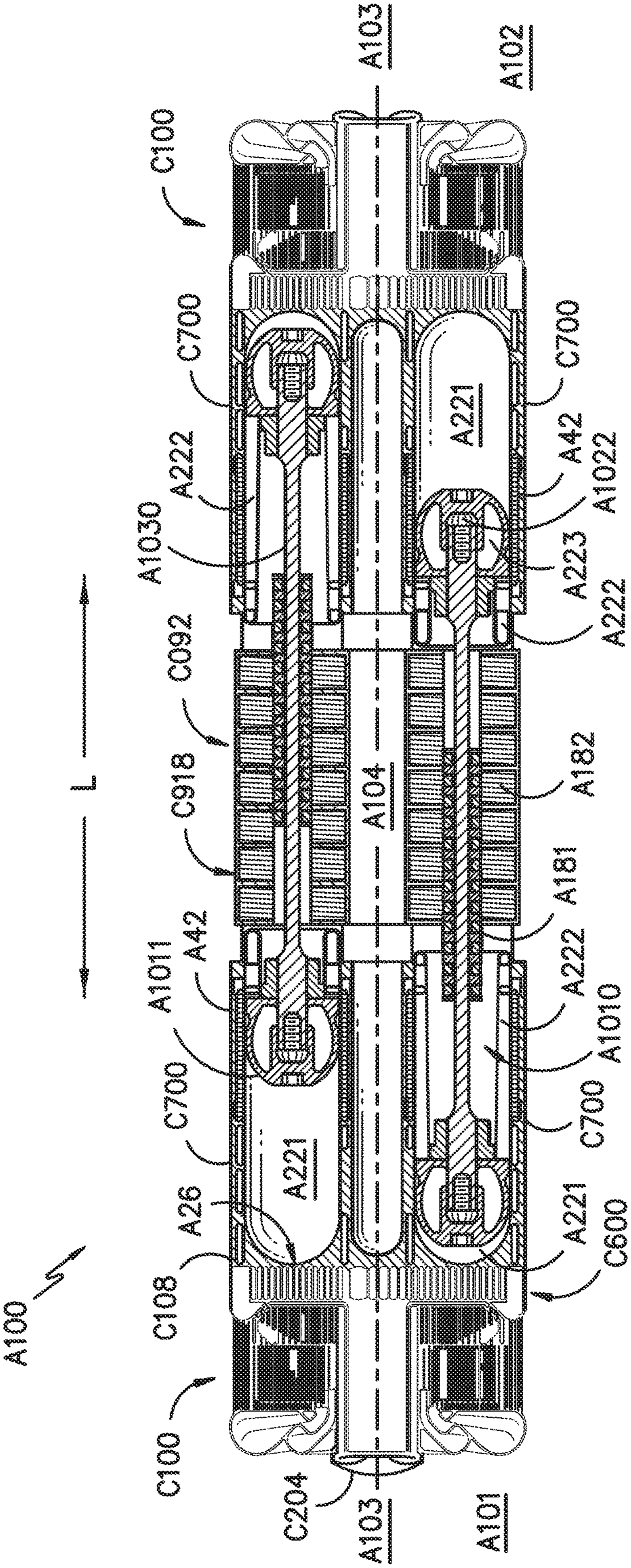
FIG. 1.3.1

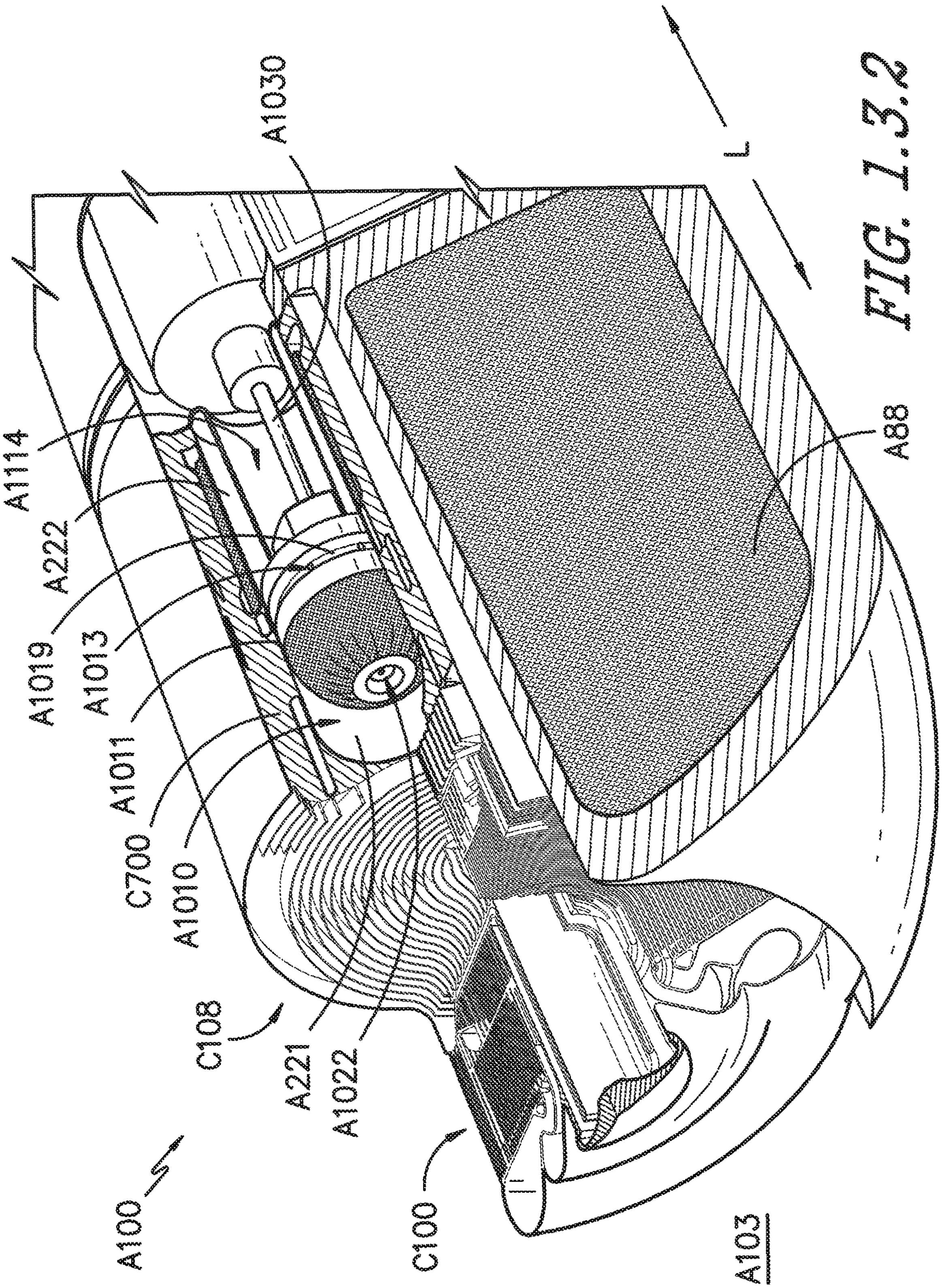
FIG. 1.3.2

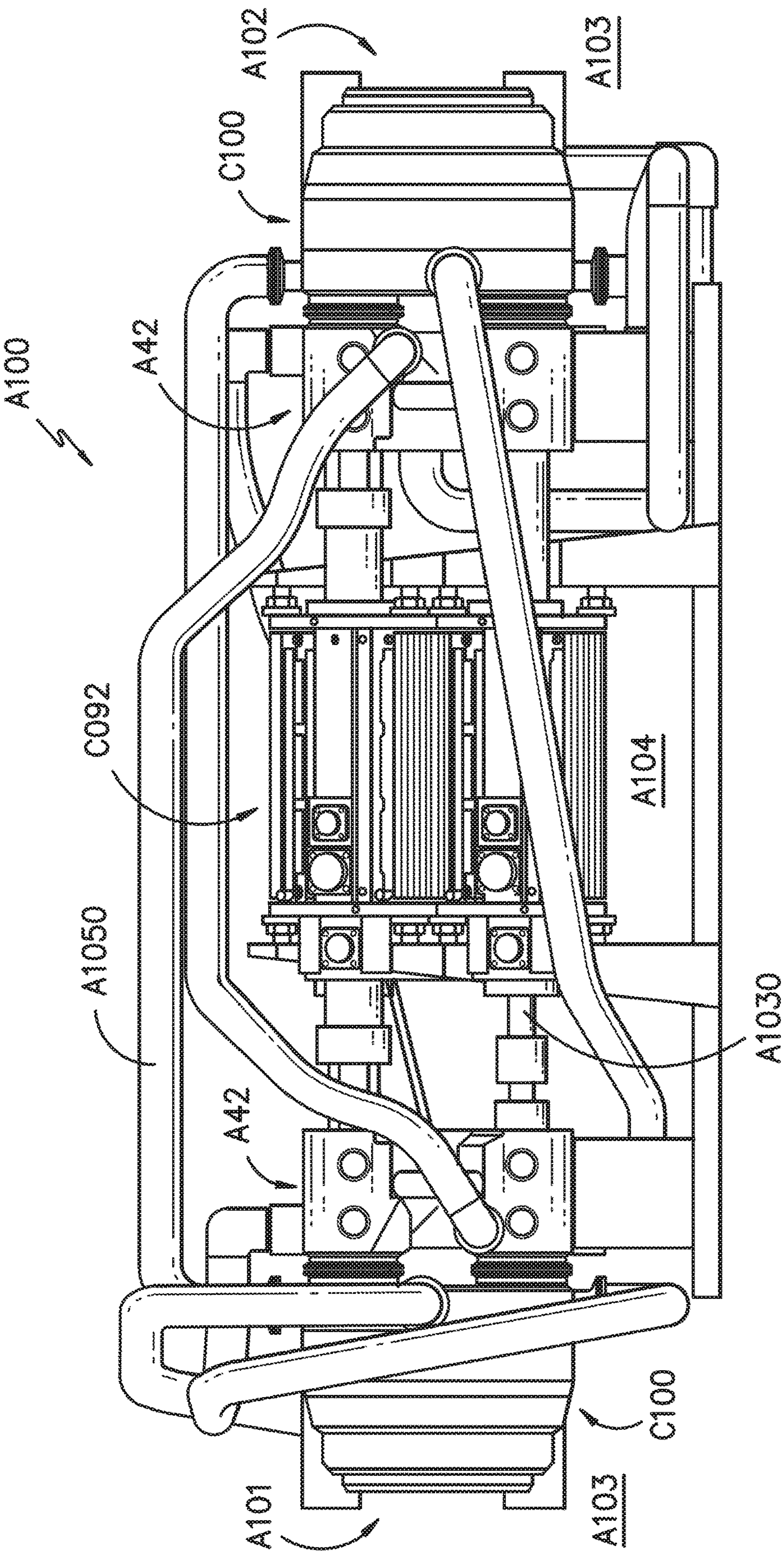
*FIG. 1.7.1*

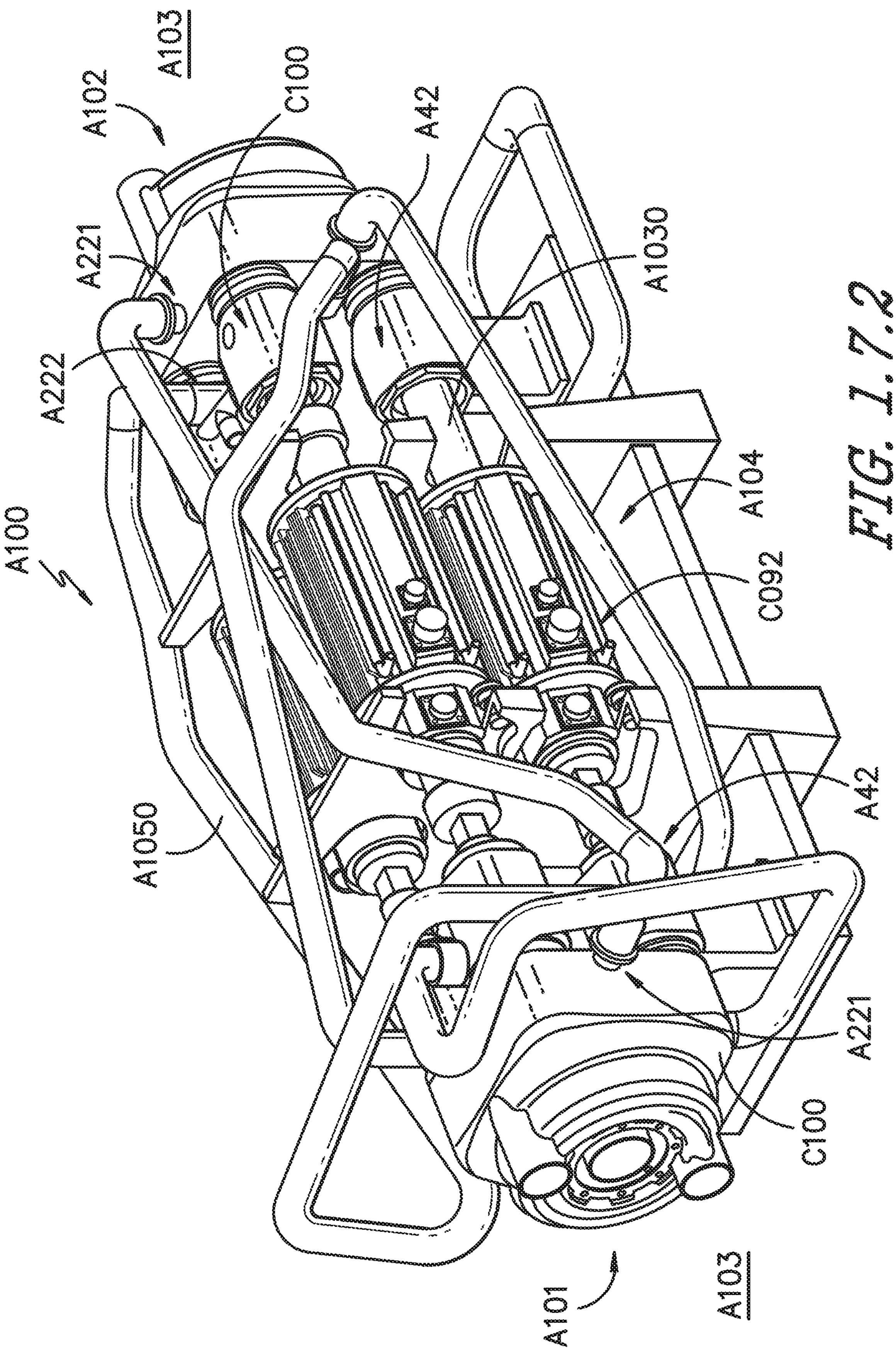
FIG. 1.7.2

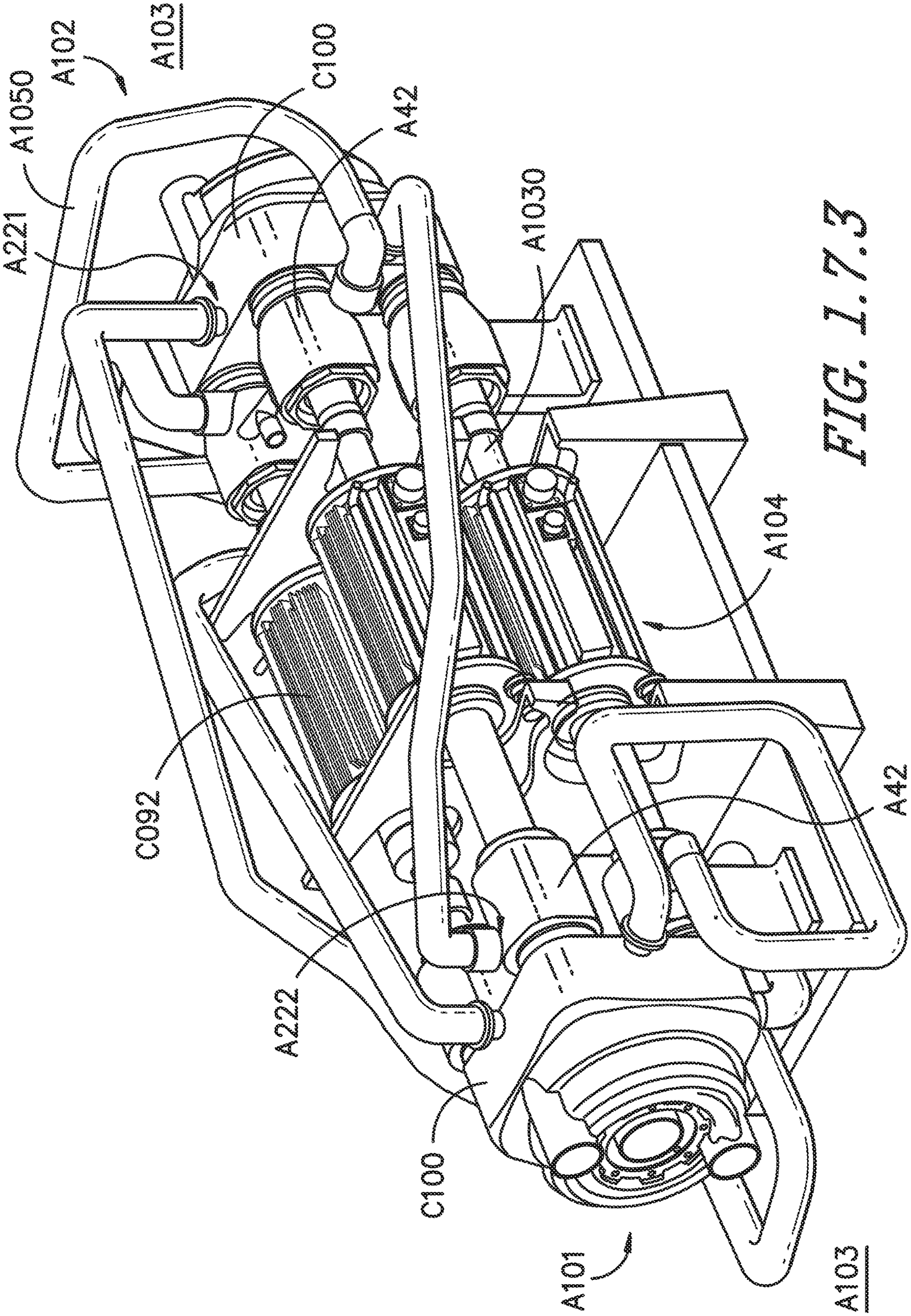
*FIG. 1.7.3*

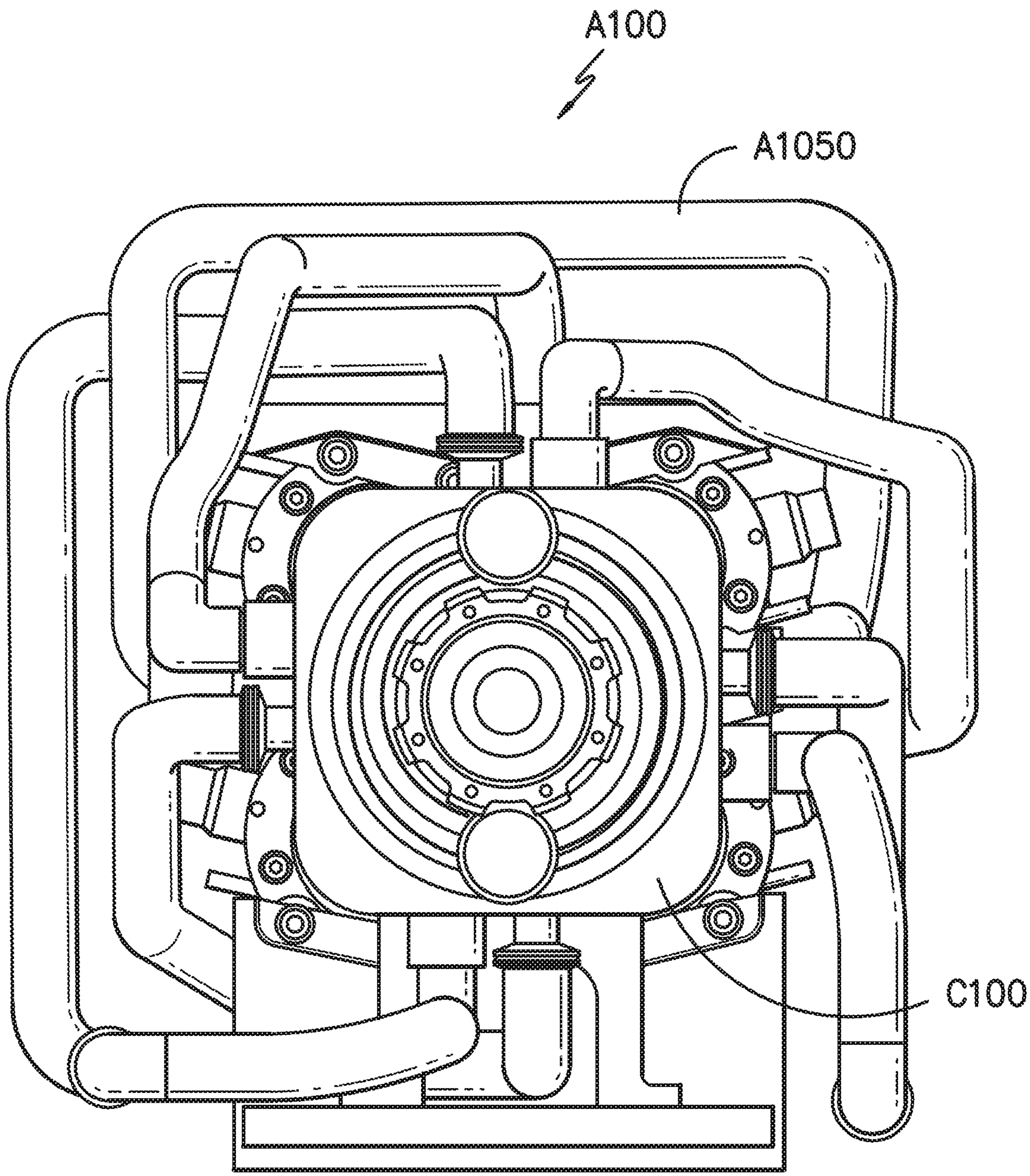
FIG. 1.7.4

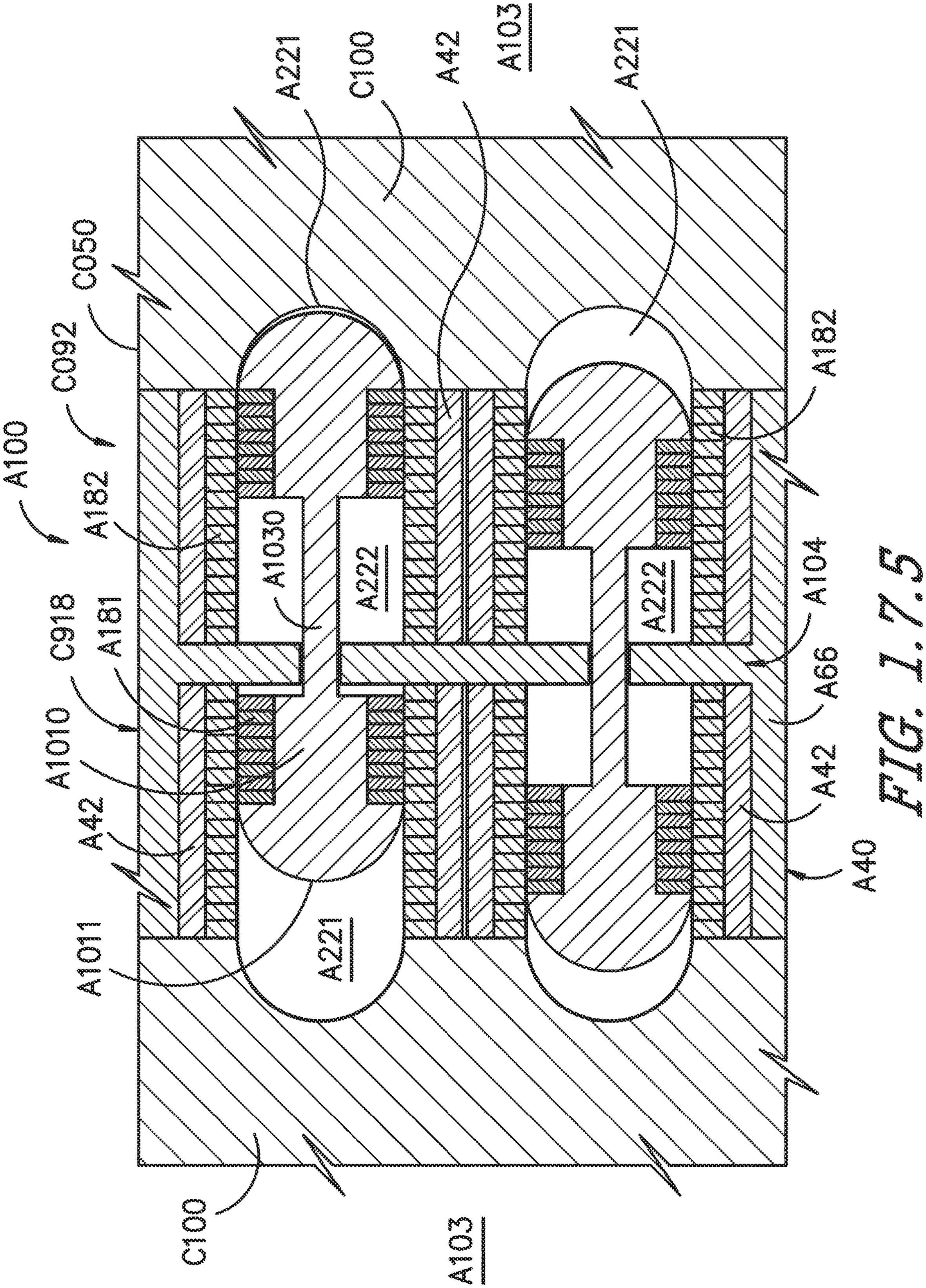
FIG. 1.7.5

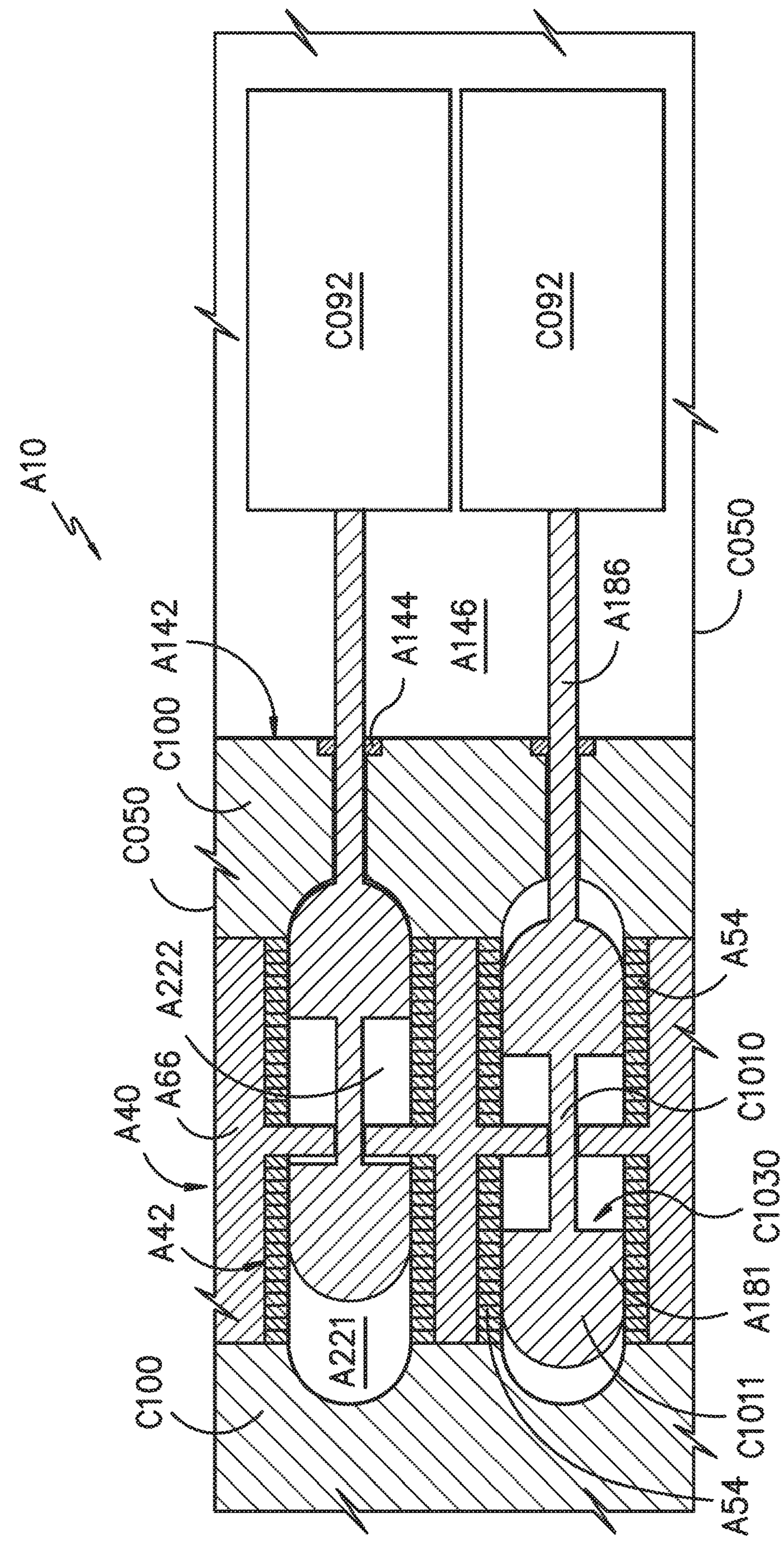
*FIG. 1.7.6*

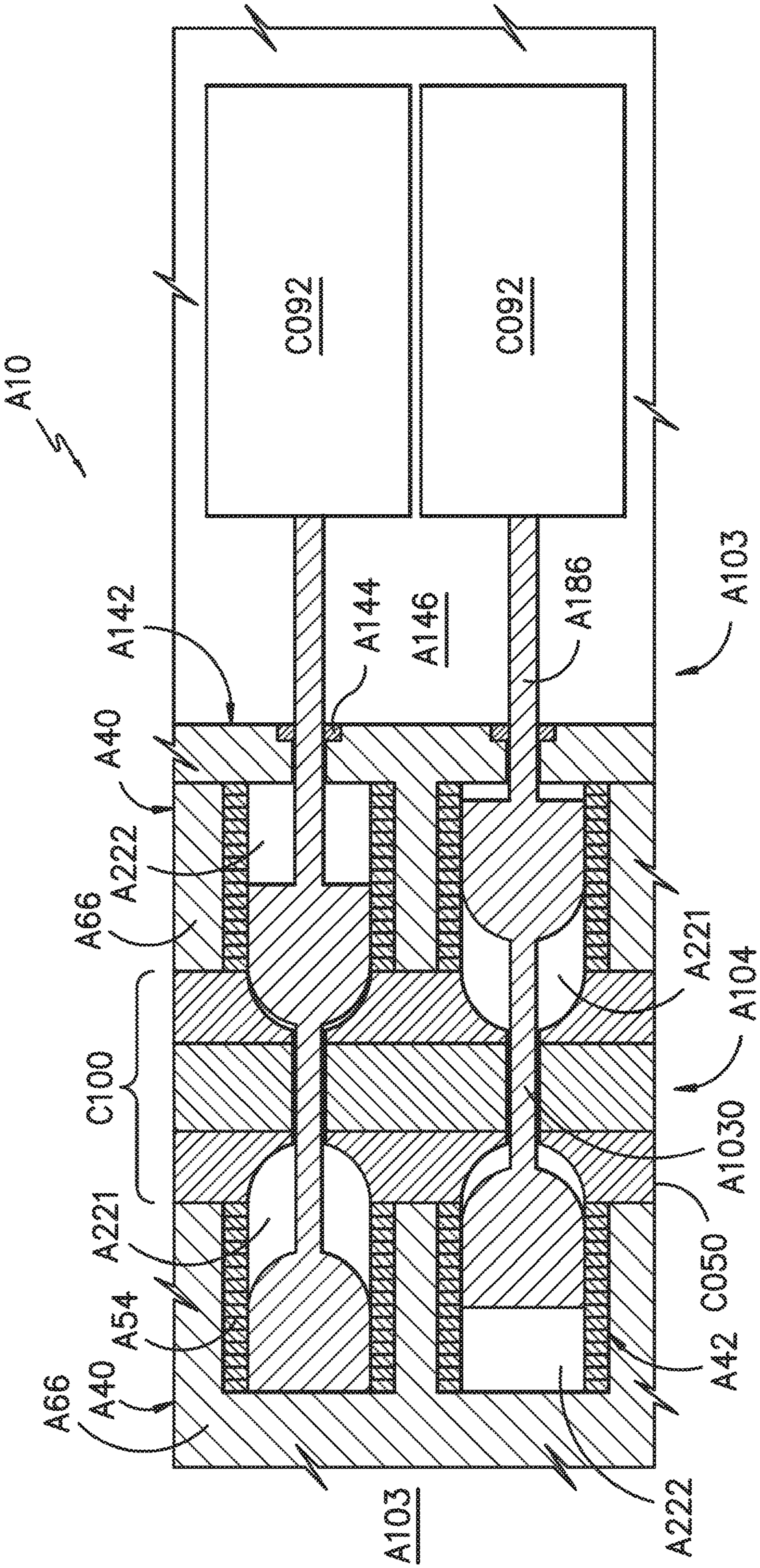
FIG. 1.7.7

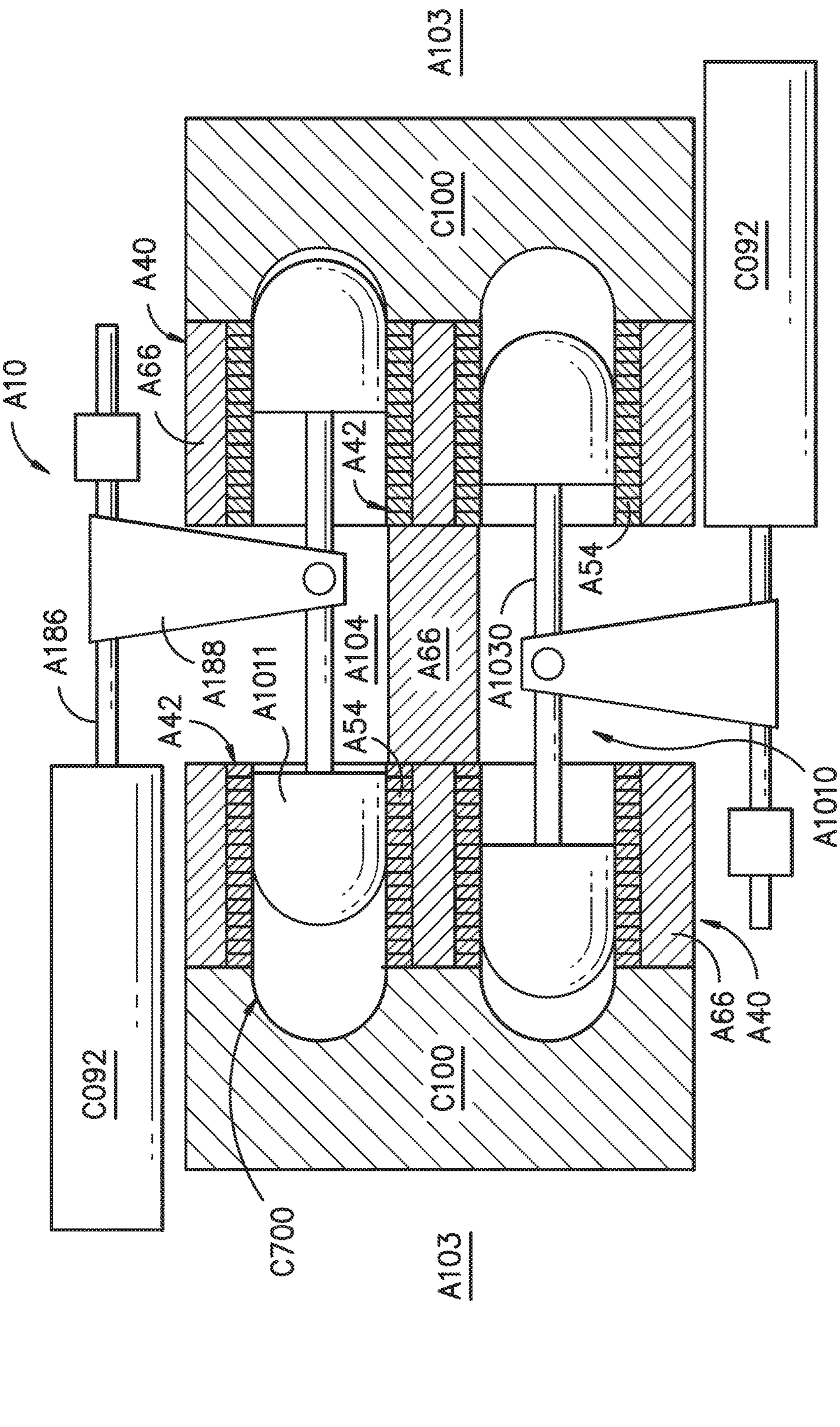
FIG. 1.7.8

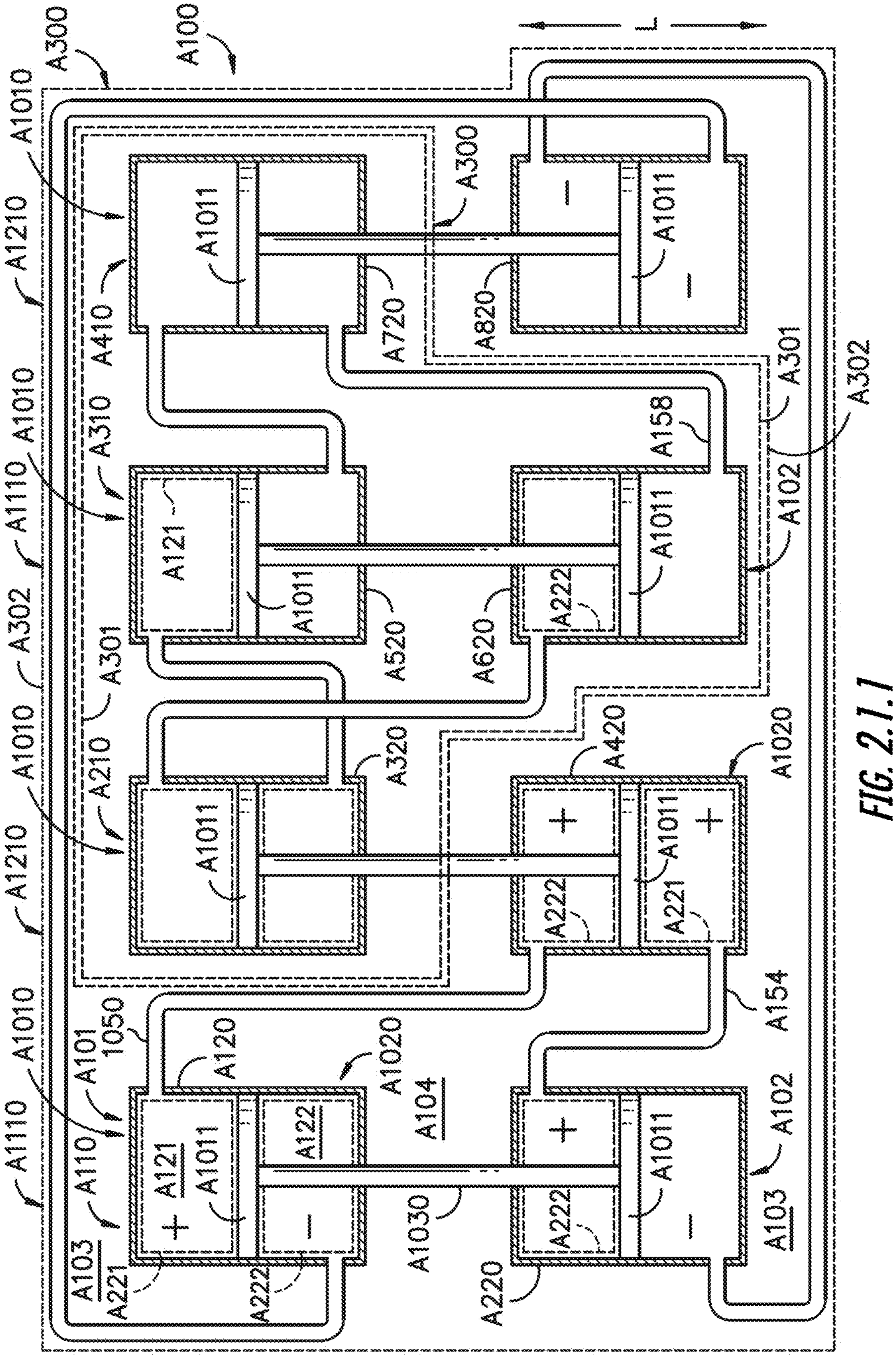
FIG. 2.1.1

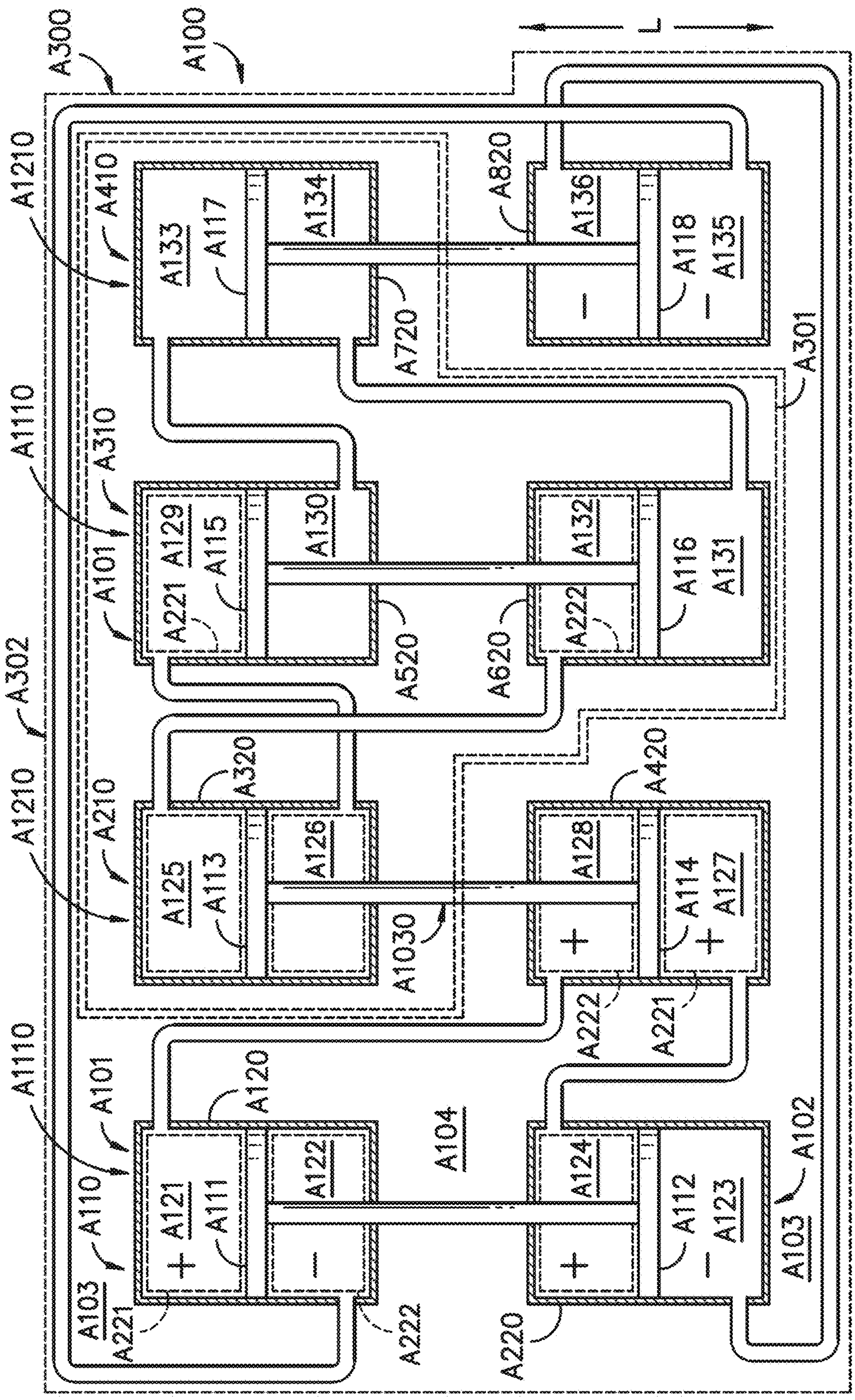
FIG. 2.1.2

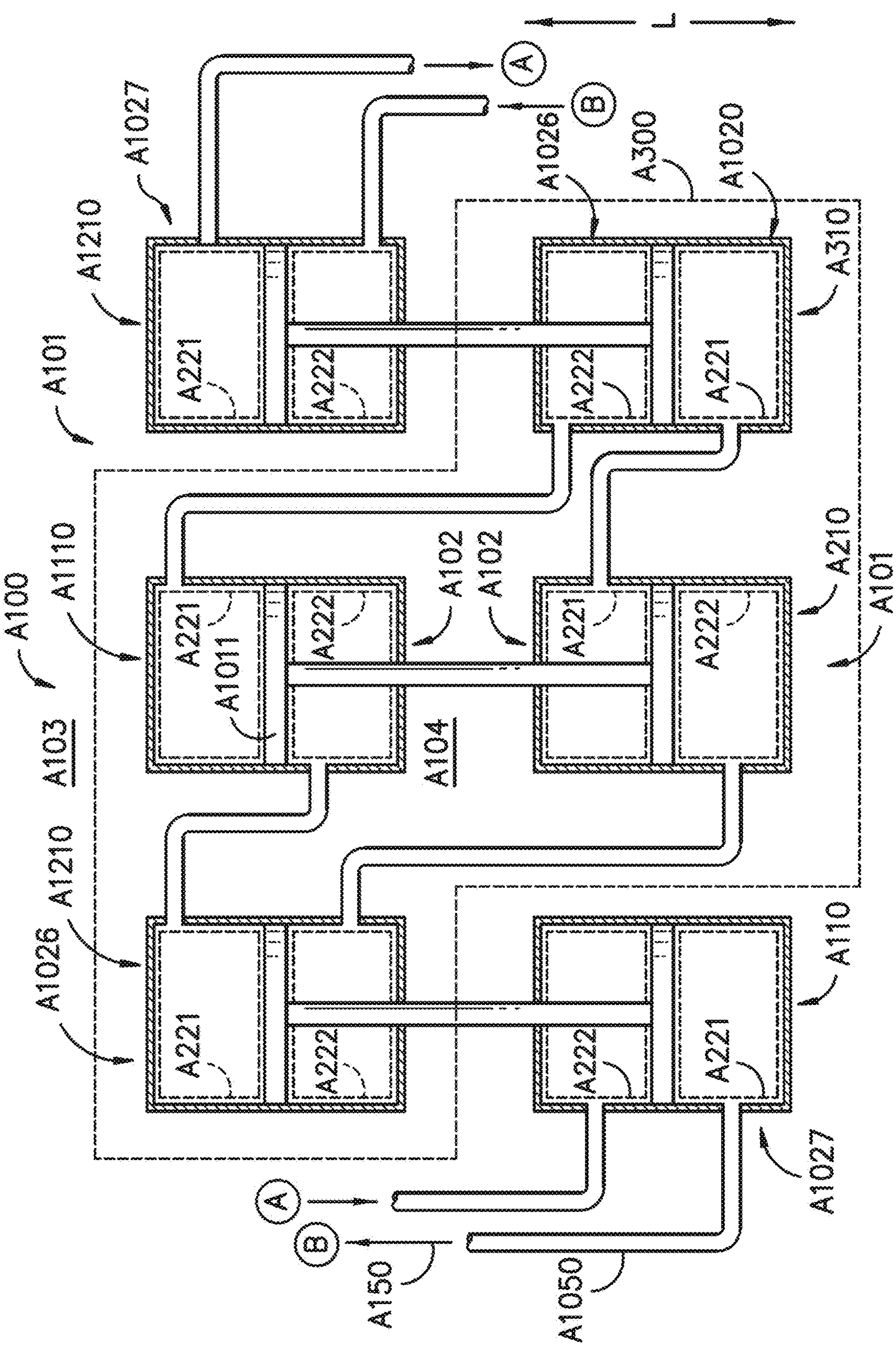
FIG. 2.1.3

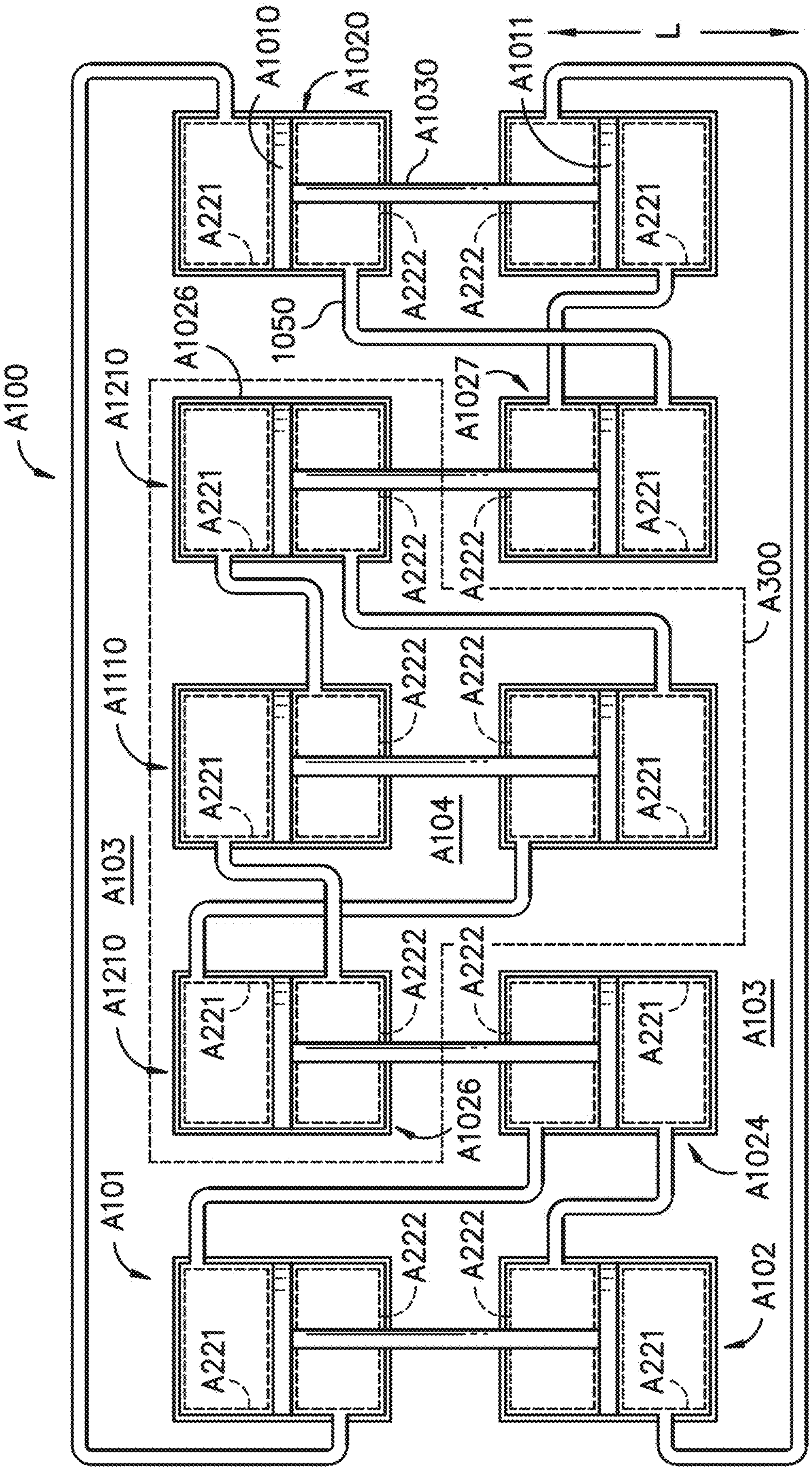
FIG. 2.1.4

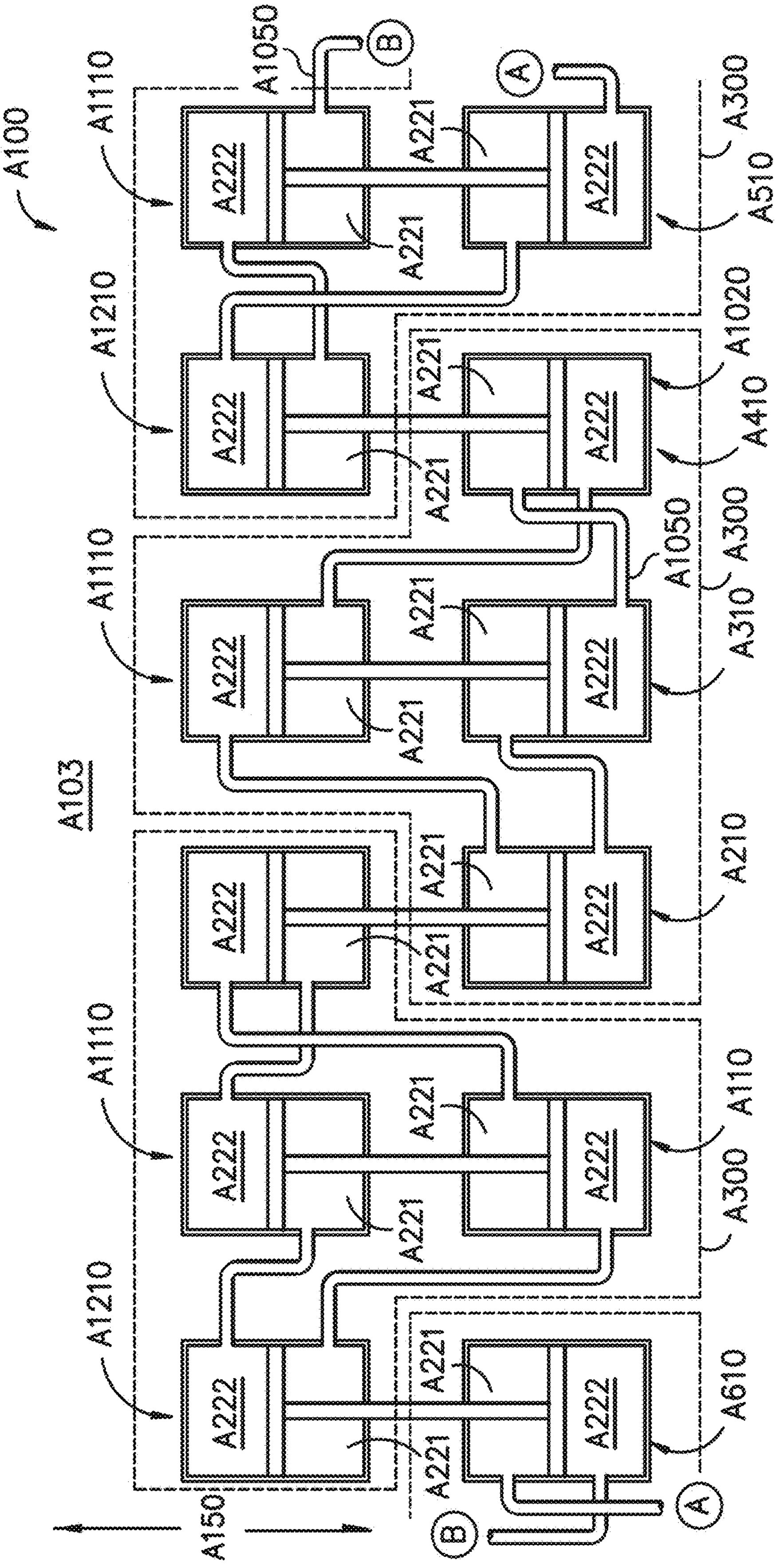
FIG. 2.1.5

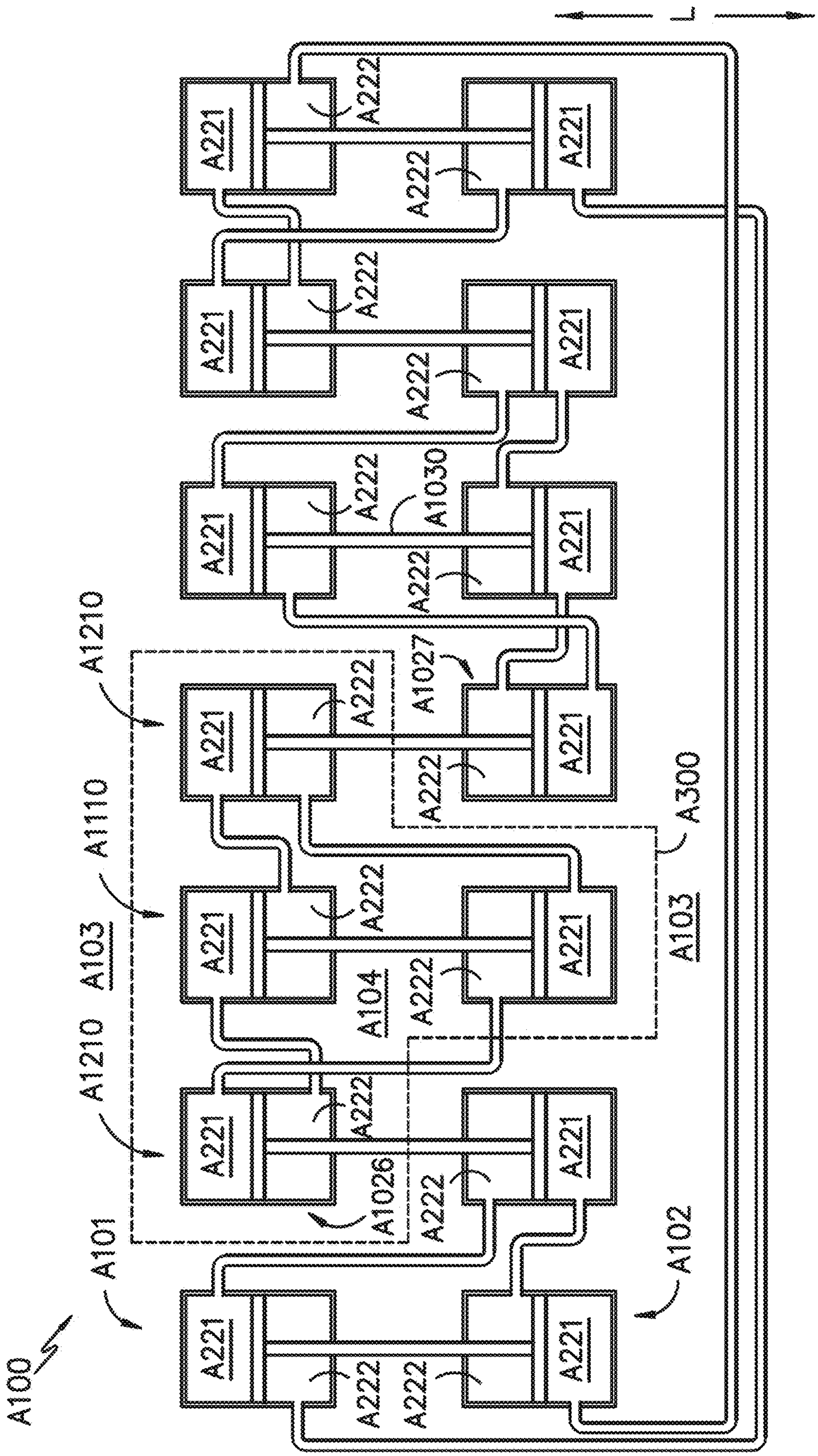
FIG. 2.1.6

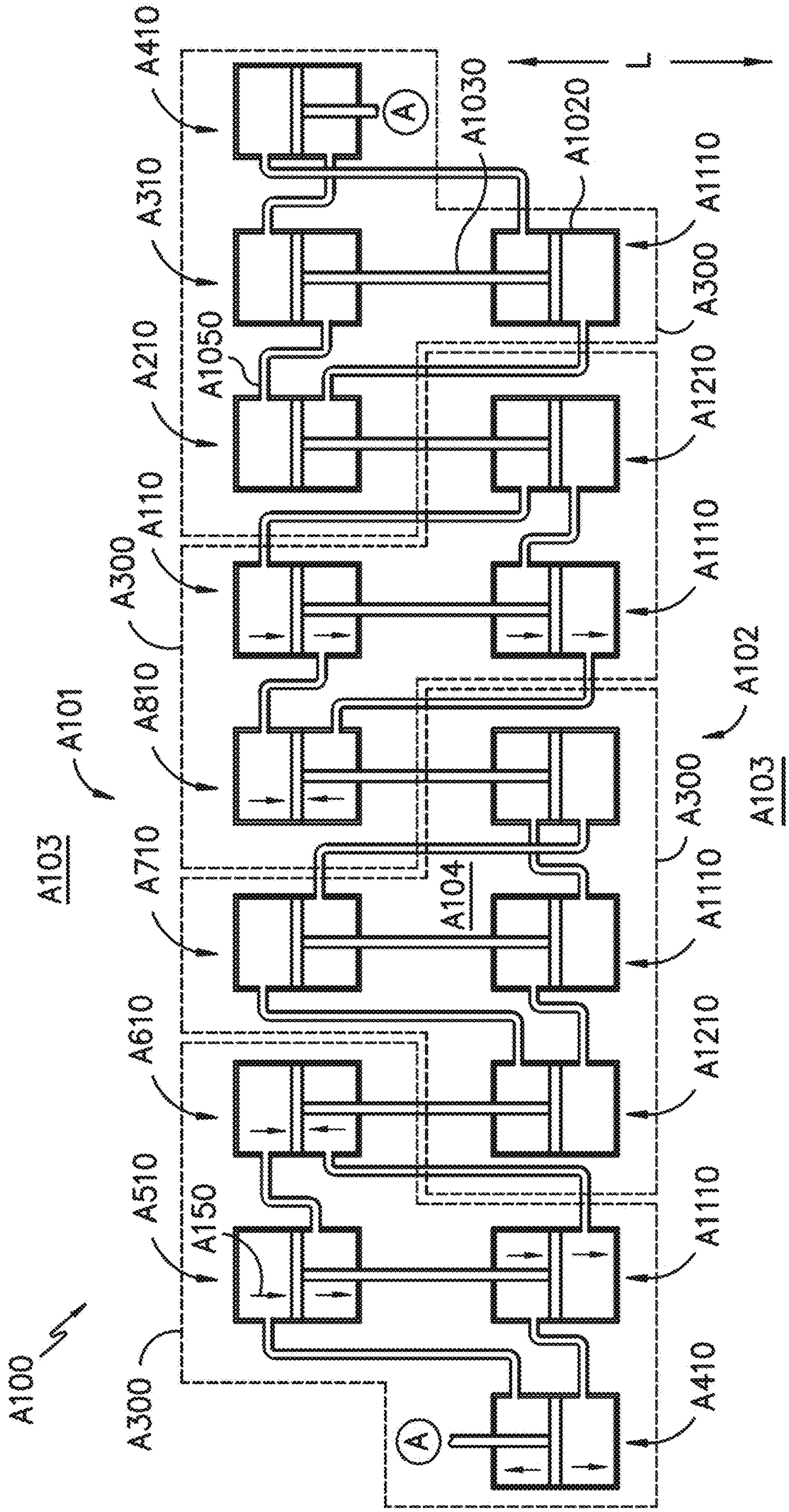
FIG. 2.1.7

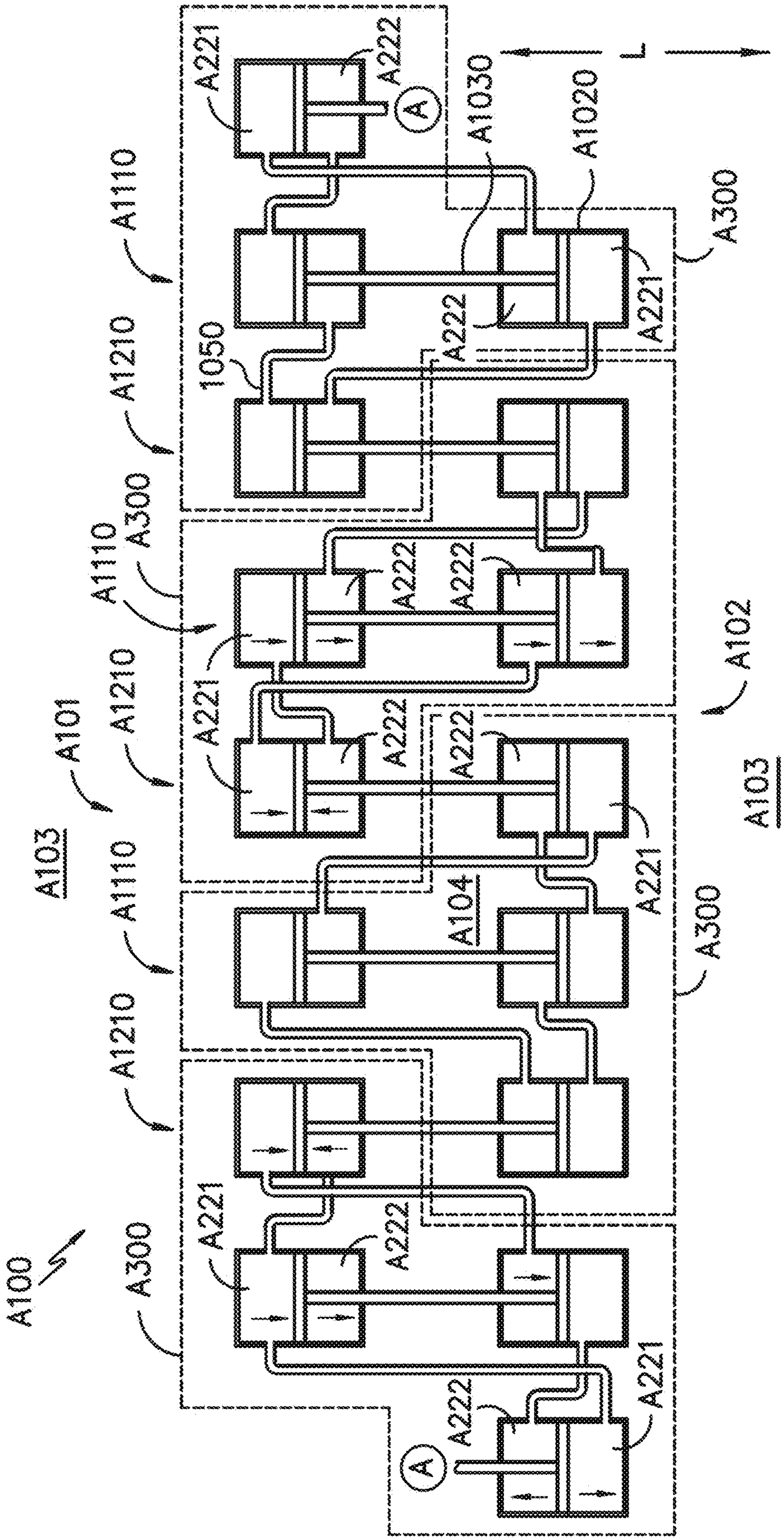
FIG. 2.1.8

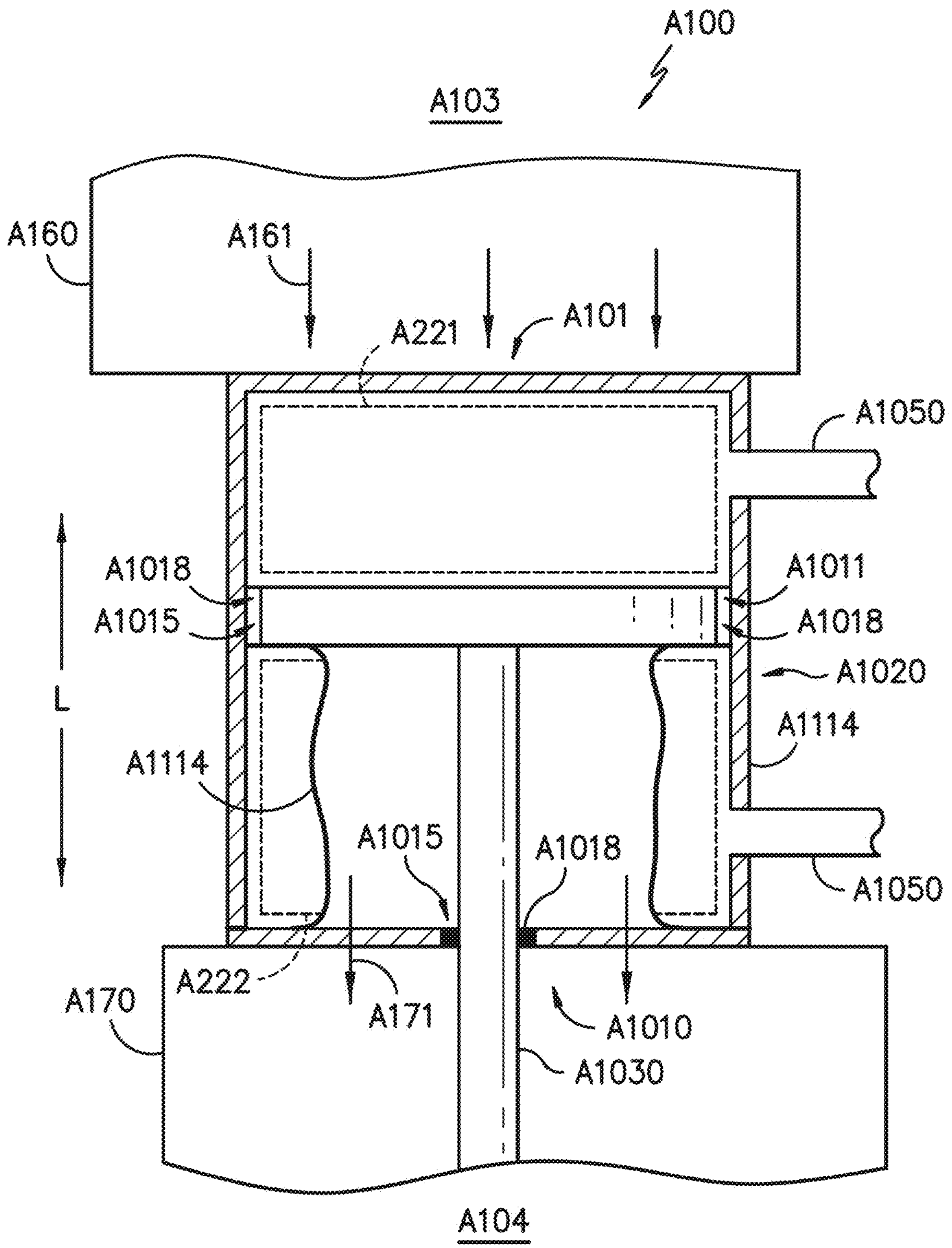
FIG. 2.2.1

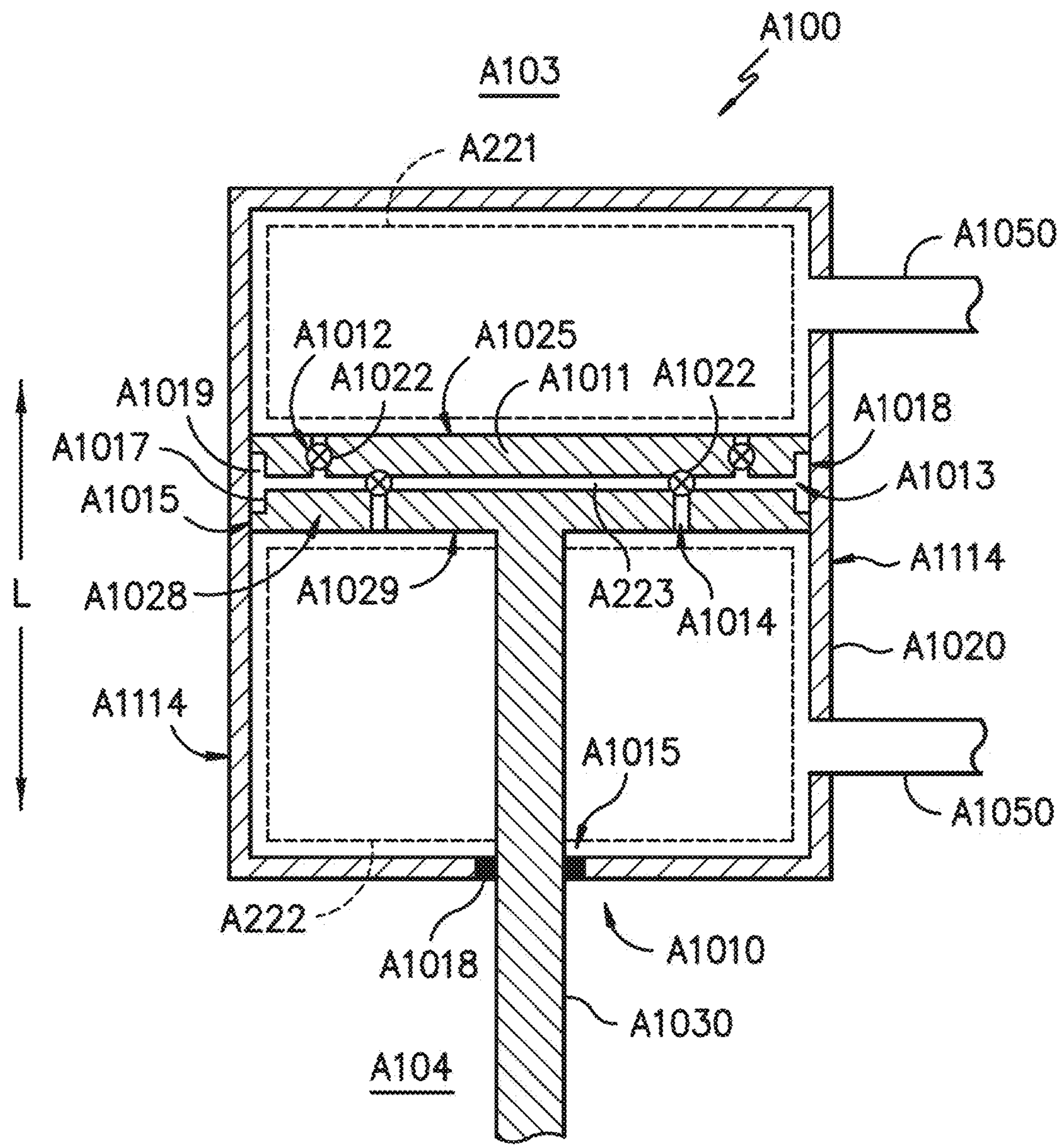
FIG. 2.2.2

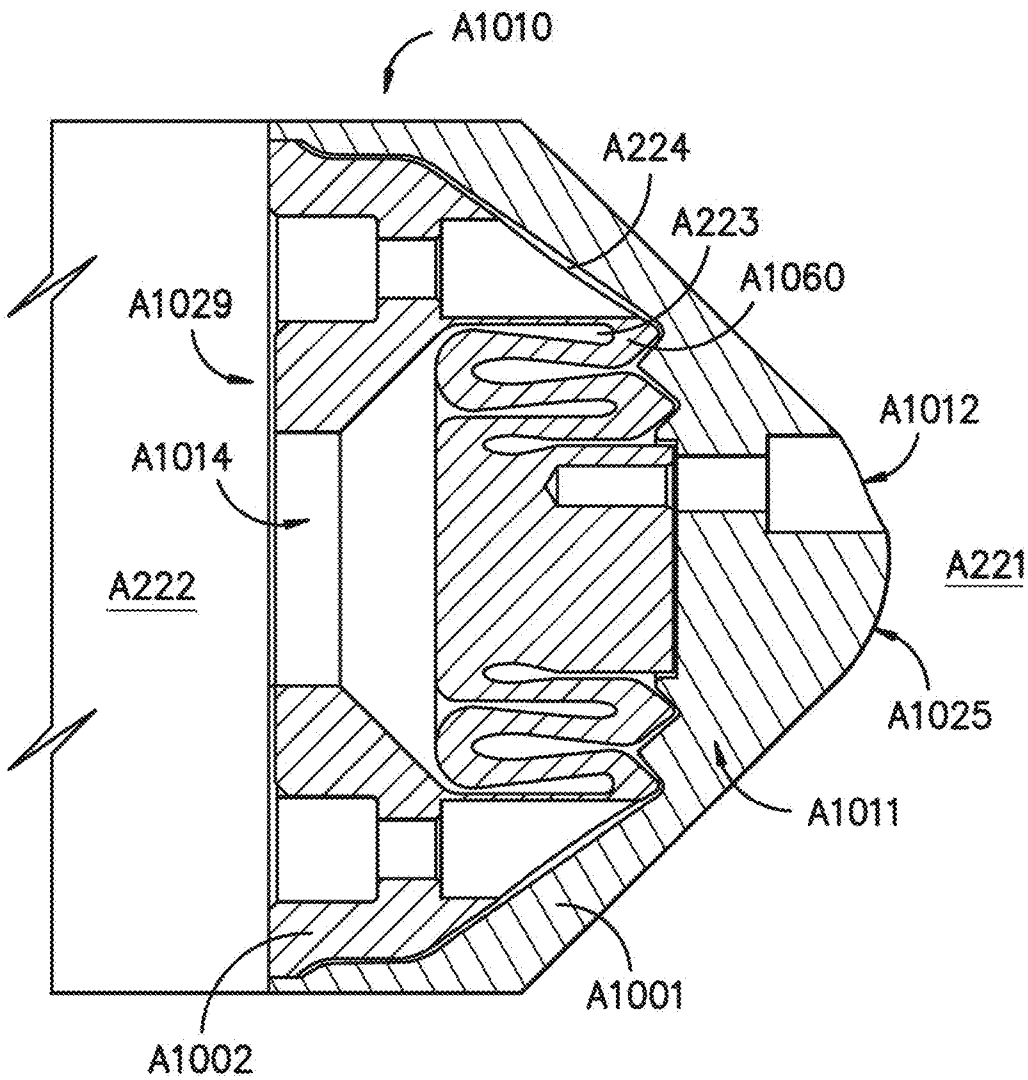
FIG. 2.2.3

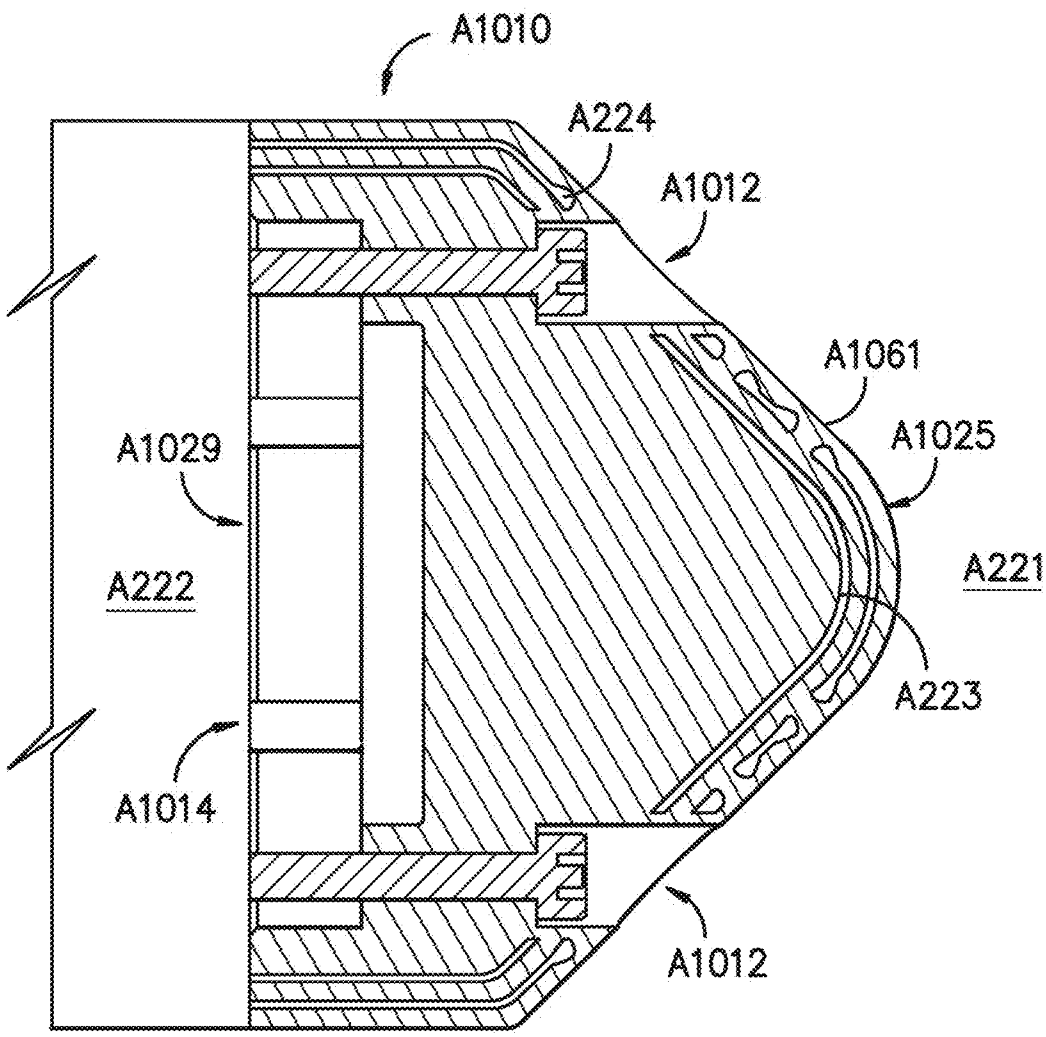
FIG. 2.2.4

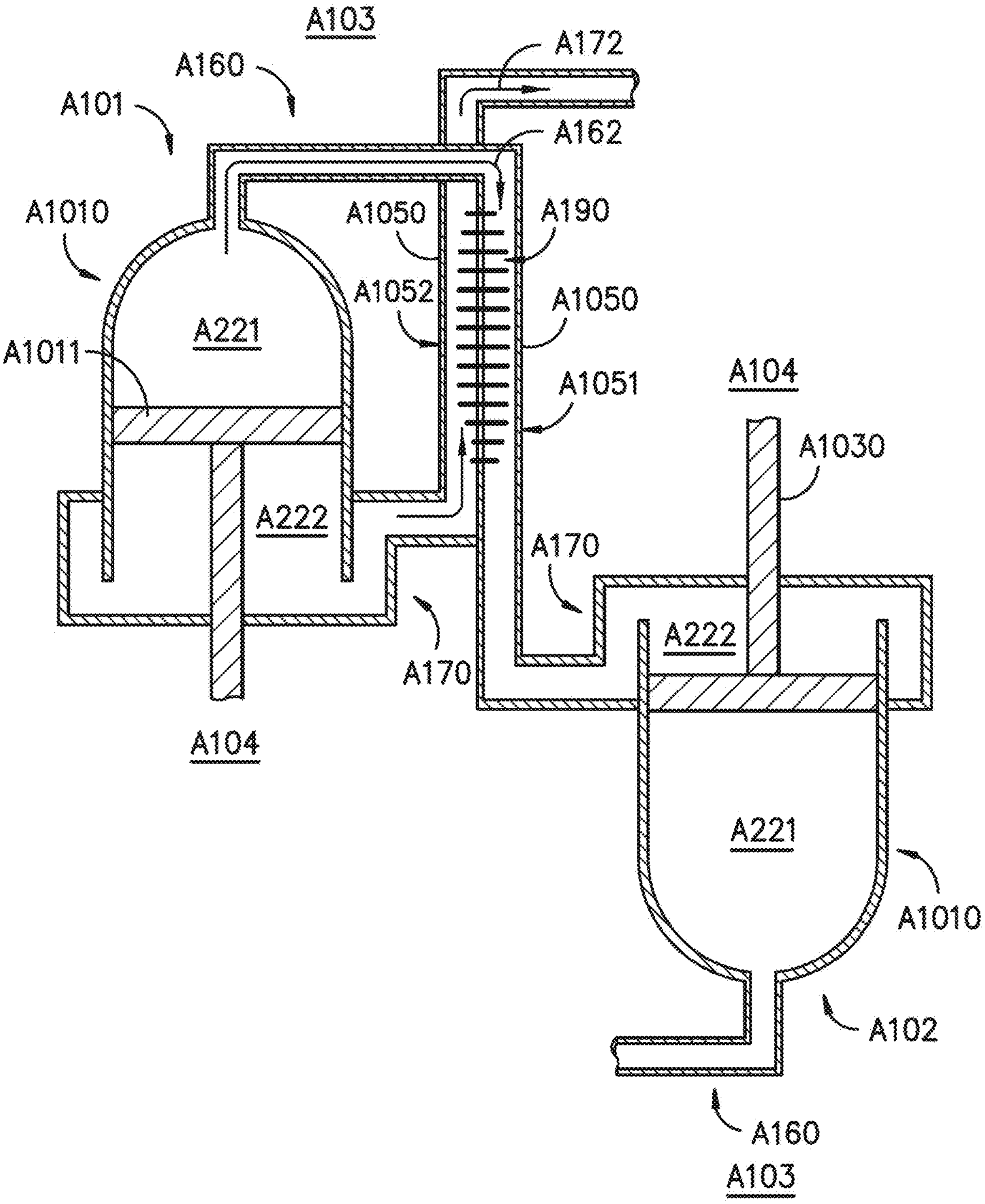
FIG. 2.3.1

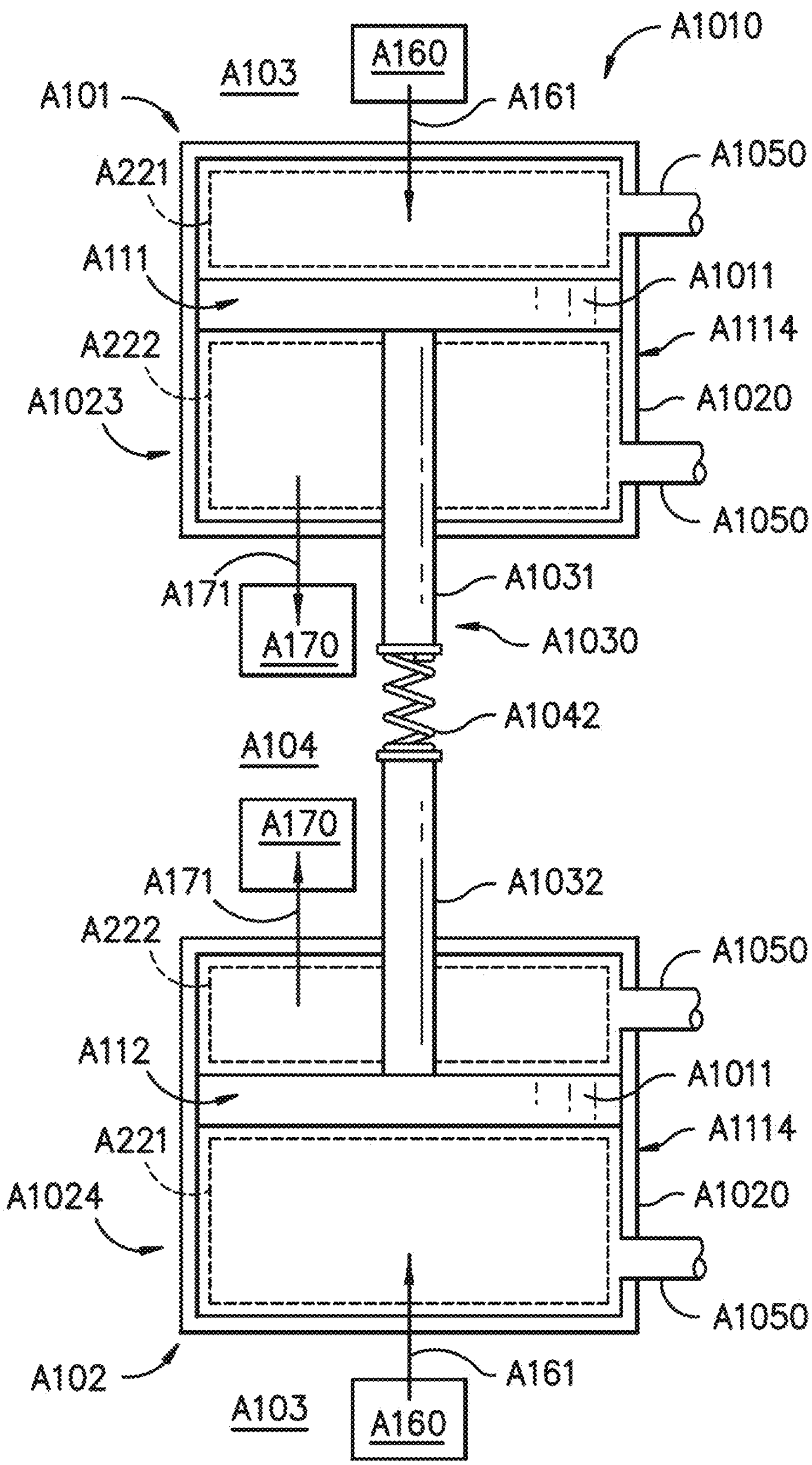
FIG. 2.4.1

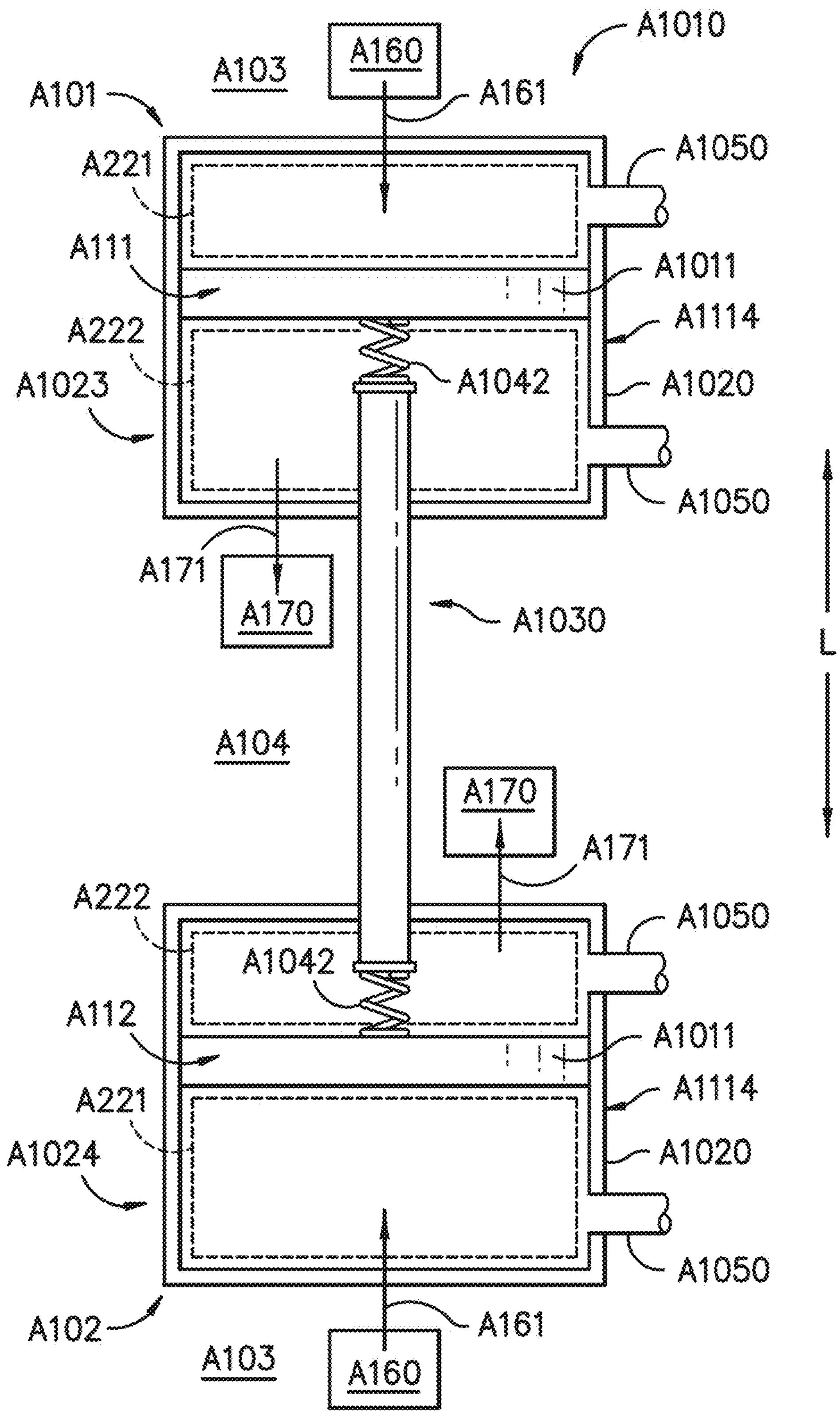
FIG. 2.4.2

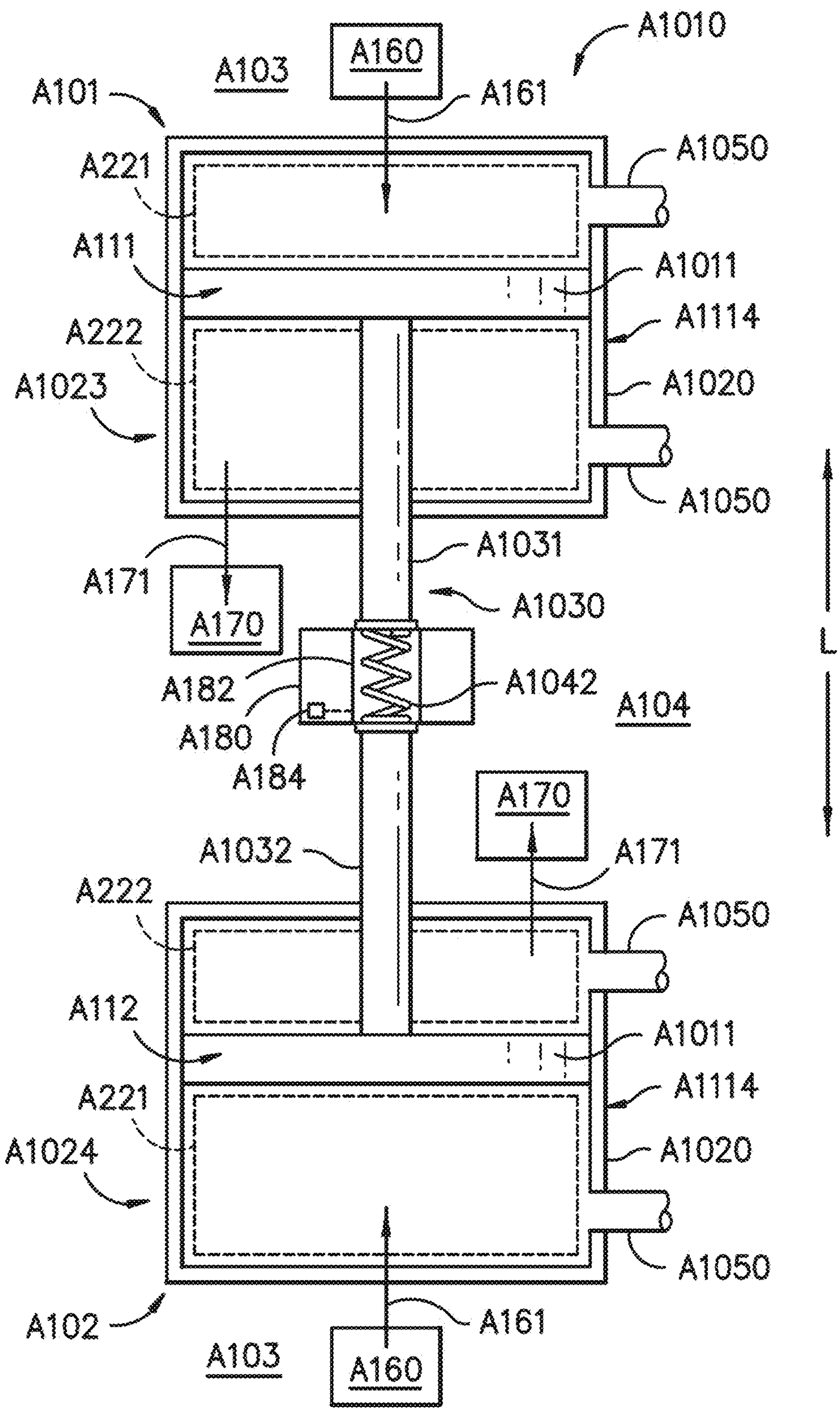
FIG. 2.4.3

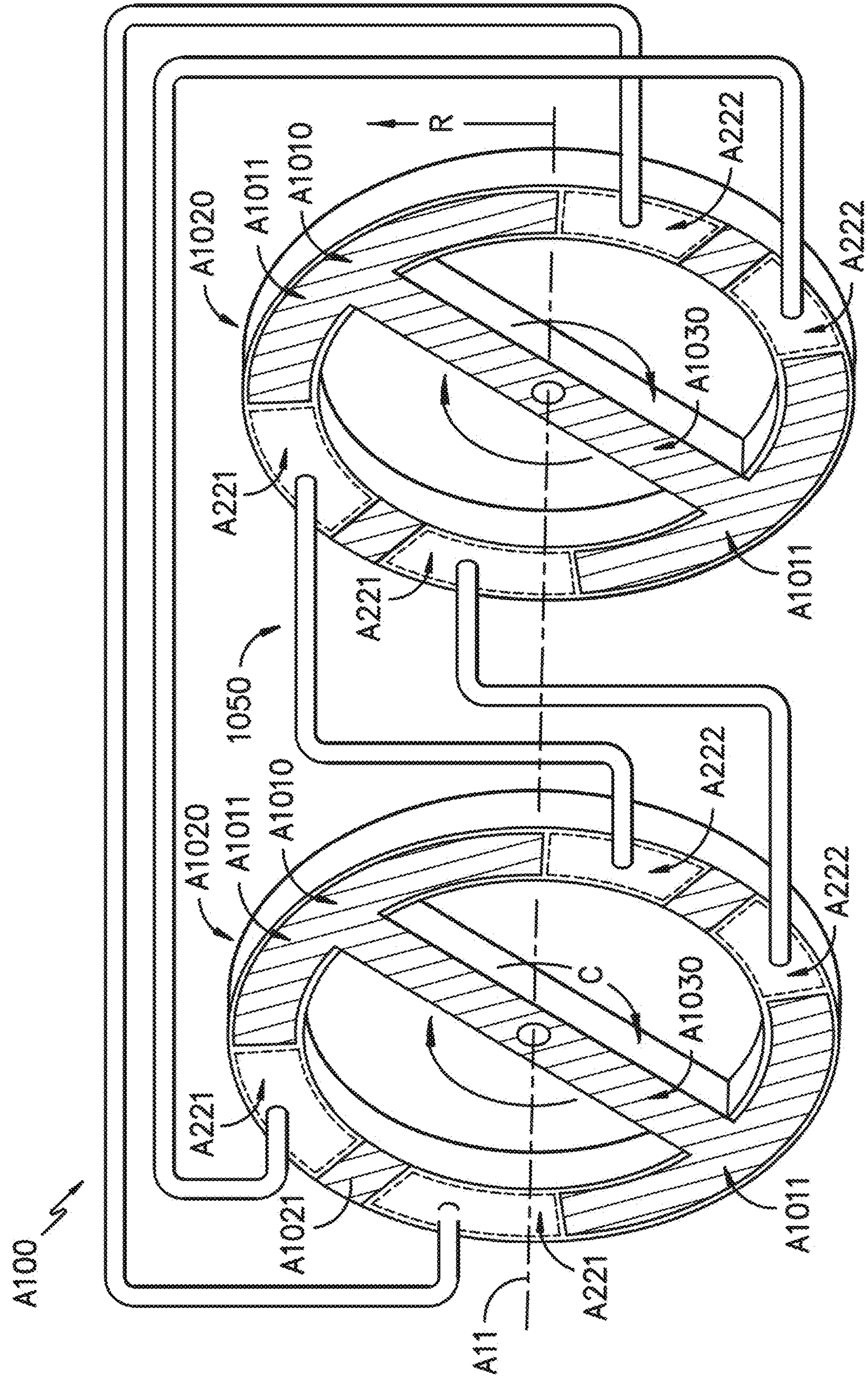
FIG. 2.5.1

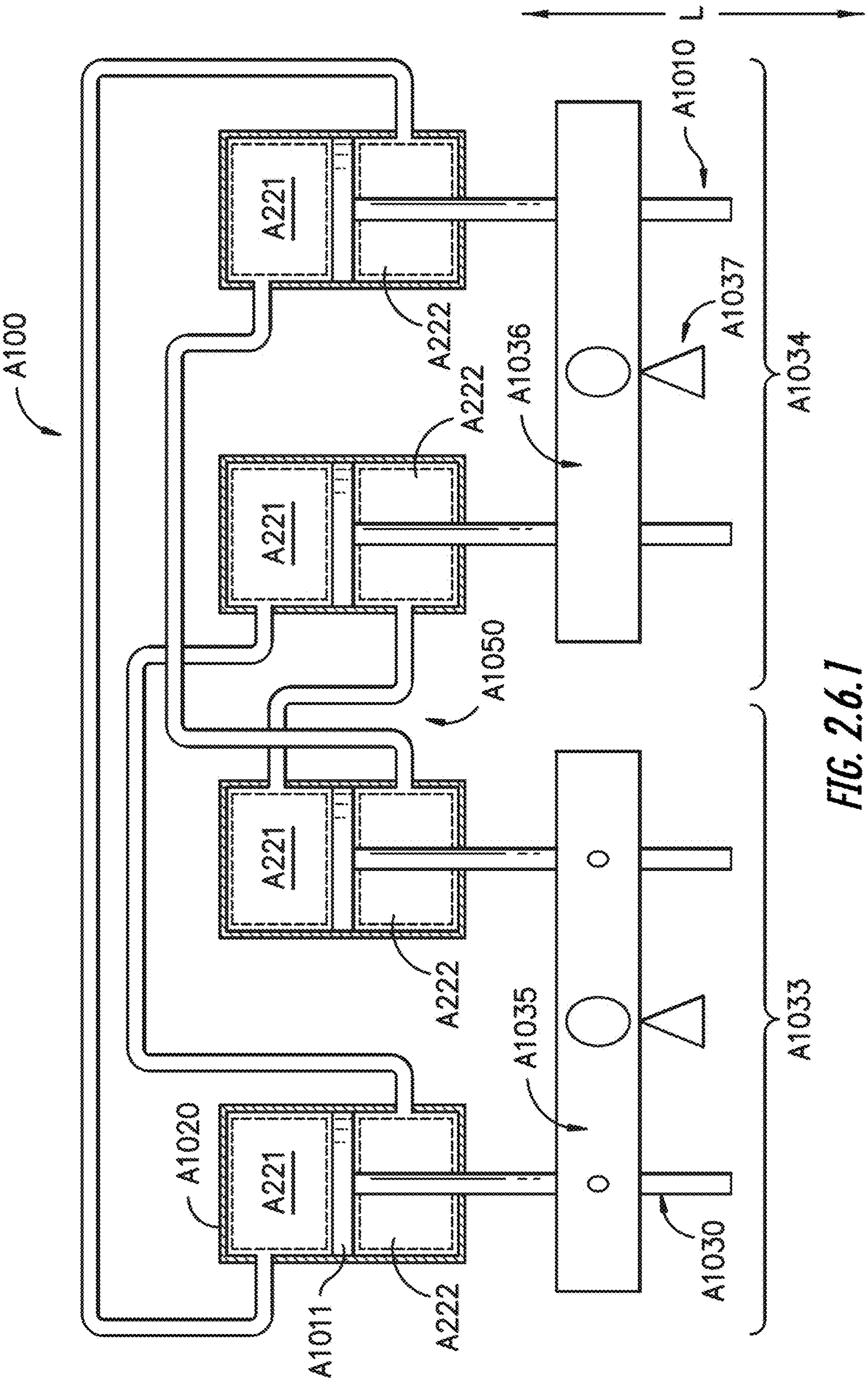
FIG. 2.6.1

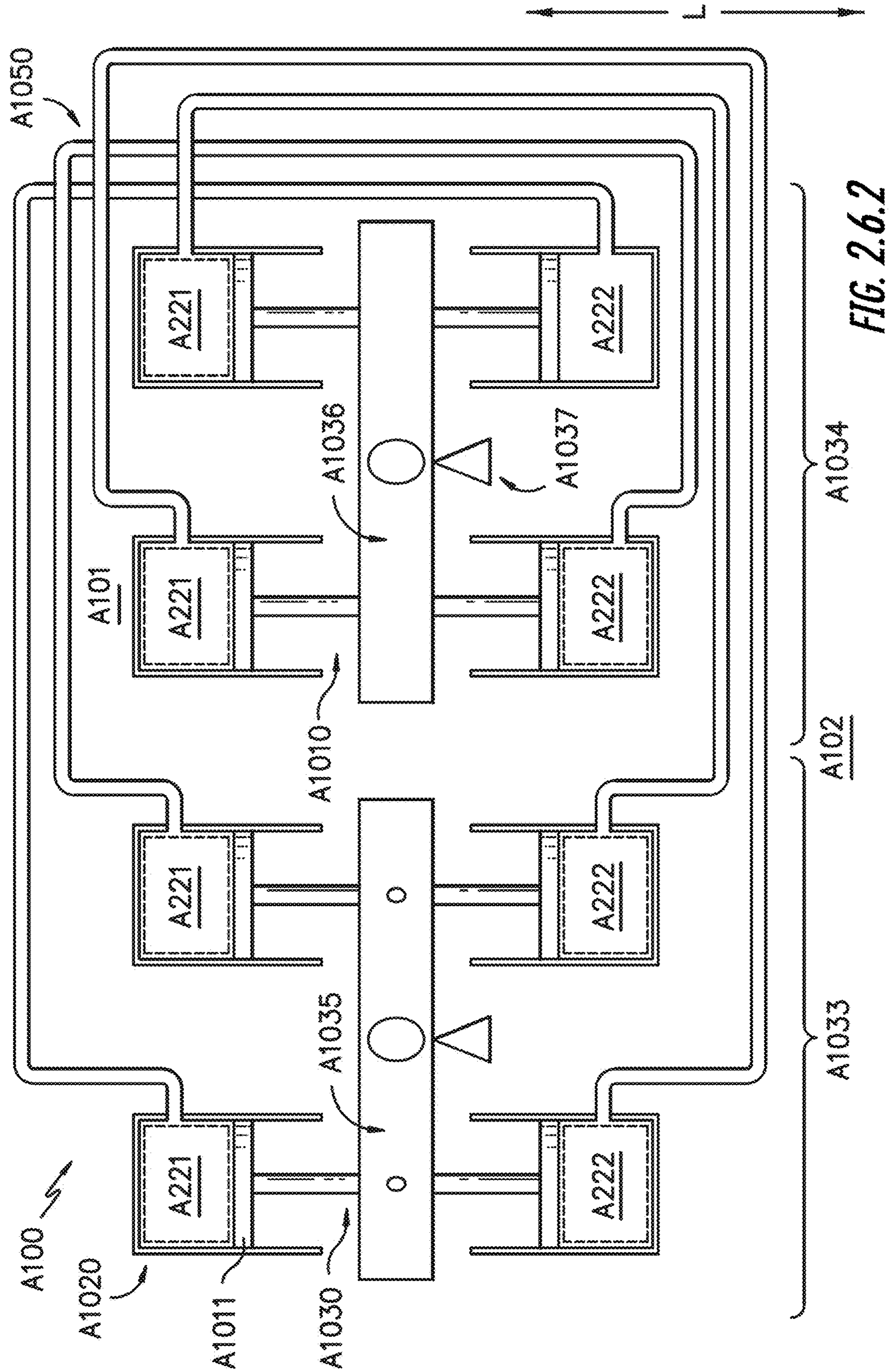
FIG. 2.6.2

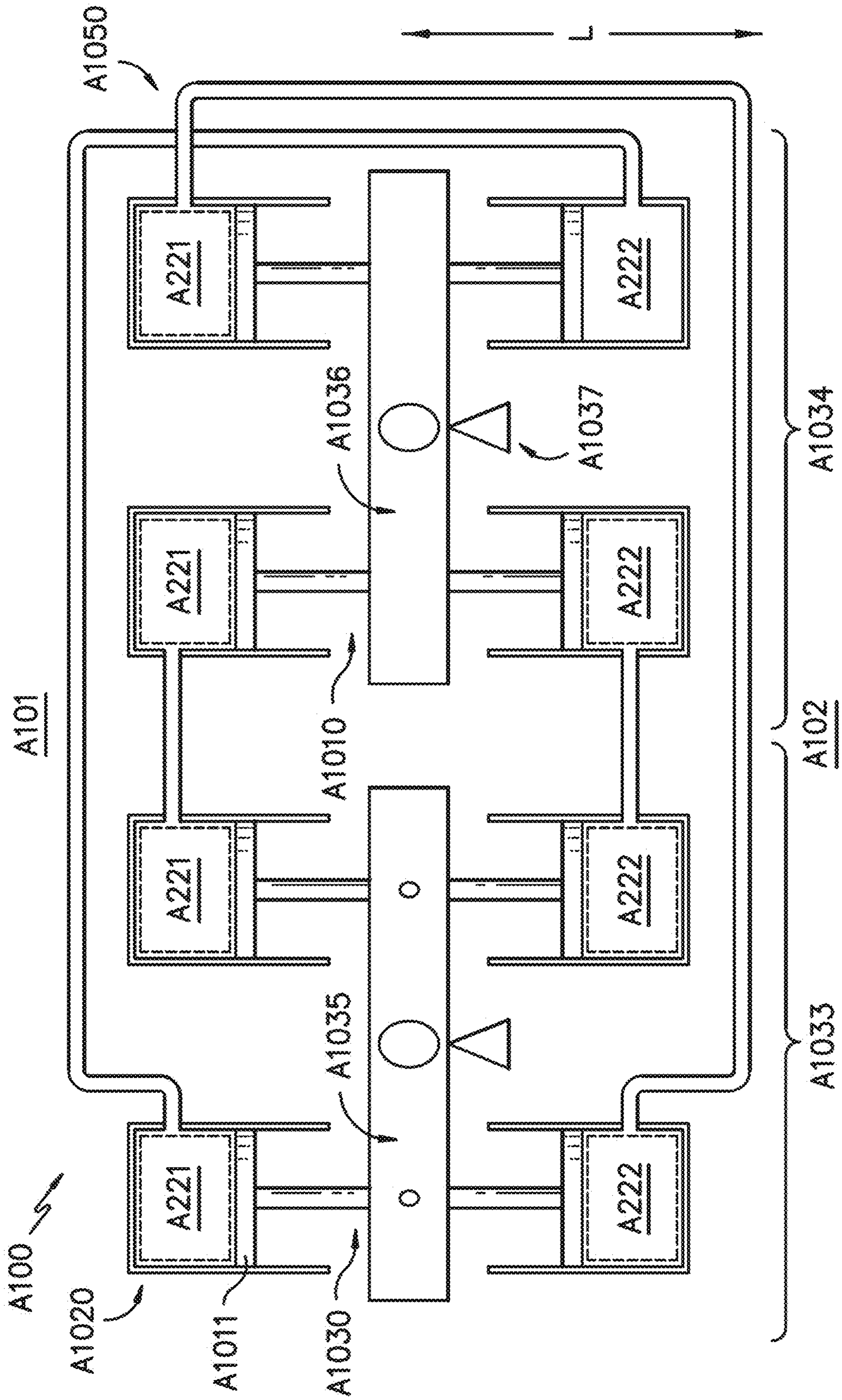
FIG. 2.6.3

ENGINE APPARATUS AND METHOD FOR OPERATION

CROSS-REFERENCE TO RELATED APPLICATIONS

The present application is a national stage application under 35 U.S.C. § 371 of PCT application serial number PCT/US2020/033710, filed May 20, 2020, which claims the benefit of the earliest available effective filing date of U.S. Provisional Patent Application No. 62/850,701, U.S. Provisional Patent Application No. 62/850,678, U.S. Provisional Patent Application No. 62/850,599, U.S. Provisional Patent Application No. 62/850,623, and U.S. Provisional Patent Application No. 62/850,692, each having a filing date of May 21, 2019, and each of which is incorporated herein by reference in its entirety.

FIELD

The present subject matter relates generally to energy conversion systems, power generation systems, and energy distribution systems. The present subject matter additionally relates to heat exchangers and heat exchanger systems. The present subject matter further relates to piston engine assemblies, such as closed-cycle engine systems. The present subject matter still further relates to systems and methods for control or operation of one or more systems of the present subject matter herein.

BACKGROUND

Power generation and distribution systems are challenged to provide improved power generation efficiency and/or lowered emissions. Furthermore, power generation and distribution systems are challenged to provide improved power output with lower transmission losses. Certain power generation and distribution systems are further challenged to improve sizing, portability, or power density generally while improving power generation efficiency, power output, and emissions.

Certain engine system arrangements, such as closed cycle engines, may offer some improved efficiency over other engine system arrangements. However, closed cycle engine arrangements, such as Stirling engines, are challenged to provide relatively larger power output or power density, or improved efficiency, relative to other engine arrangements. Closed cycle engines may suffer due to inefficient combustion, inefficient heat exchangers, inefficient mass transfer, heat losses to the environment, non-ideal behavior of the working fluid(s), imperfect seals, friction, pumping losses, and/or other inefficiencies and imperfections. As such, there is a need for improved closed cycle engines and system arrangements that may provide improved power output, improved power density, or further improved efficiency. Additionally, there is a need for an improved closed cycle engine that may be provided to improve power generation and power distribution systems.

Additionally, or alternatively, there is a general need for improved heat transfer devices, such as for heat engines, or as may be applied to power generation systems, distribution systems, propulsion systems, vehicle systems, or industrial or residential facilities.

Furthermore, there is a need for improved control system and methods for operating power generation systems as may include subsystems that collectively may provide improved power generation efficiency or reduced emissions.

BRIEF DESCRIPTION

Aspects and advantages of the invention will be set forth in part in the following description, or may be obvious from the description, or may be learned through practice of the invention.

An aspect of the present disclosure is directed to a system for energy conversion. The system includes a closed cycle engine containing a volume of working fluid, the engine comprising a first chamber defining an expansion chamber and a second chamber defining a compression chamber each separated by a piston attached to a connection member of a piston assembly, and wherein the engine comprises a heater body in thermal communication with the first chamber, and further wherein the engine comprises a cold side heat exchanger in thermal communication with the second chamber, and wherein a third chamber is defined within the piston, wherein the third chamber is in selective flow communication with the first chamber, the second chamber, or both.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure including the best mode, directed to one of ordinary skill in the art, is set forth in the specification, which makes reference to the appended figures, in which:

FIG. 1.1.1 is a graph depicting power demand as a function of time of day;

FIG. 1.1.2 is a graph depicting power demand versus energy supply from various power generation and distribution systems and a forecasted gap in supply and demand brought to power generation and distribution by an increase in electric load demand;

FIG. 1.1.3 is a graph depicting Carnot efficiency versus temperature ratio;

FIG. 1.1.4 is a graph depicting thermal efficiency versus power output;

FIG. 1.1.5 is a chart depicting nominal heat balances of prime-movers as a percentage of fuel input;

FIG. 1.2.1 is a schematic block diagram depicting a system for energy conversion according to an aspect of the present disclosure;

FIG. 1.3.1 is a cross sectional view of an exemplary embodiment of a closed cycle engine and load device according to an aspect of the present disclosure;

FIG. 1.3.2 is a perspective cutaway view of an exemplary portion of an exemplary embodiment of an engine according to an aspect of the present disclosure;

FIG. 1.7.1 is a side view of an exemplary embodiment of a portion of an engine according to an aspect of the present disclosure;

FIG. 1.7.2 is a perspective view of an exemplary embodiment of a portion of an engine such as provided in regard to FIG. 1.7.1;

FIG. 1.7.3 is another perspective view of an exemplary embodiment of a portion of an engine such as provided in regard to FIGS. 1.7.1 through FIG. 1.7.2;

FIG. 1.7.4 is an end view of an exemplary embodiment of a portion of an engine such as provided in regard to FIGS. 1.7.1 through FIG. 1.7.2;

FIG. 1.7.5 is a schematic view of an embodiment of an arrangement of a portion of a system including an engine and a load device according to an aspect of the present disclosure;

FIG. 1.7.6 is a schematic view of another embodiment of an arrangement of a portion of a system including an engine and a load device according to an aspect of the present disclosure;

FIG. 1.7.7 is a schematic view of yet another embodiment of an arrangement of a portion of a system including an engine and a load device according to an aspect of the present disclosure;

FIG. 1.7.8 is a schematic view of still another embodiment of an arrangement of a portion of a system including an engine and a load device according to an aspect of the present disclosure;

FIG. 2.1.1 is an exemplary schematic layout view of an embodiment of a piston engine apparatus according to aspects of the present disclosure;

FIG. 2.1.2 is an exemplary schematic layout view of an embodiment of a piston engine apparatus according to aspects of the present disclosure;

FIG. 2.1.3 is an exemplary schematic layout view of a three-piston assembly embodiment of a piston engine apparatus according to aspects of the present disclosure;

FIG. 2.1.4 is an exemplary schematic layout view of a five-piston assembly embodiment of a piston engine apparatus according to aspects of the present disclosure;

FIG. 2.1.5 is an exemplary schematic layout view of a six-piston assembly embodiment of a piston engine apparatus according to aspects of the present disclosure;

FIG. 2.1.6 is an exemplary schematic layout view of a seven-piston assembly embodiment of a piston engine apparatus according to aspects of the present disclosure;

FIG. 2.1.7 is an exemplary schematic layout view of an eight-piston assembly embodiment of a piston engine apparatus according to aspects of the present disclosure;

FIG. 2.1.8 is an exemplary schematic layout view of another eight-piston assembly embodiment of a piston engine apparatus according to aspects of the present disclosure;

FIG. 2.2.1 is an exemplary schematic layout view of an embodiment of a portion of a piston assembly of the apparatus according to aspects of the present disclosure;

FIG. 2.2.2 is an exemplary schematic layout view of another embodiment of a portion of a piston assembly of the apparatus according to aspects of the present disclosure;

FIG. 2.2.3 is an exemplary cross-sectional view of an embodiment of a portion of a piston assembly of the apparatus according to aspects of the present disclosure;

FIG. 2.2.4 is an exemplary cross-sectional view of another embodiment of a portion of a piston assembly of the apparatus according to aspects of the present disclosure;

FIG. 2.3.1 depict exemplary embodiments of a heat exchanger at the apparatus according to aspects of the present disclosure;

FIG. 2.4.1 is an exemplary embodiment of a piston assembly of the apparatus according to aspects of the present disclosure;

FIG. 2.4.2 is another exemplary embodiment of a piston assembly of the apparatus according to aspects of the present disclosure;

FIG. 2.4.3 is yet another exemplary embodiment of a piston assembly of the apparatus according to aspects of the present disclosure;

FIG. 2.5.1 is an exemplary embodiment of a piston engine apparatus according to aspects of the present disclosure;

FIG. 2.6.1 is an exemplary embodiment of a piston engine apparatus according to aspects of the present disclosure;

FIG. 2.6.2 is an exemplary embodiment of a piston engine apparatus according to aspects of the present disclosure; and FIG. 2.6.3 is an exemplary embodiment of a piston engine apparatus according to aspects of the present disclosure.

Repeat use of reference characters in the present specification and drawings is intended to represent the same or analogous features or elements of the present disclosure.

DETAILED DESCRIPTION

Reference now will be made in detail to embodiments of the disclosure, one or more examples of which are illustrated in the drawings. Each example is provided by way of explanation of the disclosure and not limitation. In fact, it will be apparent to those skilled in the art that various modifications and variations can be made in the present disclosure without departing from the scope of the disclosure. For instance, features illustrated or described as part of one embodiment can be used with another embodiment to yield a still further embodiment. In another instance, ranges, ratios, or limits associated herein may be altered to provide further embodiments, and all such embodiments are within the scope of the present disclosure. Unless otherwise specified, in various embodiments in which a unit is provided relative to a ratio, range, or limit, units may be altered, and/or subsequently, ranges, ratios, or limits associated thereto are within the scope of the present disclosure. Thus, it is intended that the present disclosure covers such modifications and variations as come within the scope of the appended claims and their equivalents.

As used herein, the terms “first”, “second”, and “third” may be used interchangeably to distinguish one component from another and are not intended to signify location or importance of the individual components.

The terms “upstream” and “downstream” refer to the relative direction with respect to fluid flow in a fluid pathway. For example, “upstream” refers to the direction from which the fluid flows, and “downstream” refers to the direction to which the fluid flows. The term “loop” can be any suitable fluid pathway along which fluid can flow and can be either open or closed, unless stated otherwise.

Generation, Conversion, and Distribution Systems

Power Generation, Engine and Energy Conversion Systems, and Energy Distribution Systems Power generation and distribution systems are generally challenged to reduce production inefficiencies, transmission losses, and emissions (e.g., oxides of nitrogen, sulfur, or carbon) during and post energy production. For example, the U.S. Energy Information Administration (EIA) estimates that electricity transmission and distribution (T&D) losses average about 5% annually in the United States, with other estimates of line losses of 8% or higher. With average power plant efficiencies in the United States of about 30% to 40%, overall electrical efficiency at the end user (e.g., residences, businesses, etc.) is approximately 25% to 35%. Local, distributed, or on-demand power generation may not require access to T&D networks or grids, such as to result in an at least 5% improvement in efficiency, in addition to reducing emission and adverse environmental impacts.

In the United States, power generation may account for approximately one-third of national greenhouse gas emissions. Transportation may further account for another approximately one-third of national greenhouse gas emissions, about 85% of which may be from ground transportation vehicles (e.g., cars, trucks, buses, etc.). Known systems for reducing emissions include chemical or catalytic reduction after-treatment. However, such systems may be expensive to acquire and maintain, complex, or heavy, thereby reducing overall system efficiency. Additionally, such systems may be difficult to regulate, such that emissions reduction benefits may be lost after initial acquisition. Furthermore, although known systems have resulted in reducing emissions of high reactive gases such as unburned hydrocarbons, volatile organic compounds, or oxides of sulfur or nitrogen, emissions of greenhouse gases such as carbon dioxide may generally correspond or increase with power generation and consumption.

Power generation and distribution systems may turn to renewable energy sources such as solar, wind, or tidal energy to reduce emissions. However, renewable energy sources are often periodic or unpredictable, such as depicted in FIG. 1.1.1 and FIG. 1.1.2. For example, referring to FIGS. 1.1.1-FIG. 1.1.2, available sunlight for solar power generation is dependent on the time of day and weather. As another example, wind power generation is dependent on weather patterns and may be both unpredictable and irregular. As still another example, tidal power generation is dependent on currents and lunar phases. Additionally, renewable energy sources are difficult to incorporate to transportation systems due to size, scale, and desired power output and density.

Historically, peak power demand occurs in the mid-afternoon, such as due to high industrial usage. In contrast, power usage is historically lower during the overnight hours when residential and industrial usage is both relatively low. However, overnight power demand is expected to increase with increased electrification, such as with increased usage of electric vehicles. Additionally, daytime power demand may further increase, further increasing peak power demands. For example, full charging of electric vehicles may take 4 to 8 hours and may generally occur overnight when power usage is historically low. Additionally, or alternatively, electric vehicle charging may occur during the workday, such as after a morning commute and during business hours, which may further increase industrial power usage. Generally, current power generation and distribution systems are inflexible (e.g., due to cost and operational needs and restrictions) relative to changes in usage and demand throughout a day, such as depicted in regard to FIG. 1.1.1-FIG. 1.1.2. Additionally, such inflexibility may be exasperated by periodic, irregular, or unpredictable power generation from renewable energy sources.

In addition, or alternatively, power generation and distribution infrastructure is costly and renders large geographic areas vulnerable to power outages based on adverse weather, natural or man-made disasters, equipment malfunctions and failures, or maintenance activities. Initial and on-going costs, such as maintenance and repair, result in barriers to further development of access to electricity in developing countries and rural areas. Expanding access to electricity may be hindered by relatively high costs to establish generation and distribution infrastructure, relatively high operational costs, and an ability for governments, corporations, or consumers to pay or invest in power generation and distribution. Such costs may also pose barriers to further maintenance and development in developed countries, as older infrastructure and natural or man-made disasters may cause maintenance or improvement to be cost-prohibitive. For example, in the United States, power lines and transformers are approximately 30 years old on average. Replacement costs for such equipment have been estimated at over $1 trillion dollars.

Such issues and barriers from power generation and distribution systems may further pose barriers to developing or expanding access to clean water, water desalination, and food security. Additionally, or alternatively, smaller scale or portable power generation systems that may overcome distribution obstacles may nonetheless be challenged to provide a necessary power density and output. Such limitations in power density and output may generally result in an inability to apply smaller scale or portable power generation systems to rural areas or developing nations. Furthermore, as clean water treatment and desalination are generally energy intensive, smaller scale or portable power generation system may generally provide inadequate power density and output for providing water to rural or less population-dense areas.

As such, there is a need for power generation systems that provide improved efficiency and reduced emissions over known power generation systems that may further be sized or scaled to provide improved power distribution without adversely affecting efficiency and emissions. The need for improved power generation systems is further, or alternatively, such that issues regarding power distribution, power generation versus changing peak power demands, emissions, barriers to infrastructure development, and challenges and limitations posed by vehicle electrification may each be addressed, improved upon, or alleviated.

Small-scale or portable power generation systems are desirable for applications including space vehicles and systems, automotive drivetrain and aerospace propulsion electrification, direct cooling sources, and portable or distributed power generation such as to address issues regarding power generation efficiency, density, and output. However, there is a need for improved thermal efficiency, electrical conversion efficiency, or both, for such systems.

Heat engines and other devices for converting thermal energy into useful work are generally inefficient relative to their maximum theoretical efficiency. Carnot's theorem states that the maximum theoretical efficiency ($\eta_{Carnot}$) for an ideal, reversible heat engine is given by:

$$\eta_{Carnot} = 1 - \left(\frac{T_{Hot,engine}}{T_{Cold,ambient}}\right)$$

where $T_{hot,engine}$ is the absolute temperature (e.g. in Rankine or Kelvin) at which heat enters the engine and $T_{cold,ambient}$ is the absolute temperature of the environment into which the engine exhausts its waste heat. Carnot efficiencies for terrestrial applications over 90% and Carnot efficiencies for space applications of over 99% are theoretically possible based at least on known fuel sources. However, in practice, $T_{Hot,engine}$ is limited by the maximum operating temperature of the materials in the engine and $T_{Cold,ambient}$ is limited by an available heat sink available (e.g., the atmosphere at ambient temperature, the temperature of a body of water, etc.). Thus, heat engines may generally operate with a temperature ratio ($T_{Hot,engine}/T_{Cold,ambient}$) between 2 and 4 and have actual Carnot efficiencies between 50% and 70% (FIG. 1.1.3). In contrast, open cycle internal combustion engines, such as those that use the Otto cycle, are generally limited to a maximum theoretical efficiency between 60% and 70% based at least on a fuel type or compression ratio at the open cycle engine. Closed cycle heat engines operate through an exchange of thermal energy to and from relatively hot and cold volumes of an engine. Closed cycle heat engines, such as Stirling arrangements, or variations thereof, such as Franchot or Vuilleimier arrangements, generally have a maximum theoretical efficiency that is the Carnot efficiency. As such, closed cycle engines such as Stirling arrangements are considered to have a greater potential as high efficiency engines based at least on the difference in maximum theoretical efficiency and actual efficiency.

Achieving maximum theoretical efficiency of a system is challenged or limited based at least on inefficient combustion, inefficient heat exchange, heat losses to a surrounding environment, non-ideal behavior of one or more working fluids, friction losses, pumping losses, or other inefficiencies and imperfections, or energy required to operate the system. Actual or real thermal efficiency $\eta_{th,system}$ of a system including a heat engine, heat generation sources, heat removal systems, or other heat exchangers, is given by:

$$\eta_{th,system} \equiv \frac{W_{out}}{Q_{in} + E_{in} + W_{in}} = \frac{(Q_{in} + E_{in} + W_{in}E_{in} + Q_{in} - \Sigma Q_{out})}{Q_{in} + E_{in} + W_{in}Q_{in}}$$

Actual or real thermal efficiency $\eta_{th}$ of a heat engine is given by:

$$\eta_{th} = \frac{W_{out}}{Q_{in}} = \frac{Q_{in} - Q_{out}}{Q_{in}} = 1 - \frac{Q_{out}}{Q_{in}}$$

where $W_{out}$ is the net useful work done by the engine, $Q_{in}$ is the thermal energy received by the engine, and $Q_{out}$ is the thermal energy lost or rejected to the environment. $E_{in}$ is the electrical energy used by the system for operation of the system (e.g., fuel and/or oxidizer pumps, cooling sources, etc.). $W_{in}$ is work input into the system. Achievable thermal efficiency tends to increase with power output. For example, motor vehicle applications are generally 20% to 35% thermally efficient, while large marine and stationary diesel systems can exceed 50% thermal efficiency (FIG. 1.1.3). Stirling engines have demonstrated thermal efficiencies up to 38%.

The useful work generated by a heat engine can further be converted into electrical energy. The electrical efficiency ($\eta_{El}$) can be calculated in the same manner as the thermal efficiency:

$$\eta_{El} = \frac{E_{out}}{Q_{in}}$$

where $E_{out}$ is the net electrical energy output from an electric machine that is operatively coupled to the engine and $Q_{in}$ is the thermal energy received by the engine. $E_{out}$ may be calculated by subtracting any electricity required to operate the power generation system from the gross power generated by the system. If combustion is the source of heating working fluid for the engine, the electrical efficiency may be calculated using a lower heating value (LHV) of the fuel. Gas turbine power plants have demonstrated greater than 41% LHV electrical efficiency. Stirling engines have demonstrated LHV electrical efficiencies between 10% and 30%.

Waste heat, or an amount of heat from a heat engine that is not converted into useful work, may be recoverable to provide additional benefit before being exhausted. The amount and quality of the recoverable heat varies based on the cycle, the engine (FIG. 1.1.5), and the operating conditions. High grade or otherwise high quality waste heat may be used in one or more additional heat engines or power generation cycles before being exhausted, such as in one or more bottoming cycles of a combined cycle power generation system. For example, the waste heat from a gas turbine power generation system may be used to boil water for a bottoming steam power generation cycle. The electrical efficiency $\eta_{CC}$ of a combined cycle power generation system is given by:

$$\eta_{CC} = \frac{\Sigma(E_{out,1} + E_{out,2} + \ldots\ E_{out,n})}{\Sigma Q_{in}}$$

where $E_{out,1}$ is the net electricity produced by a first power generation cycle, $E_{out,2}$ is the net electricity produced by a second power generation cycle, $E_{out,n}$ is the net electricity produced by an $n^{th}$ (final) power generation cycle, and $\Sigma Q_{in}$ is the net thermal energy received by the system. Generally, the net thermal energy received by the system may be nominally $Q_{in}$ of the topping cycle, or additionally or alternatively inclusive of any supplementary thermal input (e.g. supplementary firings, if applicable). Stated another way, $\eta_{CC}$ is the total net electricity generated by the entire combined cycle power generation system divided by the total energy input into the combined cycle system. Some combined cycle power generation systems may include an efficiency (i.e., LHV electrical efficiency) of up to approximately 62% for a gas turbine bottomed by a steam cycle.

Waste heat may also be used to produce hot water, process steam, or other useful products that would otherwise require additional energy input to produce in a combined heat and power (CHP) system or cogeneration system, after a combined cycle, or in lieu thereof. The overall electrical efficiency $\eta_{CHP}$ of a combined heat and power system is given by:

$$\eta_{CHP} = \frac{E_{out} + \Sigma Q_{th}}{Q_{in}}$$

where $E_{out}$ is the net useful power output of the system, $\Sigma Q_{th}$ is the sum of the net useful thermal outputs from the system, and $Q_{in}$ is the thermal energy received by the system. CHP systems may have demonstrated total efficiencies between 55% and 85%. CHP systems with Stirling engines may have total efficiencies of 88% and higher. However, higher CHP system efficiencies can come at the cost of lower thermal efficiency, lower electrical efficiency, or both. For example, $\eta_{CHP}$ can maximized by maximizing $\Sigma Q_{th}$, which may be achieved at the cost of electricity generation.

Known closed cycle engines, such as Stirling arrangements, are challenged to produce increasing levels of power output and power density. Such larger sizes or scales can negate other desirable qualities of the engine, such as relatively small-scale or portability. Stirling engines tend to have low power output, with power generation of 1-5 kW for domestic use, up to 25 kW for commercial use, or up to 75 kW for military use. At least one 75 kW engine Stirling engine is a four shaft kinematic Stirling engine for use in submarines. It is nominally 1.1 m in diameter, 1.75 m long, including the generator and control system but not including the fuel or oxidizer sources, with an energy density of 175 kWh/ton.

Stirling engines may generally include two types: kinematic or free piston. Kinematic Stirling engines use mechanically-connected piston assemblies to transmit and convert linear motion of the pistons to a rotary motion for an output shaft. Although such systems may address issues regarding power transmission and stability of the engine, mechanically-connected piston assemblies introduce relatively large power losses via the mechanical members. Additionally, or alternatively, the relatively fixed relationship of mechanically-connected piston assemblies limits the mechanical stroke of the piston assembly. As such, the efficiency of mechanically-connected multi-piston assemblies in a closed cycle engine is decreased in addition to mechanical losses (e.g., friction, leakage, inertia, etc.).

Single-piston free piston closed cycle engine arrangements generally exchange improved thermal efficiency for lower total power generation and density. As such, single-piston free piston closed cycle engine arrangements are not generally suited for higher power output applications.

Multi-piston free piston closed cycle engine arrangements may provide thermal efficiencies of single-piston free piston arrangements and further increase total power generation. However, multi-piston free piston arrangements generally differ from single-piston arrangements and mechanically-connected multi-piston arrangements in that the cycle or motion of a multi-piston free piston arrangement is generally determined by thermo-mechanical interactions of the entire system including the free pistons, the thermal source(s), and a power extraction apparatus. The thermo-mechanical interactions may further include mechanical losses and their effect on balance of the entire system.

For example, multi-piston free-piston closed cycle engines are challenged to respond to time lags. As another example, if one piston assembly drifts from an intended position a subsequent oscillation can become unbalanced. An unbalanced arrangement may lead to undesired vibrations, crashing of the pistons to end walls, or other mechanical losses that may further reduce power output, induce wear and deterioration, or otherwise reduce efficient, stable, or effective use of a multi-piston free piston engine.

As such, there is a need for improved closed cycle engines such as Stirling engines that provide improved power generation efficiency and output. Additionally, there is a need for such improved closed cycle engines that may further retain or improve power density, such as to provide relatively small-scale or portability such as to provide improved application to power generation and distribution systems.

System for Energy Conversion

Referring now to FIG. 1.2.1, an exemplary schematic block diagram depicting a system for energy conversion (hereinafter, "system A10") is provided. Various embodiments of the system A10 provided herein include systems for power generation, a heat recovery system, a heat pump or cryogenic cooler, a system including and/or acting as a bottoming cycle and/or a topping cycle, or other system for producing useful work or energy, or combinations thereof. Referring additionally for FIG. 1.3.1, various embodiments of the system A10 include a closed cycle engine apparatus (hereinafter, "engine A100", apparatus "A100", or "engine assembly C900", or otherwise denoted herein) operably coupled to a load device c092. The engine A100 contains a substantially fixed mass of an engine working fluid to which and from which thermal energy is exchanged at a respective cold side heat exchanger A42 and a hot side heat exchanger C108. In one embodiment, the engine working fluid is helium. In other embodiments, the engine working fluid may include air, nitrogen, hydrogen, helium, or any appropriate compressible fluid, or combinations thereof. In still various embodiments, any suitable engine working fluid may be utilized in accordance with the present disclosure. In exemplary embodiments, the engine working fluid may include a gas, such as an inert gas. For example, a noble gas, such as helium may be utilized as the engine working fluid. Exemplary working fluids preferably are inert, such that they generally do not participate in chemical reactions such as oxidation within the environment of the engine. Exemplary noble gasses include monoatomic gases such as helium, neon, argon, krypton, or xenon, as well as combinations of these. In some embodiments, the engine working fluid may include air, oxygen, nitrogen, or carbon dioxide, as well as combinations of these. In still various embodiments, the engine working fluid may be liquid fluids of one or more elements described herein, or combinations thereof. It should further be appreciated that various embodiments of the engine working fluid may include particles or other substances as appropriate for the engine working fluid.

In various embodiments, the load device C092 is a mechanical work device or an electric machine. In one embodiment, the load device C092 is a pump, compressor, or other work device. In another embodiment, the load device C092 as an electric machine is configured as a generator producing electric energy from movement of a piston assembly A1010 at the engine. In still another embodiment, the electric machine is configured as a motor providing motive force to move or actuate the piston assembly A1010, such as to provide initial movement (e.g., a starter motor). In still various embodiments, the electric machine defines a motor and generator or other electric machine apparatus such as described further herein.

A heater body C100 is thermally coupled to the engine A100. The heater body C100 may generally define any apparatus for producing or otherwise providing a heating working fluid such as to provide thermal energy to the engine working fluid. Various embodiments of the heater body C100 are further provided herein. Exemplary heater bodies C100 may include, but are not limited to, a combustion or detonation assembly, an electric heater, a nuclear energy source, a renewable energy source such as solar power, a fuel cell, a heat recovery system, or as a bottoming cycle to another system. Exemplary heater bodies C100 at which a heat recovery system may be defined include, but are not limited to, industrial waste heat generally, gas or steam turbine waste heat, nuclear waste heat, geothermal energy, decomposition of agricultural or animal waste, molten earth or metal or steel mill gases, industrial drying systems generally or kilns, or fuel cells. The exemplary heater body C100 providing thermal energy to the engine working fluid may include all or part of a combined heat and power cycle, or cogeneration system, or power generation system generally.

In still various embodiments, the heater body C100 is configured to provide thermal energy to the engine working fluid via a heating working fluid. The heating working fluid may be based, at least in part, on heat and liquid, gaseous, or other fluid provided by one or more fuel sources and oxidizer sources providing a fuel and oxidizer. In various embodiments, the fuel includes, but is not limited to, hydrocarbons and hydrocarbon mixtures generally, "wet" gases including a portion of liquid (e.g., humid gas saturated with liquid vapor, multiphase flow with approximately 10% liquid and approximately 90% gas, natural gas mixed with oil, or other liquid and gas combinations, etc.), petroleum or oil (e.g., Arabian Extra Light Crude Oil, Arabian Super Light, Light Crude Oil, Medium Crude Oil, Heavy Crude Oil, Heavy Fuel Oil, etc.), natural gas (e.g., including sour gas), biodiesel condensate or natural gas liquids (e.g., including liquid natural gas (LNG)), dimethyl ether (DME), distillate oil #2 (DO2), ethane ($C_2$), methane, high $H_2$ fuels, fuels including hydrogen blends (e.g., propane, butane, liquefied petroleum gas, naphtha, etc.), diesel, kerosene (e.g., jet fuel, such as, but not limited to, Jet A, Jet A-1, JP1, etc.), alcohols (e.g., methanol, ethanol, etc.), synthesis gas, coke over gas, landfill gases, etc., or combinations thereof.

In various embodiments, the system A10 includes a working fluid body C108, such as further described herein. In one embodiment, the working fluid body C108 defines a hot side heat exchanger A160, such as further described herein, from which thermal energy is output to the engine working fluid at an expansion chamber A221 of the engine. The working fluid body C108 is positioned at the expansion chamber A221 of the engine in thermal communication with the heater body C100. In other embodiments, the working fluid body C108 may be separate from the heater body C100, such that the heating working fluid is provided in thermal communication, or additionally, in fluid communication with the working fluid body C108. In particular embodiments, the working fluid body C108 is positioned in direct thermal communication with the heater body C100 and the expansion chamber A221 of the engine A100 such as to receive thermal energy from the heater body C100 and provide thermal energy to the engine working fluid within the engine.

In still various embodiments, the heater body C100 may include a single thermal energy output source to a single expansion chamber A221 of the engine. As such, the system A10 may include a plurality of heater assemblies each providing thermal energy to the engine working fluid at each expansion chamber A221. In other embodiments, such as depicted in regard to FIG. 1.3.1, the heater body C100 may provide thermal energy to a plurality of expansion chambers A221 of the engine. In still other embodiments, such as depicted in regard to FIG. 8, the heater body includes a single thermal energy output source to all expansion chambers A221 of the engine.

The system A10 further includes a chiller assembly, such as chiller assembly A40 further described herein. The chiller assembly A40 is configured to receive and displace thermal energy from a compression chamber A222 of the engine. The system A10 includes a cold side heat exchanger A42 thermally coupled to the compression chamber A222 of the closed cycle engine and the chiller assembly. In one embodiment, the cold side heat exchanger A42 and the piston body C700 defining the compression chamber A222 of the engine are together defined as an integral, unitary structure, such as further shown and described in regard to FIGS. 1.4.1-1.4.7. In still various embodiments, the cold side heat exchanger A42, at least a portion of the piston body C700 defining the compression chamber A222, and at least a portion of the chiller assembly together define an integral, unitary structure.

In various embodiments, the chiller assembly A40 is a bottoming cycle to the engine A100. As such, the chiller assembly A40 is configured to receive thermal energy from the engine A100. The thermal energy received at the chiller assembly A40, such as through a cold side heat exchanger A42, or cold side heat exchanger A170 further herein, from the engine A100 is added to a chiller working fluid at the chiller assembly A40. In various embodiments, the chiller assembly A40 defines a Rankine cycle system through which the chiller working fluid flows in closed loop arrangement with a compressor. In some embodiments, the chiller working fluid is further in closed loop arrangement with an expander. In still various embodiments, the system A10 includes a heat exchanger A88 (FIG. 1.3.2). In various embodiments, the heat exchanger A188 may include a condenser or radiator. The cold side heat exchanger A40 is positioned downstream of the compressor and upstream of the expander and in thermal communication with a compression chamber A222 of the closed cycle engine, such as further depicted and described in regard to FIG. 1.3.1-FIG. 1.3.2. In various embodiments, the cold side heat exchanger A42 may generally define an evaporator receiving thermal energy from the engine A40.

Referring still to FIG. 1.2.1, in some embodiments, the heat exchanger A188 is positioned downstream of the expander and upstream of the compressor and in thermal communication with a cooling working fluid. In the schematic block diagram provided in FIG. 1.2.1, the cooling working fluid is an air source. However, in various embodiments, the cooling fluid may define any suitable fluid in thermal communication with the heat exchanger. The heat exchanger may further define a radiator configured to emit or dispense thermal energy from the chiller assembly A40. A flow of cooling working fluid from a cooling fluid source is provided in thermal communication with the heat exchanger to further aid heat transfer from the chiller working fluid within the chiller assembly A40 to the cooling working fluid.

As further described herein, in various embodiments the chiller assembly A40 may include a substantially constant density heat exchanger. The constant density heat exchanger generally includes a chamber including an inlet and an outlet each configured to contain or trap a portion of the chiller working fluid for a period of time as heat from the closed cycle engine is transferred to the cold side heat exchanger A42. In various embodiments, the chamber may define a linear or rotary chamber at which the inlet and the outlet are periodically opened and closed via valves or ports such as to trap the chiller working fluid within the chamber for the desired amount of time. In still various embodiments, the rate at which the inlet and the outlet of the chamber defining the constant density heat exchanger is a function at least of velocity of a particle of fluid trapped within the chamber between the inlet and the outlet. The chiller assembly A40 including the constant density heat exchanger may provide efficiencies, or efficiency increases, performances, power densities, etc. at the system A10 such as further described herein.

It should be appreciated that in other embodiments, the chiller assembly A40 of the system A10 may include a thermal energy sink generally. For example, the chiller assembly A40 may include a body of water, the vacuum of space, ambient air, liquid metal, inert gas, etc. In still various embodiments, the chiller working fluid at the chiller assembly A40 may include, but is not limited to, compressed air, water or water-based solutions, oil or oil-based solutions, or refrigerants, including, but not limited to, class 1, class 2, or class 3 refrigerants. Further exemplary refrigerants may include, but are not limited to, a supercritical fluid including, but not limited to, carbon dioxide, water, methane, ethane, propane, ethylene, propylene, methanol, ethanol, acetone, or nitrous oxide, or combinations thereof. Still exemplary refrigerants may include, but are not limited to, halon, perchloroolefin, perchlorocarbon, perfluoroolefin, perfluororcarbon, hydroolefin, hydrocarbon, hydrochloroolefin, hydrochlorocarbon, hydrofluoroolefin, hydrofluorocarbon, hydrochloroolefin, hydrochlorofluorocarbon, chlorofluoroolefin, or chlorofluorocarbon type refrigerants, or combinations thereof. Still further exemplary embodiments of refrigerant may include, but are not limited to, methylamine, ethylamine, hydrogen, helium, ammonia, water, neon, nitrogen, air, oxygen, argon, sulfur dioxide, carbon dioxide, nitrous oxide, or krypton, or combinations thereof.

It should be appreciated that where combustible or flammable refrigerants are included for the chiller working fluid, various embodiments of the system A10 may beneficially couple the heater body C100, and/or the fuel source, and the chiller assembly A40 in fluid communication such that the combustible or flammable working fluid to which thermal energy is provided at the chiller assembly A40 may further be utilized as the fuel source for generating heating working fluid, and the thermal energy therewith, to output from the heater body C100 to the engine working fluid at the engine A100.

Various embodiments of the system A10 include control systems and methods of controlling various sub-systems disclosed herein, such as, but not limited to, the fuel source, the oxidizer source, the cooling fluid source, the heater body C100, the chiller assembly C40, the engine A100, and the load device C092, including any flow rates, pressures, temperatures, loads, discharges, frequencies, amplitudes, or other suitable control properties associated with the system A10. In one aspect, a control system for the system A10 defining a power generation system is provided. The power generation system includes one or more closed cycle engines (such as engine A100), one or more load devices defining electric machines (such as load device C092) operatively coupled to the engine, and one or more energy storage devices in communication with the electric machines.

The control system can control the closed cycle engine and its associated balance of plant to generate a temperature differential, such as a temperature differential at the engine working fluid relative to the heating working fluid and the chiller working fluid. Thus, the engine defines a hot side, such as at the expansion chamber A221, and a cold side, such as at the compression chamber A222. The temperature differential causes free piston assemblies A1010 to move within their respective piston chambers defined at respective piston bodies C700. The movement of the pistons A1011 causes the electric machines to generate electrical power. The generated electrical power can be provided to the energy storage devices for charging thereof. The control system monitors one or more operating parameters associated with the closed cycle engine, such as piston movement (e.g., amplitude and position), as well as one or more operating parameters associated with the electric machine, such as voltage or electric current. Based on such parameters, the control system generates control commands that are provided to one or more controllable devices of the system A10. The controllable devices execute control actions in accordance with the control commands. Accordingly, the desired output of the system A10 can be achieved.

Furthermore, the control system can monitor and anticipate load changes on the electric machines and can control the engine A100 to anticipate such load changes to better maintain steady state operation despite dynamic and sometimes significant electrical load changes on the electric machines. A method of controlling the power generation system is also provided. In another aspect, a control system for a heat pump system is provided. The heat pump system includes one or more of the closed cycle engines described herein. A method of controlling the heat pump system is also provided. The power generation and heat pump systems as well as control methods therefore are provided in detail herein.

Energy Conversion Apparatus

Referring now to FIG. 1.3-1-FIG. 1.3.2, exemplary embodiments of the system A10 are further provided. FIG. 1.3.1 is an exemplary cross sectional view of the system A10 including the heater body C100 and the chiller assembly A40 each in thermal communication with the engine A100, or particularly the engine working fluid within the engine A100, such as shown and described according to the schematic block diagram of FIG. 1.2.1. FIG. 1.3.2 is an exemplary cutaway perspective view of a portion of the engine A100. The system A10 includes a closed cycle engine A100 including a piston assembly A1010 positioned within a volume or piston chamber C112 defined by a wall defining a piston body C700. The volume within the piston body C700 is separated into a first chamber, or hot chamber, or expansion chamber A221 and a second chamber, or cold chamber (relative to the hot chamber), or compression chamber A222 by a piston A1011 of the piston assembly A1010. The expansion chamber A221 is positioned thermally proximal to the heater body C100 relative to the compression chamber A222 thermally distal to the heater body C100. The compression chamber A222 is positioned thermally proximal to the chiller assembly A40 relative to the expansion chamber A221 thermally distal to the chiller assembly A40.

In various embodiments, the piston assembly A1010 defines a double-ended piston assembly A1010 in which a pair of pistons A1011 is each coupled to a connection member A1030. The connection member A1030 may generally define a rigid shaft or rod extended along a direction of motion of the piston assembly A1010. In other embodiments, the connection members A1030 includes one or more springs or spring assemblies, such as further provided herein, providing flexible or non-rigid movement of the connection member A1030. In still other embodiments, the connection member A1030 may further define substantially U- or V-connections between the pair of pistons A1011.

Each piston A1011 is positioned within the piston body C700 such as to define the expansion chamber A221 and the compression chamber A222 within the volume of the piston body C700. The load device c092 is operably coupled to the piston assembly A1010 such as to extract energy therefrom, provide energy thereto, or both. The load device c092 defining an electric machine is in magnetic communication with the closed cycle engine via the connection member A1030. In various embodiments, the piston assembly A1010 includes a dynamic member A181 positioned in operable communication with a stator assembly A182 of the electric machine. The stator assembly A182 may generally include a plurality of windings wrapped circumferentially relative to the piston assembly A1010 and extended along a lateral direction L. In one embodiment, such as depicted in regard to FIG. 1.3.1, the dynamic member A181 is connected to the connection member A1030. The electric machine may further be positioned between the pair of pistons A1011 of each piston assembly A1010. Dynamic motion of the piston assembly A1010 generates electricity at the electric machine. For example, linear motion of the dynamic member A181 between each pair of chambers defined by each piston A1011 of the piston assembly A1010 generates electricity via the magnetic communication with the stator assembly A182 surrounding the dynamic member A181.

Referring to FIG. 1.3-1-FIG. 1.3.2, in various embodiments, the working fluid body C108 may further define at least a portion of the expansion chamber A221. In one embodiment, such as further described herein, the working fluid body C108 defines a unitary or monolithic structure with at least a portion of the piston body C700, such as to define at least a portion of the expansion chamber A221. In some embodiments, the heater body C100 further defines at least a portion of the working fluid body C108, such as to define a unitary or monolithic structure with the working fluid body C108, such as further described herein. In one embodiment, such as further shown and described in regard to FIG. 1.5.1, the system A10 includes the hot side heat exchanger or working fluid body C108 positioned between the heater body C100 and the expansion chamber A221 of the piston body C700. In various embodiments, such as further shown and described in regard to FIG. 1.5.1, the working fluid body C108 includes a plurality of heater conduits or working fluid pathways C110 extended from the expansion chamber A221.

The engine A100 defines an outer end A103 and an inner end A104 each relative to a lateral direction L. The outer ends A103 define laterally distal ends of the engine A100 and the inner ends 104 define laterally inward or central positions of the engine A100. In one embodiment, such as depicted in regard to FIG. 1.3-1-FIG. 1.3.2, the heater body C100 is positioned at outer ends A103 of the system A10. The piston body C700 includes a dome structure A26 at the expansion chamber A221. The expansion chamber dome structure A26 s provides reduced surface area heat losses across the outer end A103 of the expansion chamber A221. In various embodiments, the pistons A1011 of the piston assembly A1010 further include domed pistons A1011 corresponding to the expansion chamber A221 dome. The dome structure A26, the domed piston A1011, or both may provide higher compressions ratios at the chambers A221, A222, such as to improve power density and output.

The chiller assembly A40 is positioned in thermal communication with each compression chamber A222. Referring to FIG. 1.3-1-FIG. 1.3.2, the chiller assembly A40 is positioned inward along the lateral direction L relative to the heater body C100. In one embodiment, the chiller assembly A40 is positioned laterally between the heater body C100 and the load device c092 along the lateral direction L. The chiller assembly A40 provides the chiller working fluid in thermal communication with the engine working fluid at the cold side heat exchanger A42 and/or compression chamber A222. In various embodiments, the piston body C700 defines the cold side heat exchanger A42 between an inner volume wall A46 and an outer volume wall A48 surrounding at least the compression chamber A222 portion of the piston body C700.

In various embodiments, such as depicted in regard to FIG. 1.3-1-FIG. 1.3.2, the load device c092 is positioned at the inner end A104 of the system A10 between laterally opposing pistons A1011. The load device c092 may further include a machine body c918 positioned laterally between the piston bodies C700. The machine body c918 surrounds and houses the stator assembly A182 of the load device c092 defining the electric machine. The machine body c918 further surrounds the dynamic member A181 of the electric machine attached to the connection member A1030 of the piston assembly A1010. In various embodiments, such as depicted in regard to FIG. 1.3-1-FIG. 1.3.2, the machine body c918 further provides an inner end wall A50 at the compression chamber A222 laterally distal relative to the expansion chamber A221 dome.

Engine Chamber to Chamber Conduits Arrangements

The cross sectional view provided in FIG. 1.3.1 is cut along the lateral direction L such as to depict two of four piston assemblies A1010 of the system A10. In various embodiments, the system A10 provided in regard to FIG. 1.3.1 further includes the walled conduits A1050 disposed inward of the piston bodies C700 proximate to the reference longitudinal axis C204, such as shown and described in regard to FIGS. 1.4.5-1.4.7. In other embodiments, the system A10 provided in regard to FIG. 1.3.1 further includes the walled conduits A1050 disposed outward of the piston bodies C700, such as shown and described in regard to FIG. 1.7.1 through FIG. 1.7.4.

Referring to FIG. 1.7.1 through FIG. 1.7.4, side, end, and perspective views of a portion of the system A10 are provided. The embodiments provided in regard to FIG. 1.7.1 through FIG. 1.7.4 are configured substantially similarly as shown and described in regard to FIG. 1.3-1-FIG. 1.3.2. In regard to FIGS. 1.7-1-FIG. 1.7.4, the portions of the system A10 depicted therein include four piston assemblies A1010 positioned within eight respective piston bodies C700. The piston bodies C700 may generally include the first volume wall and the second volume wall shown and described in regard to FIG. 1.3-1-FIG. 1.3.2. The piston bodies C700 may generally define cylinders into which pistons A1011 of the piston assembly A1010 are each positioned such as to define the expansion chamber A221 and the compression chamber A222 within each piston body C700. However, it should be appreciated that other suitable geometries of the piston body C700 containing the piston A1011 may be utilized.

The engine A100 further includes a plurality of walled conduits A1050 connecting particular chambers A221, A222 of each piston body C700 (FIG. 1.3.1) such as to define a balanced pressure arrangement of the pistons A1011. In various embodiments, the engine A100 includes at least one interconnected volume of chambers A221, A222 such as described herein. In one embodiment, such as depicted in regard to FIGS. 1.7.1-FIG. 1.7.4, the engine A100 includes two interconnected volumes in which each interconnected volume includes an expansion chamber A221 of a first piston body C700 of a first piston assembly A1010 connected in fluid communication of the engine working fluid with a compression chamber A222 of a second piston body C700 of a second piston assembly A1010 each connected by a conduit A1050. More particularly, the balanced pressure arrangement of piston assemblies A1010 depicted in regard to FIGS. 1.7.1-FIG. 1.7.4 includes two interconnected volumes each substantially fluidly separated from one another and/or substantially pneumatically separated from one another. The fluidly separated and/or pneumatically separated arrangement of chambers A221, A222 into the interconnected volume, and those chambers A221, A222 outside of the interconnected volume or in another interconnected volume, is particularly provided via the arrangement of expansion chambers A221 connected to compression chambers A222 via the walled conduits A1050 such as further described herein.

In various embodiments, the interconnected volume includes pairs of the expansion chamber A221 fluidly coupled to the compression chamber A222 each defined at laterally separated ends of the piston assemblies A1010. In one embodiment, the engine A100 defines a first end 101 separated along the lateral direction L by the connection member A1030 from a second end 102, such as depicted in FIG. 1.7.2 and FIG. 1.7.3. Each end of the engine A100 defines an expansion chamber A221 and a compression chamber A222 at each piston A1011 of each piston assembly A1010. The engine A100 depicted in FIGS. 1.7.1-FIG. 1.7.4, and further in regard to FIG. 1.3.1, includes the expansion chamber A221 at one end connected to a respective compression chamber A222 at another end via respective conduits. In one embodiment, such as depicted in FIGS. 1.7.2 and 1.7.3, the engine A100 includes two expansion chambers A221 at the first end 101 each connected to respective compression chambers A222 at the second end 102 via respective conduits A1050. The engine A100 further includes two expansion chambers A221 at the second end 102 each connected to respective compression chamber A222 at the first end 101 via respective conduits A1050. The system A10 further includes four expansion chambers A221 at one end each connected to respective compression chambers A222 at the same end via respective conduits A1050. In one embodiment, the system A10 includes two expansion chambers A221 at the first end 101 each connected to respective compression chambers A222 at the first end 101 via respective walled conduits A1050. The system A10 further includes two expansion chambers A221 at the second end 102 each connected to respective compression chambers A222 at the second end 102 via respective walled conduits A1050.

To provide a balanced pressure arrangement of piston assemblies A1010, one interconnected volume includes a pair of the expansion chamber A221 at one end (e.g., the first end 101 or the second end 102) connected to the compression chamber A222 at the other or opposite end. In one embodiment, the expansion chamber A221 at the first end 101 is fluidly connected to the compression chamber A222 at the second end 102. In another embodiment, the expansion chamber A221 at the second end 102 is fluidly connected to the compression chamber A222 at the first end 101. The interconnected volume further includes a pair of expansion chambers A221 at the first end 101 or the second end 102 connected to a respective compression chamber A222 at the same end, opposing ends, or both, relative to the expansion chamber A221. In one embodiment, the expansion chamber A221 at the first end 101 is fluidly connected to the compression chamber A222 at the same end (i.e., the first end 101). In another embodiment, the expansion chamber A221 at the second end 102 is fluid connected to the compression chamber A222 at the same end (i.e., the second end 102). In yet another embodiment, the expansion chamber A221 at the first end 101 is fluidly connected to the compression chamber A222 at the second end 102 (i.e., the opposing end). In still yet another embodiment, the expansion chamber A221 at the second end 102 is fluidly connected to the compression chamber at the first end 101 (i.e., the opposing end). It should be appreciated that the arrangement described herein includes each expansion chamber A221 of one piston body C700 of one piston assembly A1010 connected to a respective compression chamber A222 of another, different piston body C700 of another, different piston assembly A1010. It should further be appreciated that, in various embodiments, the expansion chamber A221 of one piston body C700 and one piston assembly C1010 is exclusively fluidly connected to the compression chamber A222 of another piston body C700 of another piston assembly C1010 (i.e., each walled conduit A1050 fluidly connects only one expansion chamber A221 to only one compression chamber A222).

The balanced pressure arrangement of piston assemblies A1010 described herein is such that a uniform temperature applied at the expansion chambers A221 and the compression chambers A222 provides an equal pressure at the expansion chamber A221 of one piston body C700 counteracted by an equal and opposite pressure at the same piston body C700 relative to the expansion chamber A221. Stated alternatively, when a uniform temperature is applied to the expansion chambers A221 and the compression chambers A222, movement of one piston assembly A1010 defining a free piston assembly A1010 results in pressure cancellation at adjacent piston assemblies A1010 such that pressure waves will not propagate to induce movement of the adjacent piston assembly A1010.

It should be appreciated that each interconnected volume described herein includes one or more passages, chambers, openings, or other flowpaths between the arrangements of the compression chamber A222 and the expansion chamber A221 described above. For example, the particular arrangements of walled conduits A1050 providing fluid communication of the engine working fluid between the compression chamber A222 and the expansion chamber A221 such as described in regard to FIGS. 1.7.1 through 1.7.4 further includes the chiller conduits A54, collection chambers A62, A64, heater conduits C110, etc. such as shown and described in regard to FIG. 1.4.1 through FIG. 1.5.1. Additionally, or alternatively, the particular arrangements of walled conduits A1050 providing fluid communication between the compression chamber A222 and the expansion chamber A221 such as described in regard to FIG. 1.7.1 through FIG. 1.7.2 may further include a heat exchanger or regenerator, or features thereof.

Although depicted as a balanced pressure arrangement of four piston assemblies A1010 at eight piston bodies C700 defining eight fluidly connected pairs of expansion chambers A221 and compression chambers A222, it should be appreciated that the engine A100 generally includes an interconnected volume such as described above. As such, other embodiments of the engine A100 may include a quantity of two or more piston assemblies A1010 in which the arrangements of the piston assembly A1010 are scaled accordingly based on the arrangement described above such as to provide at least one interconnected volume of chambers A221, A222 and conduits 1050.

In various embodiments, the system A10 defines the reference longitudinal axis C204 extended co-directional to the lateral direction L or generally along a direction along which the pistons A1011 articulate within the chambers A221, A222. The chambers A221, A222 are positioned in circumferential arrangement relative to the reference longitudinal axis C204. Each chamber 221, 222 is extended along the lateral direction L or otherwise co-directional to the reference longitudinal axis C204.

In one embodiment, the engine includes four piston assemblies A1010 extended along the lateral direction L and in circumferential arrangement relative to the reference longitudinal axis C204. The piston assemblies A1010 may be positioned equidistant to one another around the reference longitudinal axis C204. In one embodiment, a pair of the heater body is positioned at outer ends A103 of the engine. The heater body is positioned proximate to the expansion chamber A221 and distal to the compression chamber A222. Each heater body may be positioned and configured to provide a substantially even flow of thermal energy to four hot side heat exchangers 160 or expansion chambers A221 at a time.

In other embodiments, the engine A100 includes two or more piston assemblies A1010 in side-by-side arrangement. The piston assemblies A1010 may be positioned equidistant relative to one another. In still various embodiments, a single heater body C100 may be positioned relative to each hot side heat exchanger or working fluid body C108. It should be appreciated that various embodiments of the system A10 provided herein may include any quantity of heater bodies positioned at any quantity of expansion chambers A221 as desired. Further embodiments of the system A10 provided herein in regard to FIG. 1.7.5 through 1.7.8 further illustrate positioning of the heater body C100 relative to the expansion chamber A221. However, it should be appreciated that other arrangements may be utilized as desired such as to provide thermal energy to the expansion chambers A221. In still various embodiments, other arrangements may be utilized such as to provide selective or independent operability of a plurality of heater bodies C100. For example, selective or independent operability of the plurality of heater bodies C100 may desirably control a temperature, flow rate, or other property of thermal energy, or particularly the heating working fluid, provided in thermal communication to the working fluid body C108. Selective operability may further include selective on/off operation of one or more heater bodies C100 independent of one another.

It should further be appreciated that although the piston assemblies A1010 of the engine A100 are depicted in straight, flat, inline, or horizontally opposed arrangements, the piston assemblies A1010 and heater bodies C100 may alternatively be arranged in V-, W-, radial, or circumferential arrangements, or other suitable piston assembly A1010 arrangements. For example, one or more embodiments of the system A10 may include a center and/or outer heater body C100 around which the plurality of piston assemblies A1010 is positioned.

Referring now to FIG. 1.7.5 through FIG. 1.7.8, further exemplary embodiments of the system A10 are provided. The embodiments provided in regard to FIG. 1.7.5 through FIG. 1.7.8 are configured substantially similarly as shown and described in regard to FIG. 1.2.1 through FIG. 1.7.2. Referring to FIG. 1.7.5 through 1.7.8, positioning the load device c092 outside of the inner ends 104 of the piston assembly A1010 provides the connection member A1030 to be shorter between pistons A1011. The shorter connection member A1030 provides the pistons A1011 to be positioned more closely together in contrast to a longer connection member A1030 based at least on the load device c092 being positioned at the inner ends 104 of the piston assembly A1010. In regard to FIG. 1.7.5, the load device c092 is formed at least in part by the piston A1011 and the surrounding piston body C700. In regard to FIGS. 1.7-6-FIG. 1.7.7, the load device c092 is positioned at one or more outer ends A103 of the engine. Positioning the load device c092 outside of the inner ends 104 provides dimensions and sizing of the load device c092 to be substantially de-coupled from dimensions and sizing of the closed cycle engine. For example, positioning the load device c092 outside of the inner end A104 of the engine de-couples the length and thickness of the dynamic member A181 from the connection member A1030. As another example, positioning the load device c092 outside of the inner end A104 of the engine de-couples a desired power density of the engine from the sizing and dimensions of the load device c092, such as an electric machine. As such, the shorter connection member A1030 between the pistons A1011 provides a smaller packaging of the engine while substantially maintaining the power generation and output relative to other arrangements.

In FIG. 1.7.5, the dynamic member A181 of the load device c092 defining the electric machine is positioned at the pistons A1011 of the piston assembly A1010. The stator assembly A182 of the electric machine is positioned at the piston body C700, such as at the second volume wall. Lateral movement of the pistons A1011 relative to the surrounding stator assembly A182 at the piston body C700 generates electricity at the electric machine. The system A10 further includes the chiller assembly surrounding the electric machine. In more particular embodiments, the chiller assembly surrounds the stator assembly A182 of the load device c092 defining an electric machine. The chiller assembly may further provide working fluid in thermal communication with inner ends 104 of the system A10, such as to provide thermal communication to the compression chamber A222 via the inner end wall A50.

Referring now to FIG. 1.7.5 through FIG. 1.7.6, in various embodiments the chiller assembly includes a chiller casing in which a chiller flowpath is defined next to the compression chamber A222 of the volume. The chiller flowpath may particularly be defined immediately next to or adjacent to the second volume wall defined by the chiller assembly, or particularly the chiller casing, such as depicted in regard to FIG. 1.7.5. The chiller assembly includes the second volume wall and further includes the inner end wall A50 such as described in regard to FIG. 1.3-1-FIG. 1.3.2. The second volume wall and the inner end wall A50 may together define a single monolithic structure. Furthermore, the chiller casing may include the second volume wall and the inner end wall A50 and define the chiller flowpath as a single monolithic structure. As such, the structure and method for assembly and improved thermal efficiency may include positioning pistons A1011 and the connection member A1030 through the chiller assembly, operably coupling the pistons A1011 and the connection member A1030 together as the piston assembly A1010, and closing or sealing the expansion chamber A221 and compression chamber A222 via the heater body at the outer ends A103 of the closed cycle engine.

Referring now to FIG. 1.7.6 through FIG. 1.7.7, in various embodiments the load device c092 is positioned at one or more outer ends A103 of the closed cycle engine in operative communication with the piston assembly A1010. The system A10 may further include an extension member A186 connected to one or more pistons A1011 of the piston assembly A1010. The extension member A186 is connected to the piston A1011 and extended laterally outward toward one or more outer ends A103. The extension member A186 is operatively connected to the load device c092 such that lateral movement of the piston assembly A1010 including the extension member A186 generates electric energy at the electric machine. Although not further depicted in regard to FIGS. 8-9, the extension member A186 further includes the dynamic member A181 at the load device c092 defining the electric machine operatively coupled to the electric machine in magnetic communication with the stator assembly A182, such as depicted and described in regard to FIG. 1.3.1-FIG. 1.3.2.

Referring still to FIG. 1.7.6 through FIG. 1.7.7, the machine body c918 surrounding the load device c092 includes an interface wall A142 in contact with the outer end A103 of the load device c092. Within the machine body c918 and around the load device c092 is a cavity A146. The interface wall A142 includes a seal A144, such as a gap seal, at an interface of the extension member A186 and the interface wall A142. The cavity A146 may particularly define a pressurized cavity such that pressurization at the volume within the piston body C700, such as at the expansion chamber A221, is substantially maintained or mitigated from pressure loss within the expansion chamber A221 along the extension member A186. It should be appreciated that any suitable type of seal may be incorporated at the interface wall A142 such as to substantially maintain pressure at the expansion chamber A221, or provide an acceptably low rate of leakage over time from the expansion chamber A221.

Regarding FIG. 1.7.6, and similarly as shown and described in regard to FIG. 1.3.1 through FIG. 1.7.5, the heater body is positioned at outer ends A103 of the closed cycle engine. In regard to the embodiment depicted in FIG. 1.7.7, the heater body is positioned at the inner end A104 of the closed cycle engine between each pair of piston bodies C700 at which each respective piston A1011 of the piston assembly A1010 is contained. The heater body may particularly define a single common heater body such as to provide a single thermal energy output source to each expansion chamber A221 of the closed cycle engine.

Referring to FIG. 1.7.7 and further in regard to the embodiment and description regarding FIG. 1.7.1 through FIG. 1.7.2, the single common heater body may be positioned to provide a substantially uniform thermal energy output to all eight expansion chambers A221 of the closed cycle engine. The single common heater body positioned between the expansion chambers A221 may alleviate or obviate issues that may arise from uneven thermal input to the expansion chambers A221. For example, the single common heater body may mitigate phase drifting of the piston assemblies A1010 relative to one another. As such, the single common heater body may promote balanced pressure operation of the closed cycle engine, mitigate unbalanced operation, reduce vibrations or mitigate promulgation of vibrations, improve efficiency of the system A10, or promote improved operability of the system A10.

It should be appreciated that various embodiments of the system A10 provided in regard to FIGS. 1.2.1 through FIG. 1.7.7 are further configured to provide a desired thermal energy output from the heater body to the expansion chambers A221. For example, the embodiments shown and described herein may be configured to output a substantially uniform thermal energy profile from each heater body to all expansion chambers A221. In still various embodiments, the chiller assembly includes the chiller working fluid input and the chiller working fluid output such as depicted and described in regard to FIG. 1.7.1 through FIG. 1.7.2, such as to provide a substantially uniform thermal energy output from the compression chamber A222 to the chiller assembly.

Referring now to FIG. 1.7.8, the schematic embodiment provided is configured substantially similarly as shown and described in regard to FIGS. 1.2.1 through FIG. 1.7.7. In the embodiment depicted in FIG. 1.7.8, the system A10 further includes an adapter A188 attaching the connection member A1030 to the extension member A186. In various embodiments, the adapter A188 is extended along a transverse direction generally acute to the lateral direction L. In one embodiment, the adapter A188 is extended substantially perpendicular to the lateral direction L. The adapter A188 provides substantially parallel arrangement of the connection member A1030 relative to the extension member A186 such as to translate lateral movement of the connection member A1030 at a first plane to lateral movement of the extension member A186 at a second plane different from the first plane. In various embodiments, the adapter A188 includes a mechanical connection, such as, for example, a rocker arm, to extend from the connection member A1030 to the load device c092. The adapter A188 further provides a diameter, length, or other dimension of the load device c092 to be de-coupled from dimensions of the closed cycle engine. In various embodiments, the adapter A188 provides the dynamic member A181 and/or extension member A186 of the load device c092 to have a stroke or length different from the connection member A1030. The adapter A188 may further provide the load device c092 to include a gearing system, a frequency converter, or other devices to alter or scale the output of the load device c092 from the size or speed of the piston assembly A1010. As such, the closed cycle engine and the load device c092 may each be sized substantially separately for improved performance of each.

In general, the exemplary embodiments of system A10 and engine, or portions thereof, described herein may be manufactured or formed using any suitable process. However, in accordance with several aspects of the present subject matter, some or all of system A10 may be formed using an additive manufacturing process, such as a 3-D printing process. The use of such a process may allow portions of the system A10 to be formed integrally, as a single monolithic component, or as any suitable number of sub-components. In various embodiments, the manufacturing process may allow the all or part of the heater body, the chiller assembly, the load device c092, or the engine to be integrally formed and include a variety of features not possible when using prior manufacturing methods. For example, the additive manufacturing methods described herein provide the manufacture of the system A10 having unique features, configurations, thicknesses, materials, densities, and structures not possible using prior manufacturing methods. Some of these novel features can, for example, improve thermal energy transfer between two or more components, improve thermal energy transfer to the engine working fluid, improve thermal energy transfer from the engine working fluid to the chiller working fluid, reduce leakages, or facilitate assembly, or generally improve thermal efficiency, power generation and output, or power density of the system A10 using an additive manufacturing process as described herein.

Balanced Phase and/or Balanced Pressure Closed-Cycle Engine Arrangements

Pressure Wave Disruption

Embodiments of a multi-piston engine apparatus A100 provided herein show and describe a balanced pressure piston engine containing an engine working fluid. Certain embodiments of the engine shown and described herein provide dynamic stability in amplitude, frequency, or both. Various embodiments of the apparatus further provide for power to be modulated by piston stroke via a free piston assembly arrangement as a passively balanced system during operation. As such, the engine provided herein may operate in balanced pressure or balanced phase arrangement without control systems or mechanical linkages between piston assemblies, such as camshafts, crankshafts, etc. Other embodiments provide for balanced pressure arrangement with force transmission linkages coupling piston assemblies with minimal power losses. Certain embodiments of the engine provided herein mitigate or disrupt propagation of pressure waves that may disrupt an intended motion (dynamic stability in amplitude, frequency, phase, center point of oscillation or all of these) of a plurality of pistons in a closed cycle engine arrangement such as a Stirling engine generally. The embodiments of the engine provided herein include a closed cycle piston engine arrangement including a plurality of chambers in particular fluid connection such as to provide pneumatic isolation or force cancellation at adjacent chambers when the engine working fluid is at a uniform temperature at the plurality of chambers.

Closed cycle engine arrangements generally include a plurality of pistons defining an expansion chamber and a compression chamber, or a hot chamber and a relatively cold chamber, defined by a piston within a cylinder. Such closed cycle engine arrangements may include, but are not limited to, a Stirling engine assembly, or variations thereof, such as, alpha, beta, or gamma Stirling configurations, or other variations, such as, but not limited to, a Vuilleumier, Franchot, or Rinian engine arrangement. Certain configurations, such as beta and gamma configurations, further include a displacer piston in contact with the hot chamber and the cold chamber and a power piston in contact with the cold chamber. Further configurations, such as a Vuilleumier arrangement, include a warm chamber in which one piston is in contact with the hot chamber and the warm chamber and another piston is in contact with the cold chamber and the warm chamber. However, configurations including the warm chamber are generally counter-productive to providing improved power density, as the warm chamber is used to improve operation of the engine but decreases power generation per unit volume of working fluid.

In other configurations including a hot chamber and a cold chamber, or in various configurations, additionally a warm chamber, undesired creation and propagation of pressure waves may occur across fluidly connected chambers. Such pressure propagation may inhibit operation of the engine at transient conditions, such as via undesired harmonics or vibrations that cause undesired operation or unacceptable power losses. Pressure propagation may further, or alternatively, cause undesired phase-shift, undesired changes in amplitude, or run-away behavior of the pistons relative to one another, such as to result in undesired operation of the engine.

For example, in certain free piston Stirling engine arrangements, serial or consecutive coupling of a compression chamber at one reciprocating piston to an adjacent or serially consecutive expansion chamber of another reciprocating piston, and further connected in a loop to the first reciprocating piston, provide a change in pressure in one chamber to induce movement of the piston in contact with the chamber. Such change in pressure in one chamber inducing movement of the piston in contact with the chamber may further occur even in the absence of a thermal load, such as a thermally-driven expansion and contraction of a volume of fluid. As such, a change in pressure results in the other chamber defined by the same piston (i.e., the chamber defined on an opposite side of the same piston). The change in pressure produces a pressure wave and corresponding force that is allowed to propagate to each adjacent or serially consecutive fluidly coupled chamber and the associated piston at the fluidly coupled chamber. The pressure wave propagation is allowed to repeat, or may repeat indefinitely, through the plurality of fluidly coupled chambers and associated pistons of the engine. The pressure wave and corresponding force may subsequently propagate through the serially coupled chambers back to the first reciprocating piston. The pressure wave propagation may therefore create harmonic waves and disrupt an intended motion (e.g., frequency, amplitude, and/or phase, or combinations thereof), or an intended center-point of motion in a multi-piston arrangement, or both.

Additionally, or alternatively, the pressure wave propagation means that movement of one reciprocating piston induces movement of each adjacent piston of the fluidly connected chambers. As such, pressure wave propagation may cause movement of adjacent pistons within the fluidly connected arrangement of chambers. The pressure wave propagation across fluidly connected chambers results in the pistons being articulated, at least in part, by mechanical forces (i.e., pressure waves and their corresponding forces) rather than via thermal differences between the hot chamber and the cold chamber.

Pressure wave propagations may further adversely affect double acting piston assemblies, or particularly double acting free piston assemblies. For example, the fluidly connected arrangement of chambers may be arranged such that pistons at one end of a piston assembly include one fluidly coupled arrangement of chambers and pistons at another end of the piston assembly include another fluidly coupled arrangement of chambers. However, the fluidly coupled arrangements may allow pressure wave propagations to cause movement of one piston assembly due to movement of another piston assembly even with uniform temperatures at the chambers. Stated differently, fluidly connected arrangements of piston assemblies allow mechanical forces (i.e., pressure propagation) to induce movement of adjacent piston assemblies rather than thermal differences between the chambers.

In certain instances, such pressure wave propagation may cause the affected piston to displace to an extreme position, such as top dead center (TDC) or bottom dead center (BDC). Displacement to the extreme position may cause the piston to contact or crash into the extreme end of the surrounding cylinder, such as to damage the piston or cylinder or otherwise adversely affect power output, stability, or operation of the engine. As another example, pressure wave propagation inducing movement of adjacent pistons via mechanical forces may result in unbalanced phase movement of the pistons relative to one another, which may result in undesired operation. Pressure wave propagation may generally result in undesired operation of the engine such as to cause undesired power losses, damage, vibrations, or other losses to power output or operability.

In still other examples, Stirling engines, or variations thereof, may include fluid coupling of expansion and compression chambers such as to result in a force acting on a piston along its direction of motion. Such examples promote self-starting, such as to reduce input power necessary for starting the engine. However, such self-starting behavior may result from or provide pressure wave propagation during operation of the engine, such as to result in undesired operation of the engine as described above.

Referring to FIGS. 2.1.1-FIG. 2.1.2, embodiments of a balanced pressure engine are provided (hereinafter, "apparatus A100"). Embodiments of the apparatus A100 provided herein may provide pressure-balanced operation of a multi-piston closed cycle engine in which pressure wave propagation across the pistons is mitigated, eliminated, or otherwise disrupted from propagating beyond one or more piston assemblies. The embodiments of the apparatus A100 provided herein may further provide a phase-balanced arrangement in which the plurality of pistons may operate at an equal phase relationship relative to one another. The embodiments of the apparatus A100 provided herein may further reduce undesired instabilities, vibrations, harmonics, or other dynamics that may result in power losses, damage, or other losses to power output or operability. Still further, embodiments of the apparatus A100 provided herein provide improved performance, such as via stable operation of the multi-piston arrangement without a warm chamber or other intermediate chamber.

Additionally, or alternatively, embodiments of the apparatus A100 provided herein may beneficially provide balanced pressure arrangement of a plurality of piston assemblies A1010 during operation of the apparatus. The balanced pressure arrangement operation of the apparatus A100 may be identified by the stationary behavior of one piston assembly following articulation or actuation of another piston assembly when the engine working fluid is at a substantially uniform temperature in the apparatus A100. The apparatus A100 may provide the stationary behavior of the piston assembly via substantially equal and opposite forces produced at an adjacent piston assembly following articulation of another piston assembly.

Embodiments of the apparatus A100 may beneficially improve overall stability, balance, power output, and operability of the apparatus via the balanced pressure arrangements provided herein. Additionally, various embodiments of the apparatus A100 may beneficially improve overall operation of piston engine assemblies, such as closed cycle engine assemblies, despite detriments that may be associated with production of substantially equal and opposite forces at an adjacent piston assembly. For example, embodiments of the apparatus A100 provided herein may include beneficial improvements to overall operation greater than losses associated with starting the apparatus A100. As another example, the substantially equal and opposite forces at an adjacent piston assembly may increase a threshold input power required to initialize operation of the piston assemblies (i.e., articulation of the piston assemblies), such as to require a greater input torque or power at the piston assembly to overcome greater counteracting forces, inertia, etc. However, in contrast, operation of the piston assemblies thereafter may include improved stability, power output, reduced vibrations, mitigated risk of damage or other losses to power or operability.

Referring to FIG. 2.1.1-FIG. 2.1.2, the apparatus A100 includes a plurality of piston assemblies A1010 each fluidly coupled to one another in balanced pressure and/or balanced phase arrangement. The piston assembly A1010 includes a piston A1011. In various embodiments, the piston assembly A1010 includes a pair of pistons A1011 attached to one another via a connection member A1030. In still various embodiments, the piston assemblies A1010 can operate in balanced pressure and/or balanced phase relationship while being mechanically independent of one another. For example, the apparatus A100 may exclude camshafts, crankshafts, rocker arms, or other mechanical linkages coupling two or more of the piston assemblies. In other embodiments, the piston assembly A1010 may include a linkage coupling two or more piston assemblies in balanced pressure and/or balanced phase arrangement.

The piston A1011 of the piston assembly A1010 is surrounded by a piston body A1020. The piston body A1020 defines at least one of a first chamber A221 or a second chamber A222. In various embodiments, the piston body A1020 defines at one side (e.g., a first side A1025 depicted in FIG. 2.2.2) of the piston A1011 a first chamber A221, such as an expansion chamber, a hot chamber, or first localized fluid volume within the piston body A1020. The piston body A1020 further defines at another side (e.g., a second side A1029 of depicted in FIG. 2.2.2) of the piston A1011 a second chamber A222, such as a compression chamber, a cold chamber, or second localized fluid volume within the piston body A1020. A plurality of walled conduits A1050 fluidly connects the first chamber A221 of one piston assembly and the second chamber A222. A portion of the first chambers A221 and the second chambers A222 are contained within an interconnected volume A300. A first plurality of chambers, such as depicted within interconnected volume A300, includes a first plurality of the first chambers A221 and a first plurality of the second chambers A222 within the interconnected volume A300 fluidly separated and/or pneumatically separated from a second plurality of chambers including the first chamber A221 and the second chamber A222 outside of the interconnected volume A300. Stated differently, pressure waves or motive forces formed within the plurality of chambers forming the interconnected volume A300 by the movement of one piston assembly A1010 are mitigated from propagating to another piston assembly A1010. Stated still differently, pressure waves or motive forces formed outside of the plurality of chambers forming the interconnected volume A300 by the movement of one piston assembly A1010 are mitigated from propagating to another piston assembly A1010. In one embodiment, the interconnected volume A300 of the plurality of chambers may separate pressure wave propagation and motive forces developed outside of the interconnected volume A300 from acting upon the one or more pistons A1011 within the interconnected volume A300 of chambers. Additionally, or alternatively, the interconnected volume A300 may separate pressure wave propagation and motive forces developed within the interconnected volume A300 of first chambers A221 and second chambers A222 from acting upon the one or more pistons A1011 outside of the interconnected volume A300.

In various embodiments, the portion of the plurality of walled conduits A1050 fluidly connects the first chamber A221 of one piston assembly and the second chamber A222 of another piston assembly into an interconnected volume A300. The interconnected volume A300 defines a fluid interconnection of the first chamber A221 and the second chamber A222 at different piston assemblies A1010 such that a fluid communication or fluid leakage path between the first chamber A221 and the second chamber A222 of the same piston A1011 provides a single fluid loop separated from the fluidly connected chambers A221, A222 outside of the interconnected volume A300. In one embodiment, the balanced pressure arrangement and/or the balance phase arrangement of the piston assemblies A1010 is the fluid interconnection of the walled conduits A1050 and chambers A221, A222 such that the chambers A221, A222 within the interconnected volume A300 are substantially fluidly separated and/or pneumatically separated from those chambers A221, A222 outside of the interconnected volume A300 to provide a substantially equal and opposite force relative to one another to at least one piston assembly A1010 when the engine working fluid within the chambers A221, A222 is at a uniform temperature. In various embodiments, the apparatus A100 includes a plurality of interconnected volumes A300, such as a first interconnected volume A301 fluidly separated and pneumatically separated from a second interconnected volume A302.

In one embodiment, the plurality of piston assemblies A1010 includes a first piston assembly A1110 fluidly coupled to a second piston assembly A1210 via the walled conduit A1050. The first chamber A221 and the second chamber A222 each define a spring, such as a gas spring (i.e., a spring-mass system in which the gas spring is at least in part the engine working fluid, such as helium, hydrogen, or air, or another suitable working fluid). The first chamber A221 at the first piston assembly A1110 is fluidly coupled to the second chamber A222 at the second piston assembly A1210 in balanced pressure arrangement, i.e., at substantially uniform temperatures relative to the first chamber A221 and the second chamber A222, movement of the first piston assembly A1110 provides substantially equal and opposite force at the piston A1011 or connection member A1030 of another piston assembly (e.g., the second piston assembly A1210) such as to result in a substantially zero net force, such as depicted via signs + or − in FIG. 2.1.1 or 2.1.2. The substantially zero net force at the other piston assembly, such as the second piston assembly A1210, results in non-movement or stationary behavior of the second piston assembly A1210 despite movement of the first piston assembly A1110.

In various embodiments, the first chamber A221 and the second chamber A222 each define the spring as a gas spring based at least on the fluid coupling of the first chamber A221 of the first piston assembly A1110 to the second chamber A222 of the second piston assembly A1210 to include at least two interconnected volumes A301, A302 fluidly and/or pneumatically separated from one another (i.e., balanced pressure arrangement). In one embodiment, the at least two interconnected volumes includes the first interconnected volume A301 substantially fluidly isolated and pneumatically isolated from the second interconnected volume A302.

The arrangement of the interconnected volume A300, or plurality thereof, mitigates pressure propagation across the plurality of piston assemblies A1010 such that movement of adjacent piston assemblies is not driven by mechanical forces. Stated differently, the arrangement of the chambers A221, A222 within the interconnected volume A300 relative to chambers outside of the interconnected volume A300 provides for movement of one piston assembly of the interconnected volume A300 to induce an equal and opposite force at an adjacent piston assembly in fluid contact with the piston assembly A1010 outside of the interconnected volume A300. Alternatively, the arrangement of chambers A221, A222 within the first interconnected volume A301 relative to chambers within the second interconnected volume A302 provides for movement of one piston assembly at one interconnected volume to induce an equal and opposite force at an adjacent piston assembly at another interconnected volume.

In various embodiments, the adjacent or second piston assembly A1210 is in fluid contact with the interconnected volume A300 and outside thereof. In another embodiment, the second piston assembly A1210 is in fluid contact with the first interconnected volume A301 and the second interconnected volume, and the first piston assembly A1110 is in fluid contact with only the interconnected volume A300, such as either the first interconnected volume or the second interconnected volume A302. As such, when the first chamber A221 and the second chamber A222 are each at uniform temperature conditions, mechanical movement of one piston assembly will not induce movement of another piston assembly. Still further, when the first chamber A221 and the second chamber A222 are at a temperature differential or delta temperature relative to one another, such as to define a hot chamber and a cold chamber respectively, movement of the piston assemblies is substantially only via the temperature differential rather than mechanical forces such as pressure wave propagation.

In various embodiments, a method for operating a balanced pressure piston apparatus, such as the apparatus A100 provided herein, is provided. In still various embodiments, a method for balancing a piston apparatus is provided. In still various embodiments, a method for balanced pressure operation of the piston apparatus is provided. The method includes flowing a first portion of the engine working fluid through a first plurality of interconnected chambers including a first chamber on the first end of a first piston assembly and a second chamber on the second end of a second piston assembly. Flowing the first portion of engine working fluid may include flowing the first portion of engine working fluid within a fluidly interconnected volume (e.g., interconnected volume 301 in FIG. 2.1.1) of a first plurality of first chambers and a first plurality of second chambers in a single fluid loop. In various embodiments, the method may include generating an interconnected volume by fluidly interconnecting a portion of the plurality of first chambers of one piston assembly and the plurality of second chambers of another piston assembly into a single fluid loop when the first chamber and the second chamber of the same piston is in fluid communication. The first chamber and the second chamber within the interconnected volume are each fluidly separated from the first chamber and the second chamber outside of the interconnected volume. At least one first chamber of one end of one piston assembly is fluidly coupled to the second chamber of another end of another piston assembly.

In particular embodiments, the method further includes at flowing a second portion of the engine working fluid through a second plurality of chambers, in which the first portion of the engine working fluid is fluidly separated from the second portion of the engine working fluid. In various embodiments, the second portion of the engine working fluid may be defined in a second interconnected volume of chambers (e.g., interconnected volume 302 in FIG. 2.1.2) separated from the first interconnected volume of chambers.

In various embodiments, the method further includes receiving, at the engine working fluid at the first chamber A221 and the second chamber A222, a substantially uniform temperature. A first pressure is generated at the first chamber A221 of one assembly by moving or otherwise articulating one or more piston assemblies along a first direction while the engine working fluid is at a substantially uniform temperature at the first chamber A221 and the second chamber A222 (e.g., a first lateral direction co-directional to extension of the piston within the piston body, or a first circumferential direction co-directional to extension of the piston within the piston body). In various embodiments, articulating the one or more piston assemblies includes moving, articulating, or actuating the first piston assembly A1110. A second pressure at the first chamber A221 of another piston assembly, such as the second piston assembly A1210, is also generated by articulating the one piston assembly (e.g., the first piston assembly A1110). The second pressure and the first pressure together generate a substantially zero net force at the other piston assembly (e.g., the second piston assembly A1210) such that the other piston assembly (e.g., the second piston assembly A1210) is stationary when the first piston assembly is articulated in the first direction.

Stated differently, forces induced at the second piston assembly via the second pressure are equal and opposite of the forces induced by the first piston assembly via the first pressure. As such, the second piston assembly remains stationary when the first piston assembly is articulated in the first direction when the engine working fluid at the first chamber and the second chamber is at a uniform temperature relative to one another. Generally, the second piston assembly remains stationary when the first piston assembly is articulated in the first direction when the engine working fluid within the apparatus A100 is at a uniform temperature.

In another embodiment, the method of operating the apparatus includes moving or otherwise articulating the piston assemblies A1010 in a balanced phase relationship relative to one another while the working fluid is at a temperature differential at the working fluid relative to the first chamber A221 and the second chamber A222. Articulating the piston assemblies A1010 may include starting one or more of the first piston assembly A1110 via a starter motor, mechanical power input, or other starter device.

Articulating the piston assemblies in balanced phase relationship may further include articulating the plurality of piston assemblies in balanced phase relationship when the temperature differential is applied at the engine working fluid at the first chamber versus the second chamber.

In yet another embodiment, the method further includes applying a motive force at the piston assembly greater than a threshold necessary to overcome counteracting forces at the piston assembly. In various embodiments, the threshold corresponds to friction, inertia, or other forces preventing movement of the piston assembly via the temperature differential. For example, the other forces preventing movement may include, at least in part, equal and opposite forces resulting from the balanced pressure arrangement of the piston assemblies. As such, the arrangement of piston assemblies A1010 may provide the balanced pressure and/or balanced phase relationship of the apparatus A100 and may further require a greater motive force to articulate the piston assembly A1010 during start-up from rest or non-operation.

It should be appreciated that the phase angle of the balanced phase arrangement may depend at least in part on the quantity of the plurality of piston assemblies A1010 of the apparatus A100. In various embodiments, the phase angle between four piston assemblies, or factors thereof, A1010 is approximately 90 degrees, 180 degrees, or 270 degrees. In another embodiment, the phase angle between three piston assemblies A1010, or factors thereof, is approximately 30 degrees, 60 degrees or 120 degrees. In yet another embodiment, the phase angle between five piston assemblies A1010, or factors thereof, is approximately 72 degrees.

In still various embodiments, the apparatus A100 includes a plurality of piston assemblies A1010 in which each piston assembly A1010 defines a first end A101 separated from a second end A102 (e.g., separated along a lateral direction L co-directional to extension or displacement of a piston A1011 of the piston assembly A1010). A pair of pistons A1011 is each connected at the first end A101 and the second end A102. In various embodiments, the pair of pistons A1011 is each connected via the connection member A1030 extended to separate each piston A1011 such as to dispose one piston A1011 at the first end A101 and another piston A1011 at the second end A102. The piston body A1020 surrounds the piston A1011 and defines the first chamber A221 and the second chamber A222 each separated by the piston A1011 at each piston assembly A1010. The plurality of walled conduits A1050 fluidly connects the first chamber A221 at one piston assembly A1010 to the second chamber A222 at another piston assembly A1010. The plurality of walled conduits A1050 fluidly connects the chambers to define at least two interconnected volumes A300 of chambers A221, A222 and walled conduits A1050. Each interconnected volume A300, such as depicted at first interconnected volume A301 and second interconnected volume A302, is fluidly separated from one another. Each interconnected volume A301, A302 is further fluidly separated and/or pneumatically separated from one another. The plurality of piston assemblies A1010 are in balanced pressure arrangement via the plurality of interconnected volumes A300.

The fluidly separated and/or pneumatically separated or isolated interconnected volume A300 includes a pair of the first chamber A221 at the one end fluidly connected to a respective second chamber A222 at the other end. In one embodiment, each interconnected volume A300 includes the first chamber A221 at the first end A101 fluidly connected to a respective second chamber A222 at the second end A102. In another embodiment, the interconnected volume A300 includes the first chamber A221 at the second end A102 fluidly connected to a respective second chamber A222 at the first end A101. As such, the interconnected volume A300 further provides a substantially net zero force at the piston assembly A1010 such as described above.

The fluidly separated and/or pneumatically separated interconnected volume A300 further includes at least two pair of the first chamber A221 at the first end A101 or the second end A102 is each fluidly connected to a respective second chamber A222 at the same end. In one embodiment, at least two pair of the first chamber A221 at the first end A101 is each fluidly connected to a respective second chamber A222 at the first end A101. In another embodiment, at least two pair of the first chamber A221 at the second end A102 is each fluidly connected to a respective second chamber A222 at the second end A102. In still another embodiment, at least four pair of the first chamber A221 at one end is each fluidly connected to a respective second chamber A222 at the same end.

The interconnected volume A300 further includes the first piston assembly A1110 entirely within the interconnected volume. The interconnected volume A300 further includes the second piston assembly A1210 in which one end or pair of hot chamber and cold chamber (e.g., at the first end A101) is within one interconnected volume (e.g., the first interconnected volume A301) and the other end or pair of hot chamber and cold chamber (e.g., at the second end A102) is outside of the interconnected volume or within another interconnected volume (e.g., the second interconnected volume A302). As such, the balanced pressure arrangement mitigates pressure wave propagation at the second piston assembly, such as depicted at arrows A150, when an equal and opposite force is applied to the second piston assembly.

In one embodiment, the interconnected volume A300 fluidly and/or pneumatically separated from other chambers and walled conduits in balanced pressure arrangement each include a hot chamber (i.e., a first chamber) of one piston assembly fluidly connected to a respective cold chamber (i.e., a second chamber) of another piston assembly (i.e., each hot chamber is fluidly connected to the respective cold chamber at the piston assembly different from the hot chamber). The interconnected volume includes a first hot chamber (i.e., a first-first chamber) at the first end fluidly connected to a respective cold chamber (i.e., a second chamber) at the second end. The engine further includes a second hot chamber (i.e., a second-first chamber) at the second end fluidly connected to a respective cold chamber at the first end. Two or more other hot chambers (i.e., first chambers other than the first-first chamber and the second-first chamber) at one end are each fluidly connected to respective cold chambers at the same end.

In one embodiment, a third hot chamber (i.e., a third-first chamber) at the one end, such as the first end, is fluidly connected to a respective cold chamber at the same end, such as the first end. In another embodiment, the third hot chamber at one end, such as the second end, is fluidly connected to a respective cold chamber at the same end, such as the second end. In still another embodiment, a fourth hot chamber (i.e., a fourth-first chamber) at the same end as the third hot chamber, such as either the first end or the second end, is fluidly connected to a respective cold chamber at the same end. In another embodiment, the fourth hot chamber at the other end relative to the third chamber is fluidly connected to a respective cold chamber at the same end (i.e., the other end relative to the third chamber).

Referring now to FIG. 2.1.2, another exemplary embodiment of the apparatus A100 is provided. The apparatus A100 provided in FIG. 2.1.2 is configured such as described in regard to FIG. 2.1.1. In FIG. 2.1.2, the plurality of piston assemblies (such as described in regard to piston assembly A1010 of FIG. 2.1.1) includes four piston assemblies A110, A210, A310, A410. In various embodiments, the four piston assemblies A110, A210, A310, A410 are each mechanically separated from one another. Each piston A111, A112, 113, 114, 115, 116, 117, 118 of each respective piston assembly (such as described in regard to piston A1011 of FIG. 2.1.1) is surrounded by the piston body 120, 220, 320, A420, 520, 620, 720, 820 (such as described in regard to piston body A1020 of FIG. 2.1.1). The plurality of piston assemblies A110, A210, A310, A410 together define eight hot or expansion chambers A121, A123, A125, A127, A129, A131, A133, A135 (i.e., eight-first chambers A221 of FIG. 2.1.1). The apparatus A100 further includes eight cold or compression chambers A122, A124, A126, A128, A130, A132, A134, A136 (i.e., eight-second chambers A222 of FIG. 2.1.1). The expansion or hot chamber of one piston assembly is fluidly connected to the compression or cold chamber of another piston assembly different from the expansion or hot chamber. Additionally, the engine includes two interconnected volumes A301, A302 each fluidly separated and/or pneumatically separated or isolated from one another such as described above.

Referring still to FIG. 2.1.2, the first interconnected volume A301 includes a pair of the hot chambers at one end each fluidly connected to a respective cold chamber at the other end. For example, hot chamber A125 at the first end A101 is fluidly coupled to the cold chamber A132 at the second end A102. Additionally, the hot chamber A131 at the second end A102 is fluidly coupled to the cold chamber A134 at the first end A101. The first interconnected volume A301 further includes a piston assembly (i.e., first piston assembly A1110 of FIG. 2.1.1) entirely within the first interconnected volume A301, such as depicted at piston assembly A310.

The second interconnected volume A302 includes a pair of the hot chambers at one end each fluidly connected to a respective cold chamber at the other end. For example, hot chamber A121 at the first end A101 is fluidly coupled to the cold chamber A128 at the second end A102. Additionally, the hot chamber A127 at the second end A102 is fluidly coupled to the cold chamber A122 at the first end A101. The second interconnected volume A302 further includes a piston assembly entirely (i.e., first piston assembly A1110 of FIG. 2.1.1) within the second interconnected volume A302, such as depicted at piston assembly A110.

The apparatus A100 further includes a piston assembly in which the piston body at one end is pneumatically coupled to one interconnected volume and the piston body at the other end is pneumatically coupled to another interconnected volume (i.e., second piston assembly A1210 of FIG. 2.1.1). For example, referring to FIG. 2.1.2, the piston assembly A210 includes the piston body 320 within the first interconnected volume A301 and the piston body A420 within the second interconnected volume A302. The piston assembly A410 further includes the piston body 720 within the first interconnected volume A301 and the piston body 820 within the second interconnected volume A302.

Referring to FIGS. 2.1.1-FIG. 2.1.2, when the first piston assembly A1110 at the first interconnected volume A301 or the second interconnected volume A302 is moved or otherwise articulated along the lateral direction L toward the first end A101 separated from the second end A102 along the lateral direction L, flows within the conduits and chambers are such as depicted via arrows A150. More particularly, the first piston assembly A1110 includes both pairs of hot chamber and cold chamber (i.e., both hot chambers and cold chambers at both of ends A101, A102) within either the first interconnected volume A301 or the second interconnected volume A302, such as depicted at piston assembly A110, A310 of FIG. 2.1.2).

At the second piston assembly A1210 at which one pair of hot chamber and cold chamber is included in the first interconnected volume A301 and another pair of hot chamber and cold chamber is included at the second interconnected volume A302 (such as depicted at piston assembly A210, A410 of FIG. 2.1.2), the forces exerted by the flows of engine working fluid are equal and opposite when the chambers are at uniform temperature conditions, such as depicted at piston body A420 of the second piston assembly A210. As such, movement or articulation of one piston assembly of one interconnected volume, such as the first piston assembly A1110, does not induce movement of another piston assembly of one or more interconnected volumes, such as the second piston assembly A1210. Stated differently, without thermal differences at the chambers, the piston assemblies are in balanced pressure arrangement such as to provide equal and opposite forces at adjacent piston assemblies when a first piston assembly is articulated.

Referring now to FIGS. 2.1.3 through 2.1.8, exemplary embodiments of apparatus A100 configured substantially similarly as shown and described in regard to FIGS. 2.1.1-FIG. 2.1.2 are provided. In FIG. 2.1.3, the exemplary embodiment of the apparatus A100 includes three piston assemblies A110, A210, A310. The interconnected volume A300 includes the first piston assembly A1110 and a pair of the second piston assembly A1210. The interconnected volume A300 includes the first piston assembly A1110, such as depicted at piston assembly A210. The interconnected volume A300 further includes a pair of the second piston assembly A1210, such as depicted at piston assembly A110, A310. More particularly in the embodiment depicted in FIG. 2.1.3, the interconnected volume A300 includes at the second piston assembly A1210 the first chamber A221 and the second chamber A222 at one end (e.g., the first end A101). In other embodiments, the interconnected volume A300 includes at the second piston assembly A1210 the first chamber A221 and the second chamber A222 at the other end (e.g., the second end A102). During operation of the apparatus A100 including three piston assemblies such as depicted in regard to FIG. 2.1.3, the piston assembly A210 defining the first piston assembly A1110 receives an equal and opposite pressure at the piston A1011.

In FIG. 2.1.4, the exemplary embodiment of the apparatus A100 includes five piston assemblies A1010 and the interconnected volume A300, such as described in regard to FIGS. 2.1.1-FIG. 2.1.2. The plurality of piston assemblies A1010 includes the first piston assembly A1110 of the interconnected volume A300. The plurality of piston assemblies A1010 further include the second piston assembly A1210 at which the expansion or first chamber A221 and the compression or second chamber A222 is positioned within the interconnected volume. The plurality of piston assemblies A1010 further include the second piston assembly A1210 at which the expansion or first chamber A221 and the compression or second chamber A222 is positioned outside of the interconnected volume A300. Referring to FIGS. 2.1.3-FIG. 2.1.4, the second piston assembly A1210 includes a first piston body A1026 at which the first chamber A221 and the second chamber A222 is inside the interconnected volume A300. The second piston assembly A1210 further includes a second piston body A1027 at which the first chamber A221 and the second chamber A222 is outside of the interconnected volume A300.

In FIG. 2.1.5, the exemplary embodiment of the apparatus A100 includes six piston assemblies A110, A210, A310, A410, A510, A610 and a plurality of the interconnected volume A300, such as described in regard to FIGS. 2.1.1-FIG. 2.1.2. The plurality of piston assemblies includes the first piston assembly A1110 of each interconnected volume A300, such as depicted at piston assembly A110, A310, A510. The plurality of piston assemblies further includes the second piston assembly A1210 at which the expansion or first chamber A221 and the compression or second chamber A222 is positioned within two interconnected volumes A300, such as depicted at piston assemblies A210, A410, A610.

In FIG. 2.1.6, the exemplary embodiment of the apparatus A100 includes seven piston assemblies A1010 and the interconnected volume A300, such as shown and described in regard to the three piston assembly embodiment of FIG. 2.1.3 and the five piston assembly embodiment of FIG. 2.1.4.

In FIGS. 2.1.7-FIG. 2.1.8, the exemplary embodiments of the apparatus A100 include eight piston assemblies A110, A210, A310, A410, A510, A610, A710, A810 and a plurality of the interconnected volumes A300. The plurality of piston assemblies includes the first piston assembly A1110 of each interconnected volume A300, such as depicted at piston assembly A110, A310, A510, 710. The plurality of piston assemblies further includes the second piston assembly A1210 at which the hot chamber A221 and the cold chamber A222 is positioned within two interconnected volumes A300, such as depicted at piston assemblies A210, A410, A610, A810.

In various embodiments, the apparatus A100 may be configured to operate a portion of the plurality of piston assemblies A1010 while another portion, such as the remainder of the piston assemblies, remain substantially stationary. In one embodiment, the apparatus A100 may be configured to receive and/or transfer thermal energy at a portion of the piston assemblies A1010 sufficient to articulate the piston assemblies A1010 while another portion of the piston assemblies receives and/or transfers an insufficient amount of thermal energy to sustain operation of another portion of the piston assemblies. For example, the other portion of piston assemblies may define zero thermal difference between the first chamber A221 and the second chamber A222. As another example, a thermal difference between the first chamber A221 and the second chamber A222 may be below a threshold temperature difference such as to be too low to sustain movement of the piston assembly. Operation of a portion of the plurality of piston assemblies A1010 may be provided by disruption of the pressure wave propagation via the interconnected volume A300. As such, a portion of the plurality of piston assemblies A1010 may be disabled from operation based on a desired output power to a load device A180 (FIG. 2.4.3), a capacitor A184 (FIG. 2.4.3), or both, or another control output.

Referring to FIGS. 2.1.1-FIG. 2.1.8, various embodiments of the apparatus A100 define a distal or outer end A103 and a proximal or inner end A104 each relative to the arrangement of piston bodies A1020. For example, the outer end A103 is the area at which the piston bodies A1020 are farthest from one another. As another example, the inner end A104 is the area at which the piston bodies A1020 are nearest to one another. In other embodiments, the outer end A103 is distal to a geometric center of the connection member A1030 and the inner end A104 is proximal to the geometric center of the connection member A1030.

Although the expansion chamber or first chamber A221 is generally depicted at the outer end A103 and the compression chamber or second chamber A222 is generally depicted at the inner end A104, it should be appreciated that in other embodiments the first chamber A221 may be positioned at the inner end A104 and the second chamber A222 may be positioned at the outer end A103. It should further be appreciated that a heater assembly, thermal energy input source, or hot side heat exchanger A160 may be positioned at the outer end A103 or the inner end A104 based at least on the positioning of the first chamber A221. It should also be appreciated that a chiller assembly, thermal energy removal source, or cold side heat exchanger A170 may be positioned at the inner end A104 or the outer end A103 based at least on the positioning of the second chamber A222.

In still further embodiments, although certain quantities of the piston assembly A1010 are depicted in FIGS. 2.1.1-FIG. 2.1.8, various embodiments of the apparatus A100 may include three or more piston assemblies with the interconnected volume configured such as shown and described herein. Additionally, or alternatively, the plurality of piston assemblies may be arranged in V-, W-, X-, inline, radial, circular, or horizontally opposed arrangements, or other suitable arrangements including the plurality of piston assemblies and interconnected volume such as shown and described herein.

Piston, Valve Assembly, Fluid Bearing, and Flexible Diaphragm

Referring now to FIGS. 2.2.1-FIG. 2.2.2, close-up views of exemplary embodiments of portions of the apparatus A100 are depicted. The embodiments shown and described in regard to FIGS. 2.2.1-FIG. 2.2.2 may be included in the configurations shown and described in regard to FIGS. 2.1.1-FIG. 2.1.8. In FIG. 2.2.1, the piston A1011 is surrounded by the piston body A1020 to which the walled conduit A1050 is attached to provide fluid connection to another piston body A1020 at another piston assembly A1010. In various embodiments, the piston assembly A1010 defines at the piston body A1020 the first chamber A221 and the second chamber A222 each separated from one another by the piston A1011. The first chamber A221 may generally define a fluid volume receiving a thermal energy input, such as via a thermal energy input source or hot side heat exchanger A160. The second chamber A222 may generally define a fluid volume from which thermal energy is extracted, such as via a thermal energy removal source or cold side heat exchanger A170. As such, the first chamber A221 may generally define an expansion or hot volume of the engine working fluid defining a higher temperature than the second chamber A222 defining a compression or cold volume of the engine working fluid.

In various embodiments, the thermal energy input source or hot side heat exchanger A160 and the thermal energy removal source or cold side heat exchanger A170 may each define heat exchangers configured to provide (i.e., as the thermal energy input source A160) or extract (i.e., as the thermal energy removal source A170) thermal energy from the engine working fluid from the respective fluid volumes. In another embodiment, the thermal energy input source A160 may define, at least in part, any suitable device providing thermal energy to the first chamber A221, such as, but not limited to, a combustion chamber, an electric or induction heater, a heat engine, or other heater assembly or thermal energy input source. In still another embodiment, the thermal energy removal source A170 may define a cooler, refrigeration unit, bottoming cycle system, or cryogenic system. In various embodiments, the thermal energy input source A160 defines a system from which thermal energy is provided to the first chamber A221 (such as schematically depicted via arrows A161) and the thermal energy output source A170 defines a system to which thermal energy flows from the second chamber A222 (such as schematically depicted via arrows A171).

Referring now to FIGS. 2.2.1-FIG. 2.2.2, exemplary embodiments of a portion of the piston assembly A1010 are provided. In various embodiments, the piston body A1020 includes a barrier structure A1114 surrounding the piston A1011. The first chamber A221 is defined at one side (e.g., first side A1025 in FIG. 2.2.2) of the piston A1011 and a second chamber A222 is defined at an opposite side (e.g., second side A1029 in FIG. 2.2.2) of the piston A1011. In one embodiment, the barrier structure A1114 defines a substantially rigid structure enclosing the piston A1011. Expansion or contraction of the chamber A221, A222 may be dependent on one or more of the movement of the piston assembly A1010, thermal energy input (e.g., to the first chamber A221), or thermal energy output (e.g., from the second chamber A222).

In another embodiment, the barrier structure A1114 defines, at least in part, a flexible structure, such as a flexible membrane, allowing one or more of the localized fluid chambers A221, A222 within the piston body A1020 to expand and contract, or increase and decrease, at least partially as a function of a dimension of the barrier structure A1114. Started alternatively, the barrier structure A1114 defining, at least in part, a flexible membrane provides one or more of the localized fluid volumes to alter internal volume as a function of at least a change in dimension of the barrier structure, in addition to change in stroke of the piston A1011. The barrier structure A1114 defining, at least in part, the flexible membrane provides varying the internal volume of the chamber at the piston body A1020 at least partially unconstrained by rigidity of the barrier structure A1114, such as to improve sealing. Additionally, or alternatively, the flexible membrane of the barrier structure A1114 beneficially improves the pressure versus volume cycle of the engine. In various embodiments, the flexible structure includes a rolling diaphragm seal or sock seal.

In various embodiments, the chambers A221, A222 defined within the piston body A1020 are substantially fluidly isolated from one another. In one embodiment, the first chamber A221 may be fluidly isolated from the second chamber A222 via a seal assembly A1018 positioned at an interface A1015 between the barrier structure A1114 and the piston assembly A1010. In one embodiment, the seal assembly A1018 and interface A1015 are defined between the piston A1011 and the barrier structure A1114. In another embodiment, the seal assembly A1018 and interface A1015 are defined between the connection member A1030 and the barrier structure A1114. However, it should be appreciated that the seal assembly A1018 may still allow minimal levels of leakage to occur between the first and second chambers A221, A222 but may still render the respective chambers A221, A222 as substantially fluidly isolated from one another.

Referring now to FIG. 2.2.2, another exemplary embodiment of a portion of the apparatus A100 is further provided. The exemplary piston assembly A1010 provided is configured substantially similarly as shown and described in regard to FIG. 2.2.1. In FIG. 2.2.2, the piston A1011 may be at least partially hollow. The piston A1011 defining a hollow structure may reduce a thermal conduction path, such as to minimize heat exchange between the first chamber A221 and the second chamber A222. In various embodiments, the hollow structure of the piston A1011 may include a third chamber A223 within the piston A1011 into which a portion of fluid from each of the first chamber A221 and the second chamber A222 of the piston body A1020 may enter into and egress from the third chamber A223. The third chamber A223 may be fluidly connected to the seal assembly A1018.

In one embodiment, the piston A1011 may include a porous or cellular structure within the third chamber A223 such as to provide structural support while further reducing a thermal conduction path at which thermal energy may exchange between the chambers A221, A222 on each side of the piston A1011. The piston A1011 may further include a first material surrounding the third chamber A223 and a second material within the third chamber A223 different from the first material. The second material may define a thermally insulating material, such as a ceramic material.

In various embodiments, the seal assembly A1018 further includes a bearing assembly A1028 allowing load-bearing movement of the piston A1011 within the piston body A1020. The bearing assembly A1028 may define a fluid bearing, a rolling bearing element, a friction bearing, or another suitable type of bearing positioned at the interface A1015 between the barrier structure A1114 of the piston body A1020 and the piston A1011. In one embodiment, the bearing assembly A1028 may be integral to the seal assembly A1018 and the piston A1011 such as to provide fluid sealing between the first and second chambers A221, A222 and to further accept torsional loads, gravitational forces, or other loads not along a lateral direction L (e.g., loads oblique or perpendicular to the lateral direction L) along which the piston assembly A1010 may translate. The bearing assembly A1028 may beneficially provide sealing via the seal assembly A1018 and further configured to counteract vibrations, gravity, torque, or other non-lateral loads in contrast to non-load bearing piston seals that may be provided in internal combustion engines.

Referring still to FIG. 2.2.2, the piston A1011 may further include a valve assembly A1022 at the third chamber A223 such as to admit a portion of fluid from one or more of the localized fluid chambers A221, A222 based at least on pressure at each fluid chamber A221, A222. The piston A1011 may include a first chamber opening A1012 in selective fluid communication with the third chamber A223 and the first chamber A221. The piston A1011 may further include a second chamber opening A1014 in selective fluid communication with the third chamber A223 and the second chamber A222. In various embodiments, the valve assembly A1022 defines a one-way valve, a check valve, a butterfly valve, or another suitable type of valve configured to open or closed based on a pressure differential, such as between the third chamber A223 and one or more of the localized fluid chambers A221, A222. Stated differently, the valve assembly A1022 is configured to have an opening pressure corresponding to a threshold, above which a portion of engine working fluid is allowed to enter the third chamber A223.

During operation of the apparatus A100, a portion of fluid from the first chamber A221 or the second chamber A222 may enter the third chamber A223 via the respective first chamber opening A1012 or second chamber opening A1014, such as to provide pressure to operate the bearing assembly A1028. As one chamber A221, A222 expands or contracts, the other chamber (i.e., the other of chamber A221 or A222) may provide a portion of engine working fluid via the respective opening A1012, A1014 based on the change in pressure (e.g., via the stroke cycle of the piston assembly A1010) at the fluid chambers A221, A222. As such, in various embodiments, the interconnected volume A300 of the first chamber A221 and the second chamber A222 such as described herein may further include the third chamber A223. In still various embodiments, the third chamber A223 is in alternating fluid communication with the first chamber A221 and the second chamber A222 based at least on a stroke of the piston assembly A1010, such as described herein.

In still various embodiments, the apparatus A100 may position the bearing assembly A1028 generally along the lateral direction L at the piston assembly A1010. In various embodiments, the bearing assembly A1028 may be positioned at the connection member A1030 such as to counteract vibrations or loads generally oblique, torsional, or perpendicular to the lateral direction L. In one embodiment, the bearing assembly A1028 is positioned at the connection member A1030 at the piston body A1020.

In one embodiment, a fluid opening A1013 is positioned at the bearing assembly A1028 of the piston A1011. More particularly, the fluid opening A1013 is positioned at the piston A1011 next to the interface A1015 of the barrier structure A1114 interface A1015 and the piston A1011. The fluid opening A1013 provides fluid communication between the third chamber A223 and the bearing assembly A1028. More particularly, the fluid opening A1013 provides fluid communication between the third chamber A223 and an at least partially circumferential groove A1017 at the piston A1011. The groove A1017 provides a pressurized cavity A1019 between the outer wall of the piston A1011 and the barrier structure A1114. More particularly, the groove A1017 is positioned at the interface A1015 of the piston A1011 and the piston body A1020.

During operation of the apparatus A100, the fluid opening A1013 provides fluid to enter and egress from the third chamber A223 and to the cavity A1019 defined by the groove A1017 of the piston A1011 and the piston body A1020. The fluid opening A1013 and the cavity A1019 allow a film of fluid (e.g., engine working fluid, such as helium, hydrogen, air, etc.) to form between the piston A1011 and the piston body A1020. The piston A1011 may at least partially ride on the film of fluid within the cavity A1019, such as to keep the piston A1011 centered within the piston body A1020 or form a protective layer between the piston A1011 and the piston body A1020. The fluid within the cavity A1019 may further provide the bearing assembly A1028 to receive shear forces, or forces generally oblique or perpendicular to the direction of movement of the piston A1011 (e.g., oblique or perpendicular to the lateral direction L).

In another embodiment, a volume of the third chamber A223 is based at least on being large enough to store a portion of the engine working fluid corresponding to the stroke of the piston assembly A1010. In various embodiments, the volume of the third chamber A223 is sufficient to hold working fluid corresponding to the piston assembly A1010 going from full compression to full expansion relative to one volume (e.g., from full compression of the second chamber A222 to full expansion of the same second chamber A222, or from full expansion of the first chamber A221 to full compression of the same first chamber A221, etc.). As such, a sufficient volume or mass of working fluid is at the third chamber A223 and bearing assembly A1028 such as to provide support between the piston A1011 and the piston body A1020. In still another embodiment, the volume of the third chamber A223 is sufficient to hold working fluid corresponding to the piston assembly A1010 going from full compression to full expansion and back to full compression relative to one volume.

It should be appreciated that in still other embodiments the third chamber A223 of the piston A1011 may define a flexible or deformable membrane, similar to as shown and described in regard to the flexible membrane of the barrier structure A1114. In various embodiments, the piston A1011 defining a flexible membrane at the third chamber A223 is deformable such as to provide a substantially constant pressure within the third chamber A223 relative to stroke of the piston assembly A1010. For example, as working fluid exits the third chamber A223, the flexible membrane provides an adjustable volume of the third chamber A223 such as to maintain a substantially constant pressure within the third chamber A223 as working fluid enters and exits the piston A1011.

Referring now to FIG. 2.2.3, certain embodiments of the piston assembly A1010 may include a folded cross-section member A1060 positioned in the third chamber A223 at the piston A1011. The folded cross-section member A1060 provides a tortious path for heat transfer from a relatively hot side proximate to the hot chamber A221 to a relatively cold side proximate to the cold chamber A222. The folded cross-section member A1060 providing the tortious flowpath allows for reduced heat flux between the first side A1025 of the piston A1011 facing the hot chamber A221 and the second side A1029 of the piston A1011 facing the cold chamber A222.

In various embodiments, the folded cross-section member A1060 provides at least two-times (2×) a flow path distance at the third chamber A223 relative to the length of the piston A1011 along the longitudinal direction L. In a particular embodiment, the folded cross-section member A1060 provides at least four-times (4×) a flow path distance at the third chamber A223 relative to the length of the piston A1011 along the longitudinal direction L. In still another embodiment, the folder cross-section member A1060 may provide ten-times (10×) or less a flow path distance at the third chamber A223 relative to the length of the piston A1011 along the longitudinal direction L.

In certain embodiments, the piston A1011 includes a first monolithic piece A1001 providing an outer shell or heat-shield of the piston A1011. The piston A1011 may further include a second monolithic piece A1002 providing an inner core at which the folded cross-section member A1060 is formed. The first monolithic piece A1011 may generally surround the second monolithic piece A1002. The first monolithic piece A1011 may generally surround the second monolithic piece A1002 such as to separate the second monolithic piece A1002 from the hot chamber A221. In particular embodiments, the first monolithic piece A1001 may define a different material than the second monolithic piece A1002. For instance, the first monolithic piece A1001 may define a material based on desired heat transfer properties relative to the working fluid, temperatures at the hot chamber A221, and/or temperatures at the cold chamber A222. In another instance, the second monolithic piece A1002 may define a material based on desired heat transfer properties of the folded cross-section member A1060, such as to reduce heat flux as described herein.

Referring still to FIG. 2.2.3, the piston A1011 may define a thermal break A224 between the first monolithic piece A1001 and the second monolithic piece A1002. The thermal break A224 may be configured to reduce heat flux between the first monolithic piece A1001 and the second monolithic piece A1002, such as by providing an insulative layer between the pieces.

It should be appreciated that although a first monolithic piece and a second monolithic piece are described herein, one or more additional pieces may be formed, such as to provide heat shielding and/or reduction in heat flux as described herein. Referring now to FIG. 2.2.4, the piston A1011 may be formed as a substantially single monolithic piece defining the thermal break A224 between the first side A1025 of the piston A1011 and the third chamber A223. In certain embodiments, one or more support structures A1061 is extended through the thermal break A224 such as to support the first side A1025 providing an outer casing or heat shield relative to an inner core.

Fluid Conduit Heat Exchanger

Referring now to FIG. 2.3.1, another exemplary embodiment of the apparatus A100 is provided. The apparatus A100 is configured substantially similarly as shown and described in regard to FIGS. 2.1.1-FIG. 2.1.8. In FIG. 2.3.1, the apparatus A100 further includes a regenerative heat exchanger, regenerator, thermal capacitor, or generally a heat exchanger A190 at one or more of the walled conduits A1050.

In another embodiment, the heat exchanger A190 may further include or define a heat pipe in thermal communication with the engine working fluid within the walled conduit A1050. The heat exchanger A190 including a heat pipe may include a cavity between the walled conduit A1050 and an outer wall of the heat exchanger A190. The cavity may include an evaporator portion and a condenser portion. A capillary tube structure (e.g., a wick structure, a screen, channels, grooves, corrugated screen, arteries, tubes, etc.) may further be defined between the walled conduit A1050 and the surrounding outer wall of the heat exchanger A190.

A heat pipe working fluid may be disposed within the heat exchanger A190 defining a heat pipe such as to receive and transfer thermal energy between the engine working fluid within the walled conduit A1050 and the heat pipe working fluid within the heat exchanger A190. In various embodiments, the heat pipe working fluid is any suitable fluid for storing thermal energy within a heat pipe. In one embodiment, the heat pipe working fluid is a phase change fluid or two-phase fluid, such as, but not limited to, helium, nitrogen, ammonia, trichlorofluoromethane, dichlorofluoromethane, pentane, trichlorotrifluoroethane, acetone, methanol, perfluoromethylcyclohexane, ethanol, heptane, water, toluene, perfluoromethyldecalin, a diphenyl ether, mercury, cesium, potassium, sodium, lithium, silver, or combinations thereof. However, it should be appreciated that the heat pipe working fluid may be any suitable two-phase fluid. The suitability of the heat pipe fluid may be based on a desired range of temperature received at the heat pipe working fluid. The suitability of the heat pipe working fluid may additionally, or alternatively, be based on the material of one or more of the walled conduit A1050 or the heat exchanger A190 at which the heat pipe working fluid is contained.

Referring to FIG. 2.3.1, the heat exchanger A190 may extend through a plurality of the walled conduit A1050 such as to provide thermal communication of the engine working fluid at one walled conduit, such as depicted at a first walled conduit 1051 to the engine working fluid at another walled conduit, such as depicted at a second walled conduit A1052. In various embodiments, the heat exchanger A190 is extended through two or more walled conduits A1050 at which the flow of engine working fluid within the apparatus A100 is in opposing phase relationship. For example, the heat exchanger A190 may be extended through the first walled conduit 1051 at which the engine working fluid flows in a first direction A162. The heat exchanger A190 may further be extended through the second walled conduit A1052 at which the engine working fluid flows in a second direction A172 opposite of the first direction A162. The heat exchanger A190 positioned as such may improve retention of thermal energy at the engine working fluid generally within the apparatus A100 as the fluid flows to and from the hot chamber A221 and the cold chamber A222. As such, the improved thermal retention improves thermal efficiency, power output, and/or power density of the apparatus A100.

Piston Assembly Spring Assembly Arrangement

Referring now to FIGS. 2.4.1-FIG. 2.4.2, exemplary embodiments of the piston assembly A1010 are provided. The embodiments of the piston assembly A1010 provided in regard to FIGS. 2.4.1-FIG. 2.4.2 are configured substantially similarly as shown and described in regard to FIGS. 2.1.1-FIG. 2.3.1. In FIGS. 2.4.1-FIG. 2.4.2, the piston assembly A1010 further includes a springing member A1042 coupled to one or more of the pistons A1011 and the connection member A1030. In various embodiments, the springing member A1042 is configured to be flexible along the lateral direction L along which the connection member A1030 is extended. In another embodiment, the springing member A1042 is configured to be flexible along the lateral direction L along which the pair of pistons A1011 is separated and attached together via the connection member A1030. In still various embodiments, the springing member A1042 includes one or more of a coil spring, a planar spring, a gas spring, or a flexure, or other appropriate spring, or combinations thereof. In yet various embodiments, the springing member A1042 is configured to be rigid along a direction oblique or orthogonal to the lateral direction L.

The springing member A1042 is positioned in serial arrangement with the connection member A1030 and the pistons A1011. In one embodiment, such as depicted in regard to FIG. 2.1.1, the connection member A1030 includes a first connection A1031 and a second connection A1032. The first connection A1031 is attached to a first piston A111 of the pair of pistons A1011. The second connection A1032 is attached to a second piston A112 of the pair of pistons A1011. The first connection A1031 and the second connection A1032 are each attached together via the springing member A1042. As such, the springing member A1042 provides a decrease in the frequency of a multi-piston engine assembly including a plurality of the piston assembly A1010 without increasing the mass of the pistons.

Referring to FIG. 2.4.2, in another embodiment, the plurality of springs defined by the chambers A221, A222 and the springing member are provided in serial arrangement in which the springing member A1042 is positioned between each piston A1011 (i.e., the first piston A111 and the second piston A112) and the respective ends of the connection member A1030. The serial arrangement of springs along the lateral direction L may particularly include the first chamber A221 at one piston body A1023, the springing member A1042 connected between the connection member A1030 and the first piston A111, the springing member A1042 connected between the connection member A1030 and the second piston A112, and the first chamber A221 at another piston body A1024 of the same piston assembly A1010.

In various embodiments, the springing member A1042 is positioned within the second chamber A222 at one or more of the piston bodies A1020. As such, the springing member A1042 may be defined in substantially parallel arrangement with the second chamber A222 defining a spring.

Referring now to FIG. 2.4.3, another exemplary embodiment of the piston assembly A1010 is provided. Various embodiments provided in regard to FIG. 2.4.3 are configured substantially similarly as shown and described in regard to FIGS. 2.4.1-FIG. 2.4.2. In regard to FIG. 2.4.3, the piston assembly A1010 further includes a load device A180 operably coupled to one or more piston assemblies A1010. In various embodiments, the load device A180 defines an electric machine, such as a motor and/or generator, electrically coupled to the piston assembly A1010. The load device A180 is operably positioned with the connection member A1030 so as to convert movement (e.g., movement along the lateral direction L) of the connection member A1030 into output power, such as electrical energy, mechanical energy or work, etc.

In one embodiment, each connection member A1030 of each piston assembly A1010 includes a dynamic member of the load device A180 defining an electric machine. The piston assembly A1010 including the dynamic member is in magnetic communication with the load device A180. In various embodiments, the load device A180 further includes a stator assembly A182 operably coupled with each connection member A1030 defining the dynamic member of the load device A180 (e.g., electrical coupling and magnetic communication between the stator assembly A182 and the connection member A1030 including the dynamic member). The load device A180 may include one or more of an inductor, permanent magnet, exciter, pump, etc. proximate to the connection member A1030 of the piston assembly A1010 to generate output power via lateral movement of the piston assembly A1010. In still various embodiments, the load device A180 is includes a battery or capacitor A184 such as to hold or discharge electric current.

Referring still to FIG. 2.4.3, in one embodiment, the load device A180 includes the springing member A1042 defining an inductor configured to act as a spring at the connection member A1030. In various embodiments, the springing member A1042 is particularly positioned at the stator assembly A182 of the load device A180.

Referring to FIGS. 2.4.1-FIG. 2.4.3, in various embodiments, the springing member A1042 defines a first spring constant $k_1$. The first chamber A221 and the second chamber A222 each define another spring constant different from the first spring constant $k_1$, such as a second spring constant $k_2$. The first chamber A221 and the second chamber A222 may each define the same or similar spring constant. In other embodiments, the first chamber A221 and the second chamber A222 may define different spring constants. In various embodiments, the first spring constant $k_1$ is defined less than the spring constant at either of the first chamber A221, the second chamber A222, or both. In still various embodiments, the assembly defines the spring constants of the plurality of springs as $k_1<k_2$, in which the springing member A1042 defines a spring constant less than those of each of the first chamber A221 and the second chamber A222. In regard to FIG. 2.1.3, the springing member A1042 may further define the inductor configured to generate the first spring constant $k_1$ less than the second spring constant $k_2$ such as described in regard to FIGS. 2.4.1-FIG. 2.4.2.

Referring still to FIG. 2.4.3, in one embodiment, the load device A180 may particularly be disposed proximate to the inner end A104 of piston body A1020, in which the thermal energy removal source A170 is further disposed at the inner end A104 of the piston body A1020. As such, the thermal energy removal source A170 may be disposed in a thermally beneficial arrangement relative to the load device A180. For example, the arrangement of the load device A180 and the thermal energy removal source A170 each at or proximate to the inner end A104 of the piston body provides the thermal energy removal source A170 to remove thermal energy from the second chamber A222 and the load device A180. The thermal energy removal source A170 may improve performance and durability of the load device A180, or otherwise mitigate damage or deterioration to the load device A180. In still various embodiments, the load device A180 may be configured to beneficially control a magnitude of the amplitude of the piston assemblies A1010 such as via applying an electrical load to each piston assembly A1010.

It should further be appreciated that although various embodiments of the load device A180 provided herein may be configured to alter operation of the plurality of piston assemblies A1010, various embodiments of the apparatus A100 are configured to provide balanced pressure and balanced phase relationship of the plurality of piston assemblies A1010 during operation of the apparatus A100 without the use of the load device A180, or necessitation of the load device A180. As such, it should be appreciated that various embodiments of the apparatus A100 provide operation of the piston assemblies A1010 at substantially the same magnitude as one another without active or passive control from the load device A180.

During operation of the apparatus A100 shown and described in regard to FIGS. 2.1.1-FIG. 2.4.3, thermal energy, such as shown schematically via arrows A161, is provided to the first chambers A221. Additionally, thermal energy, such as shown schematically via arrows A171, is removed from the second chambers A222. Providing thermal energy at the first chamber A221 and removing thermal energy at the second chamber A222 causes each piston A1011 to translate along the lateral direction L. The engine working fluid is contained within each interconnected volume such as described herein. The engine working fluid generally includes a compressible fluid. The engine working fluid may include an inert gas, such as helium. In other embodiments, the engine working fluid may include a gas generally, such as, but not limited to, hydrogen, air, or other suitable gases, mixtures, or fluids for operating a closed cycle engine.

As the chambers and walled conduits within the interconnected volume are pneumatically disconnected from the chambers and walled conduits outside of the interconnected volume, pressure changes and forces at the interconnected volume, or outside of the interconnected volume, do not propagate to the other chambers and walled conduits (i.e., pressure waves do not propagate from the interconnected volume outside of the interconnected volume, or from outside of the interconnected volume to within the interconnected volume, or from one interconnected volume to another interconnected volume). Additionally, or alternatively, each piston assembly A1010 translates at a substantially identical frequency relative to one another. In various embodiments, each piston assembly A1010 translates in balanced phase relationship relative to one another. In various embodiments, the piston assemblies translate in balanced phase relationship of 90 degrees, or 180 degrees, or 270 degrees relative to one another. In still various embodiments, the balanced phase relationship of the pistons is during operation of the engine when a temperature differential is applied at the first chamber A221 and the second chamber A222. In still yet various embodiments, the balanced phase relationship of the pistons may commence with articulation of at least one first piston assembly A1110 of the apparatus A100.

In various embodiments, the apparatus A100 defines a passively balanced multi-piston assembly apparatus A100 in which each piston assembly A1010 has dynamic motion of its respective connection member A1030. In one embodiment, the piston assembly A1010 has harmonic or oscillation motion respective of its connection member A1030. In another embodiment, the plurality of piston assemblies A1010 each translates at a substantially identical frequency relative to one another.

In still various embodiments, each of the interconnected volumes defines substantially equal internal volumes relative to one another. It should be appreciated that as the apparatus A100 includes the piston assemblies A1010 operating in dynamic motion, though the frequencies are substantially identical and each piston assembly A1010 is out of phase from one another, the internal volumes defining each interconnected volume (i.e., the internal volume at the chambers A221, A222 and the walled conduit A1050 connecting the chambers A221, A222, and any volumes therebetween), are substantially equal as the piston assembly A1010 operates. It should be appreciated that the apparatus A100 provides operation of the piston assemblies A1010 at substantially the same amplitude as one another.

Toroidal Engine Arrangement

Referring now to FIG. 2.5.1, another exemplary embodiment of at least a portion of the apparatus A100 is provided. The embodiment provided in regard to FIG. 2.5.1 may be configured substantially similarly as shown and described to the embodiments in regard to FIGS. 2.1.1-FIG. 2.4.3. In FIG. 2.5.1, the apparatus A100 may include a substantially the piston body A1020 defining a substantially toroid shape. Stated differently, the piston body A1020 may extend substantially circumferentially around a reference longitudinal axis C204. A plurality of the first chamber A221, the second chamber A222, or both is defined within the piston body A1020. The chambers A221, A222 are separated from one another at least by the piston A1011 of the piston assembly A1010 such as described in regard to FIGS. 2.1.1-FIG. 2.4.3. Additionally, the piston body A1020 may further include a separating wall A1021 extended to fluidly separate adjacent chambers A221, A222 within the piston body A1020.

Referring still to FIG. 2.5.1, the piston assembly A1010 may include a curved or arcuate piston A1011 corresponding to an arc of the toroidally-shaped piston body A1020. The piston assembly A1010 further includes the connection member A1030 attached to the piston A1011. In one embodiment, such as depicted in FIG. 2.5.1, the connection member A1030 is mechanically coupled to two pistons A1011 separated along a radial direction R from the reference longitudinal axis C204. In other embodiments, the piston assembly A1010 may include two or more of the pistons A1011 and two or more of the connection member A1030 at the toroidally-shaped piston body A1020. The piston assembly A1010 is further configured to rotate or actuate at least partially along a circumferential direction C relative to the reference longitudinal axis C204. More particularly, in various embodiments the piston assembly A1010 is configured to rotate along a first circumferential direction and an opposite second circumferential direction similarly to movement of the piston assembly A1010 along the lateral direction L in regard to FIGS. 2.1.1-FIG. 2.4.3.

The chambers A221, A222 of each piston body A1020 are connected to respective chambers A221, A222 of another piston body A1020 via the plurality of walled conduits A1050 such as described in regard to FIGS. 2.1.1-FIG. 2.1.8. As such, although FIG. 2.5.1 depicts two toroidally-shaped piston bodies A1020, various embodiments of the apparatus A100 may include similar quantities of piston bodies A1020, or similar quantities of chambers A221, A222, or both, as shown and described in various embodiments of the apparatus A100 in regard to FIGS. 2.1.1-FIG. 2.4.3.

Linked Piston Assembly Arrangements

Referring now to FIG. 2.6.1-FIG. 2.6.3, further embodiments of the apparatus A100 are provided. The embodiments provided in regard to FIG. 2.6.1-FIG. 2.6.3 are configured substantially similarly as shown and described in regard to FIG. 15 such as to provide a substantially balanced pressure and/or balanced phase piston engine apparatus. Referring to FIG. 2.6.1-FIG. 2.6.3, in various embodiments, the plurality of piston assemblies A1010 includes at least a first pair of piston assemblies, depicted at A1033, each connected together by a first linkage A1035. The plurality of piston assemblies further includes at least a second pair of piston assemblies, depicted at A1034, each connected together by a second linkage A1036. The first chamber A221 at the first pair A1033 of piston assemblies A1010 is fluidly connected to the second chamber A222 at the second pair A1034 of piston assemblies A1010. The second chamber A222 at the first pair A1033 of piston assemblies A1010 is fluidly connected to the first chamber A221 at the second pair A1034 of piston assemblies A1010. Articulation or motion of one piston assembly at one linkage (e.g., the first pair A1033 or the second pair A1034 of piston assemblies A1010) provides force balance at another piston assembly at another linkage (e.g., the other of the second pair A1034 or the first pair A1033 of the piston assemblies A1010. In various embodiments, force balance at the piston assemblies A1010 further includes moment balance at the piston assemblies A1010.

Referring to FIG. 2.6.1, in one embodiment, the piston assembly A1010 may define a single-ended, dual-action piston assembly including the connection member A1030 connected to a single piston A1011. The piston A1011 may define a pair of chambers, such as the first chamber A221 and the second chamber A222.

Referring to FIGS. 2.6.2-FIG. 2.6.3, in another embodiment, the piston assembly A1010 may define a double-ended, single-action piston assembly in which the connection member A1030 is connected to a pair of pistons A1011. Referring to FIG. 2.6.2, in one embodiment, the piston assembly A1010 defines the first chamber A221 at one end (e.g., the first end A101) and further defines the second chamber A222 at the other end (e.g., the second end A102) along the lateral direction L. Referring to FIG. 2.6.3, in another embodiment, the piston assembly A1010 defines either the first chamber A221 at each pair of pistons A101 or the second chamber A222 at each pair of pistons A1011. Stated differently, one piston assembly A1010 of each pair A1033, A1034 defines the first chamber A221 at the first end A101 and the second end A102 and another piston assembly at each pair A1033, A1034 defines the second chamber A222 at the first end A101 and the second end A102.

Referring to FIG. 2.6.1-FIG. 2.6.3, the linkage A1035, A1036 may include a pivoting linkage, such as depicted at a pivot member A1037. In various embodiments, the pivot member A1037 is positioned between each piston assembly A1010 of each pair A1033, A1034. The linkage A1035, A1036 may further define a substantially linear member connecting the plurality of piston assemblies A1010. The linkage A1035, A1036 may provide improvements over rotary linkages, such as camshafts, crankshafts, such as by mitigating or eliminating oscillatory affects that may limit the desired stroke of the piston assembly A1010. Additionally, or alternatively, the linkage A1035, A1036 may mitigate or eliminate undesired changes or limitations to the phase or cycle of the plurality of piston assemblies A1010 relative to one another. As such, the linkage A1035, A1036 may provide the plurality of piston assemblies A1010 to operate in desired balanced pressure and/or balanced phase arrangement.

Various embodiments of the apparatus A100 provided herein may include elements or features described or depicted in regard to one embodiment and applied to another embodiment to yield yet other embodiments. For example, embodiments of the fluid coupling of certain chambers A221, A222 to one another via the walled conduit A1050 may be applied to other embodiments of the piston assembly A1010 or apparatus A100 generally. As another example, the load device A180 depicted at the inner end A104 may in other embodiments be positioned at the outer end A103 or out of alignment from the piston assembly A1010. In still another embodiment, the hot side heat exchanger A160 may be positioned at either the outer end A103 or the inner end A104 and the first chamber A221 may be positioned correspondingly at the outer end A103 or the inner end A104. Alternatively, the cold side heat exchanger A170 may be positioned at either the inner end A104 or the outer end A103 and the second chamber A222 may be positioned correspondingly at the inner end A104 or the outer end A103.

In still various embodiments, a single hot side heat exchanger A160, or heater assembly generally, may be positioned to provide thermal energy to each of the plurality of first chambers A221. Similarly, a single cold side heat exchanger A170, or chiller assembly generally, may be positioned to remove or receive thermal energy from each of the plurality of second chambers A222. It should further be appreciated that certain embodiments may advantageously position the first chamber A221 and/or the second chamber A222 such as to improve overall packaging of the apparatus A100, such as to reduce overall size and dimension relative to power output (i.e., to improve power density). For example, referring to FIG. 2.6.1-FIG. 2.6.3, the linkage A1035, A1036 may be utilized to provide a single-ended single-action piston assembly or a double-ended single-action piston assembly to be utilized to provide a balanced pressure and/or balanced phase closed cycle engine assembly such as described herein. The linkage A1035, A1036 may further, or alternatively, provide placing the hot side heat exchanger A160 and the cold side heat exchanger A170 at the outer ends A103 such as leave the inner end A104 substantially void except for the linkage A1035, A1036. The placement of the linkage A1035, A1036, may provide a relatively smaller packaging along the lateral direction L while further providing the balanced pressure and/or balanced phase embodiments shown and described herein.

Referring still to FIGS. 2.1.1-FIG. 2.6.3, various embodiments of the apparatus A100 shown and described herein may alternatively include connection members A1030 that are at least partially non-linear. In various embodiments, the connection member A1030 may define substantially U-, V-, S-, or other geometries. As such, various embodiments of the apparatus A100 may include two or more of the pistons A1011 in non-coaxial or non-aligned arrangement relative to one another. In still various embodiments, the piston A1011 or piston assembly A1010 may define a stepped piston or other appropriate piston or piston assembly type.

In still various embodiments of the apparatus A100 and system A10 shown and described herein, a plurality of the connection member A1030 may be operably connected together to multiply power output at the load device C092. In one embodiment, a plurality of the apparatus A100 may be configured to operate in substantially similar phase arrangement as one another. For instance, the plurality of apparatuses A100 may each include a first connection member corresponding to a first piston assembly (e.g., A110 in FIG. 2.1.7), a second connection member corresponding to a second piston assembly (e.g., A210 in FIG. 2.1.7), a third connection member corresponding to a third piston assembly (e.g., A310 in FIG. 2.1.7), etc., to an Nth connection member corresponding to an Nth piston assembly. Each respective connection member at each respective piston assembly is operable in phase arrangement relative to one another within one apparatus A100. Each corresponding connection member relative to each apparatus A100 is operably connected to one another and operably connected to a respective load device C092. As such, each first connection member at each apparatus A100 is respectively connected to one another and to a first load device C092. Similarly, each second connection member at each apparatus A100 is respectively connected to one another and to second load device C092. Further, each Nth connection member at each apparatus A100 is respectively connected to one another and to an Nth load device C092. In one embodiment, the system A10 may include a plurality of four apparatuses A100 configured such as described herein such as to provide approximately four-times the power output to each respective load device C092.

Various embodiments of the apparatus A100 shown and described herein may be fabricated via one or more manufacturing methods known in the art, such as, but not limited to, additive manufacturing, binder jetting, or 3D printing processes generally, machining processes, material addition or removal processes, or joining or bonding processes. Manufacturing processes may include, but are not limited to, casting, welding, brazing, soldering, or bonding processes. Materials may include those suitable for piston assemblies and pressure vessels configured to receive thermal differentials and operate for desired cycles and power outputs, including rigid and flexible wall members, enclosures, and conduits. Although certain exemplary embodiments may preferably be produced via one or more additive manufacturing processes, it should be appreciated that other manufacturing processes, or combinations thereof, may be utilized. Still further, although certain elements or structures may be produced as substantially monolithic structures, certain elements may be attached or otherwise coupled via welding, brazing, or mechanical fasteners, such as, but not limited to, clamps, nuts, bolts, screws, tie rods, washers, etc.

As used herein, the terms "additively manufactured" or "additive manufacturing techniques or processes" refer generally to manufacturing processes wherein successive layers of material(s) are provided on each other to "build-up," layer-by-layer, a three-dimensional component. The successive layers generally fuse together to form a monolithic component which may have a variety of integral sub-components.

Although additive manufacturing technology is described herein as providing fabrication of complex objects by building objects point-by-point, layer-by-layer, typically in a vertical direction, other methods of fabrication are possible and are within the scope of the present subject matter. For example, although the discussion herein refers to the addition of material to form successive layers, one skilled in the art will appreciate that the methods and structures disclosed herein may be practiced with any additive manufacturing technique or manufacturing technology. For example, embodiments of the present disclosure may use layer-additive processes, layer-subtractive processes, or hybrid processes. As another example, embodiments of the present disclosure may include selectively depositing a binder material to chemically bind portions of the layers of powder together to form a green body article. After curing, the green body article may be pre-sintered to form a brown body article having substantially all of the binder removed, and fully sintered to form a consolidated article.

Suitable additive manufacturing techniques in accordance with the present disclosure include, for example, Fused Deposition Modeling (FDM), Selective Laser Sintering (SLS), 3D printing such as by inkjets and laserjets, Stereolithography (SLA), Direct Laser Sintering (DLS), Direct Selective Laser Sintering (DSLS), Electron Beam Sintering (EBS), Electron Beam Melting (EBM), Laser Engineered Net Shaping (LENS), Laser Net Shape Manufacturing (LNSM), Direct Metal Deposition (DMD), Digital Light Processing (DLP), Direct Laser Melting (DLM), Direct Selective Laser Melting (DSLM), Selective Laser Melting (SLM), Direct Metal Laser Melting (DMLM), Binder Jetting (BJ), and other known processes.

The additive manufacturing processes described herein may be used for forming components using any suitable material. For example, the material may be plastic, metal, concrete, ceramic, polymer, epoxy, photopolymer resin, or any other suitable material that may be in solid, liquid, powder, sheet material, wire, or any other suitable form or combinations thereof. More specifically, according to exemplary embodiments of the present subject matter, the additively manufactured components described herein may be formed in part, in whole, or in some combination of materials including but not limited to pure metals, nickel alloys, chrome alloys, titanium, titanium alloys, magnesium, magnesium alloys, aluminum, aluminum alloys, and nickel or cobalt based superalloys (e.g., those available under the name Inconel® available from Special Metals Corporation). These materials are examples of materials suitable for use in the additive manufacturing processes described herein, and may be generally referred to as "additive materials."

In addition, one skilled in the art will appreciate that a variety of materials and methods for bonding those materials may be used and are contemplated as within the scope of the present disclosure. As used herein, references to "fusing" or "binding" may refer to any suitable process for creating a bonded layer of any of the above materials. For example, if an object is made from polymer, fusing may refer to creating a thermoset bond between polymer materials. If the object is epoxy, the bond may be formed by a crosslinking process. If the material is ceramic, the bond may be formed by a sintering process. If the material is powdered metal, the bond may be formed by a melting or sintering process, or additionally with a binder process. One skilled in the art will appreciate that other methods of fusing materials to make a component by additive manufacturing are possible, and the presently disclosed subject matter may be practiced with those methods.

In addition, the additive manufacturing process disclosed herein allows a single component to be formed from multiple materials. Thus, the components described herein may be formed from any suitable mixtures of the above materials. For example, a component may include multiple layers, segments, or parts that are formed using different materials, processes, and/or on different additive manufacturing machines. In this manner, components may be constructed which have different materials and material properties for meeting the demands of any particular application. In addition, although the components described herein are constructed entirely by additive manufacturing processes, it should be appreciated that in alternate embodiments, all or a portion of these components may be formed via casting, machining, and/or any other suitable manufacturing process. Indeed, any suitable combination of materials and manufacturing methods may be used to form these components.

An exemplary additive manufacturing process will now be described. Additive manufacturing processes fabricate components using three-dimensional (3D) information, for example a three-dimensional computer model, of the component. Accordingly, a three-dimensional design model of the component may be defined prior to manufacturing. In this regard, a model or prototype of the component may be scanned to determine the three-dimensional information of the component. As another example, a model of the component may be constructed using a suitable computer aided design (CAD) program to define the three-dimensional design model of the component.

The design model may include 3D numeric coordinates of the entire configuration of the component including both external and internal surfaces of the component. For example, the design model may define the body, the surface, and/or internal passageways such as openings, support structures, etc. In one exemplary embodiment, the three-dimensional design model is converted into a plurality of slices or segments, e.g., along a central (e.g., vertical) axis of the component or any other suitable axis. Each slice may define a thin cross section of the component for a predetermined height of the slice. The plurality of successive cross-sectional slices together form the 3D component. The component is then "built-up" slice-by-slice, or layer-by-layer, until finished.

In this manner, the components described herein may be fabricated using the additive process, or more specifically each layer is successively formed, e.g., by fusing or polymerizing a plastic using laser energy or heat or by sintering or melting metal powder. For example, a particular type of additive manufacturing process may use an energy beam, for example, an electron beam or electromagnetic radiation such as a laser beam, to sinter or melt a powder material. Any suitable laser and laser parameters may be used, including considerations with respect to power, laser beam spot size, and scanning velocity. The build material may be formed by any suitable powder or material selected for enhanced strength, durability, and useful life, particularly at high temperatures.

Each successive layer may be, for example, between about 10 μm and 200 μm, although the thickness may be selected based on any number of parameters and may be any suitable size according to alternative embodiments. Therefore, utilizing the additive formation methods described above, the components described herein may have cross sections as thin as one thickness of an associated powder layer, e.g., 10 μm, utilized during the additive formation process.

In addition, utilizing an additive process, the surface finish and features of the components may vary as need depending on the application. For example, the surface finish may be adjusted (e.g., made smoother or rougher) by selecting appropriate laser scan parameters (e.g., laser power, scan speed, laser focal spot size, etc.) during the additive process, especially in the periphery of a cross-sectional layer which corresponds to the part surface. For example, a rougher finish may be achieved by increasing laser scan speed or decreasing the size of the melt pool formed, and a smoother finish may be achieved by decreasing laser scan speed or increasing the size of the melt pool formed. The scanning pattern and/or laser power can also be changed to change the surface finish in a selected area.

After fabrication of the component is complete, various post-processing procedures may be applied to the component. For example, post processing procedures may include removal of excess powder by, for example, blowing or vacuuming. Other post processing procedures may include a stress relief process. Additionally, thermal, mechanical, and/or chemical post processing procedures can be used to finish the part to achieve a desired strength, surface finish, a decreased porosity decreasing and/or an increased density (e.g., via hot isostatic pressing), and other component properties or features.

It should be appreciated that one skilled in the art may add or modify features shown and described herein to facilitate manufacture of the system A10 provided herein without undue experimentation. For example, build features, such as trusses, grids, build surfaces, or other supporting features, or material or fluid ingress or egress ports, may be added or modified from the present geometries to facilitate manufacture of embodiments of the system A10 based at least on a desired manufacturing process or a desired particular additive manufacturing process.

Notably, in exemplary embodiments, several features of the components described herein were previously not possible due to manufacturing restraints. However, the present inventors have advantageously utilized current advances in additive manufacturing techniques to develop exemplary embodiments of such components generally in accordance with the present disclosure. While certain embodiments of the present disclosure may not be limited to the use of additive manufacturing to form these components generally, additive manufacturing does provide a variety of manufacturing advantages, including ease of manufacturing, reduced cost, greater accuracy, etc.

In this regard, utilizing additive manufacturing methods, even multi-part components may be formed as a single piece of continuous metal, and may thus include fewer sub-components and/or joints compared to prior designs. The integral formation of these multi-part components through additive manufacturing may advantageously improve the overall assembly process, reduce potential leakage, reduce thermodynamic losses, improve thermal energy transfer, or provide higher power densities. For example, the integral formation reduces the number of separate parts that must be assembled, thus reducing associated time, overall assembly costs, reduces potential leakage pathways, or reduces potential thermodynamic losses. Additionally, existing issues with, for example, leakage, may advantageously be reduced. Still further, joint quality between separate parts may be addressed or obviated by the processes described herein, such as to desirably reduce leakage, assembly, and improve overall performance.

Also, the additive manufacturing methods described above provide much more complex and intricate shapes and contours of the components described herein to be formed with a very high level of precision. For example, such components may include thin additively manufactured layers, cross sectional features, and component contours. As another example, additive manufacturing may provide heat exchanger surface areas, volumes, passages, conduits, or other features that may desirably improve heat exchanger efficiency or performance, or overall engine or system performance. In addition, the additive manufacturing process provides the manufacture of a single component having different materials such that different portions of the component may exhibit different performance characteristics. The successive, additive steps of the manufacturing process provide the construction of these novel features. As a result, the components described herein may exhibit improved functionality and reliability.

It should be appreciated that performances, power outputs, efficiencies, or temperature differentials at the system A10, the engine A100, or both, provided herein may be based on a "Sea Level Static" or "Standard Day" input air condition such as defined by the United States National Aeronautics and Space Administration, unless otherwise specified. For example, unless otherwise specified, conditions provided to the heater body, the chiller assembly, or both, or any subsystems, components, etc. therein, or any other portions of the system A10 receiving an input fluid, such as air, are based on Standard Day conditions.

The heat transfer relationships described herein may include thermal communication by conduction and/or convection. A heat transfer relationship may include a thermally conductive relationship that provides heat transfer through conduction (e.g., heat diffusion) between solid bodies and/or between a solid body and a fluid. Additionally, or in the alternative, a heat transfer relationship may include a thermally convective relationship that provides heat transfer through convection (e.g., heat transfer by bulk fluid flow) between a fluid and a solid body. It will be appreciated that convection generally includes a combination of a conduction (e.g., heat diffusion) and advection (e.g., heat transfer by bulk fluid flow). As used herein, reference to a thermally conductive relationship may include conduction and/or convection; whereas reference to a thermally convective relationship includes at least some convection.

A thermally conductive relationship may include thermal communication by conduction between a first solid body and a second solid body, between a first fluid and a first solid body, between the first solid body and a second fluid, and/or between the second solid body and a second fluid. For example, such conduction may provide heat transfer from a first fluid to a first solid body and/or from the first solid body to a second fluid. Additionally, or in the alternative, such conduction may provide heat transfer from a first fluid to a first solid body and/or through a first solid body (e.g., from one surface to another) and/or from the first solid body to a second solid body and/or through a second solid body (e.g., from one surface to another) and/or from the second solid body to a second fluid.

A thermally convective relationship may include thermal communication by convection (e.g., heat transfer by bulk fluid flow) between a first fluid and a first solid body, between the first solid body and a second fluid, and/or between a second solid body and a second fluid. For example, such convection may provide heat transfer from a first fluid to a first solid body and/or from the first solid body to a second fluid. Additionally, or in the alternative, such convection may provide heat transfer from a second solid body to a second fluid.

It will be appreciated that the terms "clockwise" and "counter-clockwise" are terms of convenience and are not to be limiting. Generally, the terms "clock-wise" and "counter-clockwise" have their ordinary meaning, and unless otherwise indicated refer to a direction with reference to a top-down or upright view. Clockwise and counter-clockwise elements may be interchanged without departing from the scope of the present disclosure.

Where temperatures, pressures, loads, phases, etc. are said to be substantially similar or uniform, it should be appreciated that it is understood that variations, leakages, or other minor differences in inputs or outputs may exist such that the differences may be considered negligible by one skilled in the art. Additionally, or alternatively, where temperatures or pressures are said to be uniform, i.e., a substantially uniform unit (e.g., a substantially uniform temperature at the plurality of chambers A221), it should be appreciated that in one embodiment, the substantially uniform unit is relative to an average operating condition, such as a phase of operation of the engine, or thermal energy flow from one fluid to another fluid, or from one surface to a fluid, or from one surface to another surface, or from one fluid to another surface, etc. For example, where a substantially uniform temperature is provided or removed to/from the plurality of chambers A221, A222, the temperature is relative to an average temperature over a phase of operation of the engine. As another example, where a substantially uniform thermal energy unit is provided or removed to/from the plurality of chambers A221, A222, the uniform thermal energy unit is relative to an average thermal energy supply from one fluid to another fluid relative to the structure, or plurality of structures, through which thermal energy transferred.

Various interfaces, such as mating surfaces, interfaces, points, flanges, etc. at which one or more monolithic bodies, or portions thereof, attach, couple, connect, or otherwise mate, may define or include seal interfaces, such as, but not limited to, labyrinth seals, grooves into which a seal is placed, crush seals, gaskets, vulcanizing silicone, etc., or other appropriate seal or sealing substance. Additionally, or alternatively, one or more of such interfaces may be coupled together via mechanical fasteners, such as, but not limited to, nuts, bolts, screws, tie rods, clamps, etc. In still additional or alternative embodiments, one or more of such interfaces may be coupled together via a joining or bonding processes, such as, but not limited to, welding, soldering, brazing, etc., or other appropriate joining process.

It should be appreciated that ratios, ranges, minimums, maximums, or limits generally, or combinations thereof, may provide structure with benefits not previously known in the art. As such, values below certain minimums described herein, or values above certain maximums described herein, may alter the function and/or structure of one or more components, features, or elements described herein. For example, ratios of volumes, surface area to volume, power output to volume, etc. below the ranges described herein may be insufficient for desired thermal energy transfer, such as to undesirably limit power output, efficiency, or Beale number. As another example, limits greater than those described herein may undesirably increase the size, dimensions, weight, or overall packaging of the system or engine, such as to undesirably limit the applications, apparatuses, vehicles, usability, utility, etc. in which the system or engine may be applied or operated. Still further, or alternatively, undesired increases in overall packaging may undesirably decrease efficiency of an overall system, application, apparatus, vehicle, etc. into which the engine may be installed, utilized, or otherwise operated. For example, although an engine may be constructed defining a similar or greater efficiency as described herein, such an engine may be of undesirable size, dimension, weight, or overall packaging such as to reduce an efficiency of the system into which the engine is installed. As such, obviation or transgression of one or more limits described herein, such as one or limits relative to features such as, but not limited to, heater conduits, chiller conduits A54, chamber volumes, walled conduit volumes, or operational temperatures, or combinations thereof, may undesirably alter such structures such as to change the function of the system or engine.

Although specific features of various embodiments may be shown in some drawings and not in others, this is for convenience only. In accordance with the principles of the present disclosure, any feature of a drawing may be referenced and/or claimed in combination with any feature of any other drawing.

This written description uses examples to describe the presently disclosed subject matter, including the best mode, and also to provide any person skilled in the art to practice the subject matter, including making and using any devices or systems and performing any incorporated methods. The patentable scope of the presently disclosed subject matter is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims. The scope of the invention(s) described herein is defined by one or more of the claims, including combinations of two or more claims or clauses (as set forth below) and may include other examples that occur to those skilled in the art. For example, aspects of the invention(s) are provided by the subject matter of the following clauses, which are intended to cover all suitable combinations unless dictated otherwise based on logic or the context of the clauses and/or associated figures and description:

What is claimed is:

1. A system for energy conversion, the system comprising:

a closed cycle engine containing a working fluid, the closed cycle engine comprising;
- a first chamber defining an expansion chamber;
- a second chamber defining a compression chamber each separated by a piston attached to a connection member of a piston assembly;
- a heater body in thermal communication with the first chamber;
- a cold side heat exchanger in thermal communication with the second chamber;
- a third chamber defined within the piston, wherein the third chamber is in selective flow communication with the first chamber, the second chamber, or both, wherein the piston comprises a folded cross-sectional member positioned within the third chamber, wherein the piston comprises a first monolithic piece and a second monolithic piece, the second monolithic piece comprising the folded cross-sectional member, and wherein the first monolithic piece is positioned proximate to the first chamber, and wherein the first monolithic piece separates the first chamber and the third chamber within the piston.

2. The system of claim 1, wherein the folded cross-sectional member provides a tortuous path at the third chamber.

3. The system of claim 1, wherein the first monolithic piece substantially surrounds the second monolithic piece.

4. The system of claim 1, wherein the cold side heat exchanger comprises a working fluid passage.

5. The system of claim 4, wherein the closed cycle engine comprises:

a plurality of piston bodies, wherein respective ones of the plurality of piston bodies define the first chamber and the second chamber, wherein the working fluid passage extends from a first one of the plurality of piston bodies to a second one of the plurality of piston bodies.

6. The system of claim 1, wherein the piston assembly comprises a spring assembly.

7. The system of claim 6, wherein the connection member comprises a first connection member and a second connection member, and wherein the spring assembly is positioned between the first connection member and the second connection member.

8. The system of claim 6, wherein the spring assembly is positioned in serial arrangement between the piston and the connection member.

9. The system of claim 6, wherein the spring assembly comprises one or more of a coil spring, a planar spring, or a flexure, or combinations thereof.

10. The system of claim 6, wherein the spring assembly is configured to be flexible with respect to a lateral direction along which the piston assembly is extended.

11. The system of claim 6, wherein the spring assembly is configured to be rigid with respect to a direction oblique or orthogonal to a lateral direction.

12. The system of claim 1, wherein the system comprises a spring assembly, and wherein the spring assembly is a gas spring defined by the first chamber and the second chamber.

13. The system of claim 1, wherein the closed cycle engine defines an outer end and an inner end each relative to a lateral extension of the piston assembly, and wherein the outer end defines laterally distal ends of the closed cycle engine and the inner end defines a laterally inward position of the closed cycle engine, and wherein the heater body is positioned at the outer end.

14. The system of claim 13, the system comprising:

a load device operably coupled to the piston assembly, the piston assembly comprising laterally opposing pistons, wherein the load device is positioned between the laterally opposing pistons.

15. The system of claim 13, wherein the cold side heat exchanger and the second chamber are each positioned at the inner end.

* * * * *